US011388915B2

(12) United States Patent
Otsuji et al.

(10) Patent No.: US 11,388,915 B2
(45) Date of Patent: Jul. 19, 2022

(54) ACETIC ACID-CONTAINING FOOD AND DRINK AND METHOD FOR PRODUCING SAME, PREPARATION FOOD AND DRINK FOR ACETIC ACID-CONTAINING CEREAL PROCESSED PRODUCTS, AND METHOD FOR IMPROVING QUALITY OF ACETIC ACID-CONTAINING FOOD AND DRINK

(71) Applicants: MIZKAN HOLDINGS CO., LTD., Aichi (JP); MIZKAN CO., LTD., Aichi (JP)

(72) Inventors: Yoshiaki Otsuji, Aichi (JP); Yuhei Takayama, Aichi (JP)

(73) Assignees: MIZKAN HOLDINGS CO., LTD., Aichi (JP); MIZKAN CO., LTD., Aichi (JP)

( * ) Notice: Subject to any disclaimer, the term of this patent is extended or adjusted under 35 U.S.C. 154(b) by 0 days.

(21) Appl. No.: 16/966,801

(22) PCT Filed: Feb. 1, 2019

(86) PCT No.: PCT/JP2019/003555
§ 371 (c)(1),
(2) Date: Jul. 31, 2020

(87) PCT Pub. No.: WO2019/151465
PCT Pub. Date: Aug. 8, 2019

(65) Prior Publication Data
US 2021/0037859 A1 Feb. 11, 2021

(30) Foreign Application Priority Data

Feb. 1, 2018 (JP) .............................. JP2018-016833
Feb. 5, 2018 (JP) .............................. JP2018-017843

(51) Int. Cl.
*A23L 2/68* (2006.01)
*A23L 29/00* (2016.01)
*A23L 7/196* (2016.01)
*A23L 27/20* (2016.01)
*A23L 2/56* (2006.01)

(52) U.S. Cl.
CPC ........ *A23L 2/68* (2013.01); *A23L 2/56* (2013.01); *A23L 7/196* (2016.08); *A23L 27/2028* (2016.08); *A23L 29/035* (2016.08)

(58) Field of Classification Search
CPC .......... A23L 2/68; A23L 29/035; A23L 7/196; A23L 27/2028; A23L 2/56
USPC ........................................................ 426/590
See application file for complete search history.

(56) References Cited

U.S. PATENT DOCUMENTS 6,455,743 B1 9/2002 Ueda et al.
2018/0206539 A1 7/2018 Tsurumizu

FOREIGN PATENT DOCUMENTS

| JP | 2000-219645 A | 8/2000 |
|---|---|---|
| JP | 2001-069940 A | 3/2001 |
| JP | 2001-299263 A | 10/2001 |
| JP | 2002-119241 A | 4/2002 |
| JP | 2010124696 A | 6/2010 |
| JP | 2012-178984 A | 9/2012 |
| JP | 2014-103946 A | 6/2014 |
| JP | 2014-204740 A | 10/2014 |
| JP | 2014204740 A * | 10/2014 |
| JP | 2016-101149 A | 6/2016 |
| JP | 5993526 B1 | 9/2016 |
| JP | 2017-023017 A | 2/2017 |
| JP | 2017-035003 A | 2/2017 |
| JP | 2017-123823 A | 7/2017 |

OTHER PUBLICATIONS

Translation of JP-2014204740-A (Year: 2014).*
S. Sato et al., "Effect of Odour-Active Compounds in Herbs on the Taste of Vinegar Dressing", The Japan Society of Cookery Science, 2017, vol. 50, No. 1, pp. 13-19 (7 pages).
L. Yan et al., "Rapid determination of volatile flavor comonents in soy sauce using head space solid-phase microextraction and gas chromatography-mass spectrometry", Chinese Journal of Chromatography, May 2008, vol. 26, No. 3, pp. 285-291 (8 pages).
Y. Feng et al., "Characterisation of aroma profiles of commercial soy sauce by odour activity value and omission test", Food Chemistry, 2015, vol. 167, pp. 220-228 (11 pages).
F. Hayase et al., "Analysis of Cooked Flavor and Odorants Contributing to the Koku Taste of Seasining Soy Sauce", Journal of Japanese Society for Food Science and Technology, 2013, vol. 60, No. 2, pp. 59-71 (13 pages).
K. Fujiwara, Cookery science, 1968, vol. 1, No. 3, pp. 131-135 (5 pages).
Soy sauce analysis method 2nd edition, Japanese soy sauce technical meeting, Mar. 31, 1966 issue, p. 17 (2 pages).
Japanese Agricultural Standard of fermented vinegar, the Ministry of Agriculture, Forestry, and Fisheries, Heisei 20, Oct. 16, 2008 amendment pp. 1-7 (7 pages).
Vinegar, the improvement of lustrous skin or constipation, effect of a vinegar drink it pushes end the recipe, The bibien tv Jul. 26, 2017, http:The bibien tv July 26, 2017/bibien.tv/beauty/10128 (17 pages).
Edited by, Japan Society for Analytical Chemistry, Gaschromatograph, as one pleases Q&A, separation, detection editing, Maruzen Company, Limited, Heisei 20 Aug. 31, 2008 3rd-printing issue, pp. 186-187 (2 pages).

(Continued)

*Primary Examiner* — Brent T O'Hern
(74) *Attorney, Agent, or Firm* — Osha Bergman Watanabe & Burton LLP

(57) ABSTRACT

An object of the present invention is to provide an acetic acid-containing food or drink that exhibits suppressed sour taste and sour odor without adverse effects on the flavor. The acetic acid-containing food or drink according to the present invention comprises at least one aromatic component selected from the group consisting of (A) and (B) below: (A) unsaturated alcohols having 8 carbon atoms, and (B) monoterpenes or sesquiterpenes.

16 Claims, No Drawings

(56) References Cited

OTHER PUBLICATIONS

Analysis report, Feb. 28, 2019, pp. 1-15 (15 pages).
Component of brewed material it, and there is Brewing Society of Japan-edit, Heisei 11 Dec. 10, 1999, pp. 478-493 (9 pages).
P. Wanakhachomkrai el al., "Comparison of determination method for volatile compounds in Thai soy sauce", Food Chemistry, 2003, vol. 83, pp. 619-629 (13 pages).
Office Action dated May 8, 2018, for the corresponding Japanese patent application No. 2018-017843 (8 pages).
Notice of Reasons for Revocation dated May 31, 2019 for the corresponding Japanese patent application No. 2018-017843 (166 pages).
International Search Report issued in International Application No. PCT/JP2019/003555, dated Apr. 10, 2019 (2 pages).
Written Opinion issued in International Application No. PCT/JP2019/003555, dated Apr. 16, 2019 (4 pages).
J. Pico et al., "Comparison of different extraction methodologies for the analysis of volatile compounds in gluten-free flours and corn starch by GC/QTOF," Food Chemistry, Elsevier LTD, vol. 267, pp. 303-312, Jun. 30, 2017 (10 pages).
J. Pico et al., "Evolution of volatile compounds in gluten-free bread: From dough to crumb," Food Chemistry, Elsevier LTD, vol. 227, pp. 179-186, Jan. 19, 2017 (8 pages).
E. Aprea et al., "Sweet taste in apple: the role of sorbitol, individual sugars, organic acids and volatile compounds," Scientific Reports, vol. 7, No. 1, Mar. 21, 2017 (10 pages).
Extended European Search Report issued in corresponding European Application No. 19746585.9; dated Sep. 29, 2021 (17 pages).
J. Pico et al., "Comparison of different extraction methodologies for the analysis of volatile compounds in gluten-free flours and corn starch by GC/QTOF", Food Chemistry, 2017, vol. 267, No. 90, pp. 303-312 (10 pages).
J. Pico et al., "Evolution of volatile compounds in gluten-free bread: From dough to crumb", Food Chemistry, 2017, vol. 227, pp. 179-186 (8 pages).
E Aprea et al., "Sweet taste in apple: the role of sorbitol, individual sugars, organic acids and volatile compounds", Scientific Reports, 2017, vol. 7, No. 1, pp. 1-10 (10 pages).
Supplementary Extended European Search Report dated Sep. 29, 2021, for the corresponding European patent application No. 19746585.9 (17 pages).

* cited by examiner

ACETIC ACID-CONTAINING FOOD AND DRINK AND METHOD FOR PRODUCING SAME, PREPARATION FOOD AND DRINK FOR ACETIC ACID-CONTAINING CEREAL PROCESSED PRODUCTS, AND METHOD FOR IMPROVING QUALITY OF ACETIC ACID-CONTAINING FOOD AND DRINK

TECHNICAL FIELD

The present invention relates to an acetic acid-containing food or drink, a method for producing the same, a preparation food or drink for acetic acid-containing cereal processed products, and a method for improving the quality of the acetic acid-containing food or drink.

BACKGROUND ART

Acetic acid is well known to have a strong bacteriostatic action, and is therefore widely used in various prepared foods and processed foods for the purpose of suppressing the growth of harmful microorganisms to prolong the shelf-life. Specifically, acetic acid is widely applied to foods that require a long time from cooking to eating, for example, ready-made cooked rice and lunchboxes, as well as ready-made side dishes, such as simmered dishes, aemono (vegetables and fish in various dressings), and potato salad. Acetic acid is also added to seasonings, such as noodle soups, and some processed foods to ensure commercial sterility.

When acetic acid is added to foods for the purpose of improving their shelf life, it is required, due to the intended use thereof, that the bacteriostatic effect can be maintained for a longer period of time without affecting the original flavor of the foods or drinks. However, a pungent sour taste and sour odor derived from acetic acid are likely to be perceived. Even an extremely low concentration of acetic acid is perceived as an unpleasant feel in the flavor of the food or drink to which acetic acid is added, and grasped as an odd mixture. Therefore, this has been a cause of the avoidance, by consumers, of the intake or of the obstruction for purchase of acetic acid-containing foods or drinks.

In addition, acetic acid is not only used for the purpose of seasoning and cooking, but is also added to foods, such as seasonings and drinks. However, depending on the amount and use of acetic acid, it is perceived as a strong, pungent flavor, thereby causing a strong avoidance action when eating.

As a means for solving such a problem of suppressing a pungent sour taste and sour odor derived from acetic acid, a method of suppressing the sharp sour taste of acid-containing seasonings and mellowing the sour taste by incorporating 3-hydroxy-4,5-dimethyl-2(5H)-furanone and furfural has been conventionally known (see, for example, PTL 1). Further, as for the suppression of acid odor, a method of suppressing only acetic acid odor without affecting the taste and texture of the target food by mixing powdered vinegar with baked calcium has also been conventionally known (see, for example, PTL 2). In addition, a method for reducing the acetic acid odor of an acetic acid-containing food or drink without adverse effects on the taste of the food in a simple and versatile manner has also been conventionally known, in which hexanal is added to the acetic acid-containing food or drink so that the content mass ratio of acetic acid and hexanal falls within a specific range (see, for example, PTL 3).

CITATION LIST

Patent Literature

PTL 1: JP2001-69940A
PTL 2: JP2002-119241A
PTL 3: JP2010-124696A

SUMMARY OF INVENTION

Technical Problem

The 3-hydroxy-4,5-dimethyl-2(5H)-furanone in the method of PTL 1 has a typical smell of fenugreek or curry at a high concentration, and has a smell of maple syrup, caramel, or burnt sugar at a low concentration. Accordingly, there was a problem that depending on the type of acid-containing seasoning containing this compound, these smells imparted an unpleasant feel to the flavor of the food or drink to which the seasoning was added.

PTL 2 proposes a method for suppressing acetic acid odor without affecting the flavor of the food or drink; however, baked calcium is poorly soluble in water, causing a problem that it was difficult to apply to a liquid or moist food or drink. In addition, although the avoidance effect due to the aroma could be prevented by suppressing only the acid odor, the pungency of the sour taste still remained when placed in the oral cavity at the time of ingestion, and there was still room for improvement as a cause of the avoidance of intake.

Similarly, the method of PTL 3 could reduce the acetic acid odor, but failed to reduce the pungent sour taste; thus, the same problem arose.

That is, as described above, there has conventionally been a demand for the development of simple and applicable methods that can suppress both pungent sour odor and sour taste.

The present invention was made in view of the above problems. An object of the present invention is to provide an acetic acid-containing food or drink that exhibits suppressed sour taste and sour odor without adverse effects on the flavor (taste and aroma), and to also provide a method for producing the same. Another object of the present invention is to provide a method for improving the quality of the acetic acid-containing food or drink by suppressing the sour taste and sour odor thereof without adverse effects on the flavor. Still another object of the present invention is to provide a preparation food or drink suitable for producing an acetic acid-containing cereal processed product, which is one aspect of the acetic acid-containing food or drink.

Solution to Problem

As a result of extensive studies in view of the above circumstances, the present inventors focused on aromatic components other than acetic acid in acetic acid-containing foods or drinks, and newly found that the sour taste and sour odor can both be suppressed by incorporating specific types of aromatic components. Then, the present inventors conducted further extensive studies based on the above finding. Finally, the following inventions have been completed.

Means [1] to [17] for solving the above problems are listed below.

[1]

An acetic acid-containing food or drink comprising at least one aromatic component selected from the group consisting of (A) and (B) below:

(A) unsaturated alcohols having 8 carbon atoms; and
(B) monoterpenes or sesquiterpenes.

[2]

The acetic acid-containing food or drink according to means 1, further comprising at least one aromatic component selected from the group consisting of (C) and (D) below:
(C) furan compounds having 5 or 6 carbon atoms; and
(D) aliphatic aldehydes having 6 to 9 carbon atoms.

[3]

The acetic acid-containing food or drink according to means 1 or 2, wherein the unsaturated alcohol having 8 carbon atoms is 1-octen-3-ol.

[4]

The acetic acid-containing food or drink according to any one of means 1 to 3, wherein the monoterpene or sesquiterpene is at least one member selected from the group consisting of limonene, terpinene, p-cymene, muurolol, and cadalene.

[5]

The acetic acid-containing food or drink according to means 2, wherein the furan compound having 5 or 6 carbon atoms is at least one member selected from the group consisting of furfural, furfuryl alcohol, 2-acetylfuran, 3-methylfuran, 2-methylfuran, and 2-(5H)-furanone.

[6]

The acetic acid-containing food or drink according to means 2, wherein the aliphatic aldehyde having 6 to 9 carbon atoms is at least one member selected from the group consisting of hexanal, heptanal, octanal, and nonanal.

[7]

The acetic acid-containing food or drink according to means 3, wherein the 1-octen-3-ol is contained within a range in which the peak area ratio measured by solid-phase microextraction-gas chromatography-mass spectrometry is 1 ppm part or more and 5 parts or less with respect to 1 part of acetic acid.

[8]

The acetic acid-containing food or drink according to means 4, wherein the monoterpene or sesquiterpene is contained within a range in which the peak area ratio measured by solid-phase microextraction-gas chromatography-mass spectrometry is 1 ppm part or more and 10 parts or less with respect to 1 part of acetic acid.

[9]

The acetic acid-containing food or drink according to means 5, wherein the furan compound having 5 or 6 carbon atoms is contained within a range in which the peak area ratio measured by solid-phase microextraction-gas chromatography-mass spectrometry is 1 ppm part or more and 15 parts or less with respect to 1 part of acetic acid.

[10]

The acetic acid-containing food or drink according to means 6, wherein the aliphatic aldehyde having 6 to 9 carbon atoms is contained within a range in which the peak area ratio measured by solid-phase microextraction-gas chromatography-mass spectrometry is 1 ppm part or more and 15 parts or less with respect to 1 part of acetic acid.

[11]

The acetic acid-containing food or drink according to any one of means 1 to 10, wherein the aromatic component (A) contains 1-octen-3-ol;
the aromatic component (B) contains at least one member selected from the group consisting of limonene, terpinene, p-cymene, muurolol, and cadalene;
the aromatic component (A) is contained within a range in which the peak area ratio measured by solid-phase microextraction-gas chromatography-mass spectrometry is 1 ppm part or more and 5 parts or less with respect to 1 part of acetic acid;
the aromatic component (B) is contained within a range in which the peak area ratio measured by solid-phase microextraction-gas chromatography-mass spectrometry is 1 ppm part or more and 10 parts or less with respect to 1 part of acetic acid; and
the acetic acid content when eating is 0.015 mass % or more and less than 5 mass %.

[12]

The acetic acid-containing food or drink according to any one of means 1 to 11, wherein the acetic acid-containing food or drink has an acetic acid content of 0.015 mass % or more and less than 0.2 mass % when eating.

[13]

The acetic acid-containing food or drink according to means 12, wherein the acetic acid-containing food or drink is an acetic acid-containing cereal processed product.

[14]

The acetic acid-containing food or drink according to means 13, wherein the acetic acid-containing cereal processed product is white rice or salted rice, both containing acetic acid.

[15]

A preparation food or drink for acetic acid-containing cereal processed products, for use in the production of an acetic acid-containing cereal processed product having an acetic acid content of 0.015 mass % or more and less than 0.2 mass % when eating, the preparation food or drink comprising at least one aromatic component selected from the group consisting of (A) and (B) below:
(A) unsaturated alcohols having 8 carbon atoms; and
(B) monoterpenes or sesquiterpenes.

[16]

Use of a preparation food or drink for producing an acetic acid-containing cereal processed product having an acetic acid content of 0.015 mass % or more and less than 0.2 mass % when eating, the preparation food or drink comprising at least one aromatic component selected from the group consisting of (A) and (B) below:
(A) unsaturated alcohols having 8 carbon atoms; and
(B) monoterpenes or sesquiterpenes.

[17]

The acetic acid-containing food or drink according to any one of means 1 to 11, wherein the acetic acid-containing food or drink is an acetic acid-containing seasoning or an acetic acid-containing drink, both having an acetic acid content of 0.2 mass % or more and 5 mass % or less when eating the acetic acid-containing food or drink.

[18]

A method for producing an acetic acid-containing food or drink, comprising:
adjusting the amount of acetic acid so that the acetic acid content when eating is 0.015 mass % or more and 5 mass % or less, and adjusting the content of at least one aromatic component selected from the group consisting of (A) and (B) below so that the amount thereof is as follows:
(A) unsaturated alcohols having 8 carbon atoms; the peak area ratio measured by solid-phase microextraction-gas chromatography-mass spectrometry being 1 ppm part or more and 5 parts or less with respect to 1 part of acetic acid; and
(B) monoterpenes or sesquiterpenes; the peak area ratio measured by solid-phase microextraction-gas chromatography-mass spectrometry being 1 ppm part or more and 10 parts or less with respect to 1 part of acetic acid.

[19]

A method for improving the quality of an acetic acid-containing food or drink, comprising:

adjusting the amount of acetic acid so that the acetic acid content when eating is 0.015 mass % or more and 5 mass % or less, and adjusting the content of at least one aromatic component selected from the group consisting of (A) and (B) below so that the amount thereof is as follows, thereby suppressing the sour taste and sour odor of the acetic acid-containing food or drink, and enhancing the original flavor of the food or drink to which acetic acid is added:

(A) unsaturated alcohols having 8 carbon atoms; the peak area ratio measured by solid-phase microextraction-gas chromatography-mass spectrometry being 1 ppm part or more and 5 parts or less with respect to 1 part of acetic acid; and (B) monoterpenes or sesquiterpenes; the peak area ratio measured by solid-phase microextraction-gas chromatography-mass spectrometry being 1 ppm part or more and 10 parts or less with respect to 1 part of acetic acid.

Advantageous Effects of Invention

As noted in detail above, the inventions according to claims 1 to 14 and 17 can provide an acetic acid-containing food or drink that exhibits suppressed sour taste and sour odor without adverse effects on the flavor. More specifically, these inventions can suppress the sour taste and sour odor of a food or drink that contains acetic acid at a relatively low concentration for the purpose of prolonging the shelf-life, and can also avoid imparting an unpleasant feel to the original flavor of the food or drink. These inventions can also suitably suppress the pungent, sour taste and sour odor of a food or drink that contains a relatively high concentration of acetic acid for seasoning or cooking purposes, or for intake purposes; and thus improves the ingestibility of the acetic acid-containing food or drink.

Moreover, the invention according to claim 18 can provide a method that can easily and reliably obtain an acetic acid-containing food or drink that exhibits suppressed sour taste and sour odor without adverse effects on the flavor.

Furthermore, the invention according to claim 19 can provide a method that can improve the quality of an acetic acid-containing food or drink by suppressing the sour taste and sour odor thereof without adverse effects on the flavor.

In addition, the inventions according to claims 15 and 16 can provide a preparation food or drink suitable for producing an acetic acid-containing cereal processed product, which is one aspect of the excellent acetic acid-containing food or drink.

DESCRIPTION OF EMBODIMENTS

The acetic acid-containing food or drink, the method for producing the same, the preparation food or drink for acetic acid-containing cereal processed products, and the method for improving the quality of the acetic acid-containing food or drink according to the present invention are described in detail below.

The acetic acid-containing food or drink of the present invention comprises at least one aromatic component selected from (A) and (B) below:

(A) unsaturated alcohols having 8 carbon atoms; and
(B) monoterpenes or sesquiterpenes.

In addition, the acetic acid-containing food or drink of the present invention further comprises at least one aromatic component selected from the group consisting of (C) and (D) below:

(C) furan compounds having 5 or 6 carbon atoms; and
(D) aliphatic aldehydes having 6 to 9 carbon atoms.

The "acetic acid-containing food or drink" of the present invention is roughly classified into two types (low-concentration acetic acid-containing foods or drinks and high-concentration acetic acid-containing foods or drinks) according to the concentration of acetic acid contained therein.

The low-concentration acetic acid-containing foods or drinks are acetic acid-containing foods or drinks that contain a relatively low concentration of acetic acid for the purpose of prolonging the shelf-life, and that have an acetic acid content of 0.015 mass % or more and less than 0.2 mass % when eating. From the standpoint of sufficiently exhibiting the effects of the present invention, the acetic acid content when eating is preferably 0.015 mass % or more and less than 0.1 mass %. The low-concentration acetic acid-containing foods or drinks refer to foods or drinks that require time from production or processing to eating. Specific examples include various prepared foods, such as ready-made rice, lunchboxes, and side dishes, as well as processed foods that require commercial sterility, such as seasonings.

In particular, the present invention is particularly preferably applied to cereal processed products, such as cooked rice and noodles containing acetic acid (acetic acid-containing cereal processed products). The reasons therefor are that the original flavor of the foods or drinks is relatively weak, the sour taste and sour odor are easily recognized as an odd flavor, and the effects of the present invention are more effective.

Furthermore, among the above cereal processed products, processed rice products (white rice, salted rice, red bean rice, okowa (sticky glutinous rice), cooked rice, mixed rice, rice balls, sushi rice, rice cakes, dumplings, etc.) are particularly preferable. Among the processed rice products, white rice and salted rice are the most preferable, because they add little flavor to rice itself. The reasons therefor are that the original flavor of the foods or drinks is particularly weak, the sour taste and sour odor are more easily recognized as an odd flavor, and when less flavor is added with seasonings, the original flavor of the rice is more strongly enhanced, and the effects of the present invention are most effective.

The present invention also includes a food or drink for producing an acetic acid-containing food or drink (hereinafter referred to as "preparation food or drink"). Specific examples thereof include acetic acid-containing seasonings used in the production of cooked rice and prepared foods, acetic acid-containing shelf-life improvers, and the like. The preparation food or drink of the present invention contains at least one member selected from the group consisting of unsaturated alcohols having 8 carbon atoms, which are the aromatic components (A), and monoterpenes or sesquiterpenes, which are the aromatic components (B). The contents of the aromatic components (A) and (B) in the preparation food or drink may be adjusted within the optimum concentration ranges described later as the contents in the acetic acid-containing food or drink.

Further, in the preparation food or drink, the content of at least one member selected from furan compounds having 5 or 6 carbon atoms, which are the aromatic components (C), or at least one member selected from aliphatic aldehydes having 6 to 9 carbon atoms, which are the aromatic components (D), is preferably adjusted within the optimum concentration range described later. It is more preferable that the contents of both of the aromatic components (C) and (D) are adjusted within the optimum concentration ranges described later.

The preparation food or drink may be in any foam, such as liquid, emulsified liquid, gel, foam, powder, or the like, and may be selected and adjusted as appropriate from the standpoint of the type of food ingredient to be applied and the usability. Further, the preparation food or drink may be one that can adjust the acetic acid content of a food or drink when eating after addition of the preparation food or drink to 0.015 mass % or more and less than 0.2 mass %. However, if the amount of the preparation food or drink added is overly small, it is considered that the expected effect cannot be achieved due to insufficient distribution in the food or drink to which the preparation food or drink is added. If the amount of the preparation food or drink added is overly large, it is considered that the food or drink to which the preparation food or drink is added is easily affected by the flavor and physical properties of the preparation food or drink itself, and that the original texture is spoiled. Therefore, it is preferable to adjust the acetic acid content of the preparation food or drink itself to 0.1 mass % or more and less than 20.0 mass %, and preferably 1.0% mass % or more and less than 15.0 mass %.

The high-concentration acetic acid-containing foods or drinks are foods or drinks that contain a relatively high concentration of acetic acid for the purpose of seasoning and cooking, or for the purpose of ingesting acetic acid, and that have an acetic acid content of 0.2 mass % or more and 5 mass % or less when eating. Specific examples include acidified foods or drinks containing a large amount of acetic acid, such as acetic acid-containing seasonings; seasonings having acidifying applications; foods or drinks cooked with vinegar; and foods or drinks consumed in large amounts at once, and eaten and drunk to enjoy the sour taste and to ingest acetic acid, such as acetic acid-containing drinks.

Examples of the high-concentration acetic acid-containing foods or drinks include cooked foods and drinks in which the taste of acetic acid is sufficiently effective, and seasonings for that purpose; however, preferable are seasonings that contain a large amount of vinegar or acetic acid to impart an acetic acid flavor. Specific examples thereof include vinegar; seasoning vinegar, such as nihaizu (vinegar and soy sauce mixed in roughly equal proportions), sanbaizu (vinegar, soy sauce and mirin (or sugar) mixed in roughly equal proportions), tosa-zu (vinegar flavored with bonito shavings, konbu kelp, sugar and soy sauce), and sushi vinegar; sauces, such as ketchup, Worcestershire sauce, and grilled meat sauce; dressings; and various seasonings, such as powder seasonings, seasonings for pickles, and seasonings for seafood. Further, examples of acetic acid-containing drinks include vinegar drinks. The reasons therefor are that although the sour taste is required, it is difficult to ingest if the pungency of the sour taste and sour odor is overly strong due to a large amount of acetic acid mixed or a large amount of intake at one time, which tends to cause the avoidance of intake, and that the effects of the present invention are effective. The acetic acid content of the acetic acid-containing food or drink may be measured according to the method for measuring the "acidity" of brewed vinegar stipulated in the Japanese Agricultural Standard. In addition, the acetic acid-containing food or drink may be in any foam, such as liquid, emulsified liquid, powder, or the like.

In order to exhibit the effects of the present invention, it is preferable to add, to the acetic acid-containing food or drink, at least one member selected from unsaturated alcohols having 8 carbon atoms, which are the aromatic components (A), and to add at least one member selected from monoterpenes or sesquiterpenes, which are the aromatic components (B).

In order to exhibit the effects of the present invention to suppress the sour taste and sour odor and to enhance the original flavor of the food or drink, the unsaturated alcohol having 8 carbon atoms, which is the aromatic component (A), may be contained, as the lower limit, so that the peak area ratio measured by solid-phase microextraction-gas chromatography-mass spectrometry is 1 ppm part or more with respect to 1 part of acetic acid. However, from the standpoint of the intensity of the effects, the peak area ratio is preferably 5 ppm parts or more, and more preferably 10 ppm parts or more. Further, as the upper limit of the aromatic component (A), the peak area ratio measured by solid-phase microextraction-gas chromatography-mass spectrometry may be 5 parts or less with respect to 1 part of acetic acid. However, from the standpoint of not adding the flavor of the aromatic component as much as possible, the peak area ratio is preferably 2.5 parts or less, and more preferably 1 part or less. As the content range of the aromatic component (A), the peak area ratio measured by solid-phase microextraction-gas chromatography-mass spectrometry is, for example, 1 ppm part or more and 5 parts or less, preferably 5 ppm parts or more and 5 parts or less, more preferably 5 ppm parts or more and 2.5 parts or less, even more preferably 10 ppm parts or more and 2.5 parts or less, and still even more preferably 10 ppm parts or more and 1 part or less, with respect to 1 part of acetic acid.

More specifically, the aromatic component (A) in foods and drinks that are produced or processed under conditions in which acetic acid vaporizes is preferably contained, as the lower limit, so that the peak area ratio measured by solid-phase microextraction-gas chromatography-mass spectrometry is 0.0001 parts or more with respect to 1 part of acetic acid. However, from the standpoint of the intensity of the effects, the peak area ratio is more preferably 0.0005 parts or more, and particularly preferably 0.001 parts or more. Further, as the upper limit of the aromatic component (A), the peak area ratio measured by solid-phase microextraction-gas chromatography-mass spectrometry may be 5 parts or less with respect to 1 part of acetic acid. However, from the standpoint of not adding the flavor of the aromatic component as much as possible, the peak area ratio is preferably 2.5 parts or less, and more preferably 1 part or less. As the content range of the aromatic component (A), the peak area ratio measured by solid-phase microextraction-gas chromatography-mass spectrometry is preferably 0.0001 parts or more and 5 parts or less, more preferably 0.0005 parts or more and 5 parts or less, even more preferably 0.0005 parts or more and 2.5 parts or less, still even more preferably 0.001 parts or more and 2.5 parts or less, and particularly preferably 0.001 parts or more and 1 part or less, with respect to 1 part of acetic acid. Examples of the "foods and drinks that are produced or processed under conditions in which acetic acid vaporizes" include foods and drinks that are heated at 90° C. or higher in an unsealed state in the cooking process, such as cooked rice and simmered dishes.

Further, the aromatic component (A) in foods and drinks that are not produced or processed under conditions in which acetic acid vaporizes (excluding the heating process performed on sealed containers, such as heating sterilization performed after a container is filled and sealed) is preferably contained, as the lower limit, so that the peak area ratio measured by solid-phase microextraction-gas chromatography-mass spectrometry is 1 ppm part or more with respect to 1 part of acetic acid. However, from the standpoint of the intensity of the effects, the peak area ratio is more preferably 5 ppm parts or more, and particularly preferably 10 ppm parts or more. Further, as the upper limit of the aromatic component (A), the peak area ratio measured by solid-phase microextraction-gas chromatography-mass spectrometry is preferably 0.1 parts or less with respect to 1 part of acetic acid. From the standpoint of not adding the flavor of the aromatic component as much as possible, the peak area ratio is more preferably 0.05 parts or less, and even more preferably 0.01 parts or less. As the content range of the aromatic component (A), the peak area ratio measured by solid-phase microextraction-gas chromatography-mass spectrometry is preferably 1 ppm part or more and 0.1 parts or less, more preferably 5 ppm parts or more and 0.1 parts or less, even more preferably 5 ppm parts or more and 0.05 parts or less, still even more preferably 10 ppm parts or more and 0.05 parts or less, and particularly preferably 10 ppm parts or more and 0.01 parts or less, with respect to 1 part of acetic acid. Examples of the "foods and drinks that are not produced or processed under conditions in which acetic acid vaporizes" include some seasoning vinegar and vinegar drinks, which are foods and drinks that are not heated in the production process, excluding heating in a sealed state, such as heat sterilization after filling.

The unsaturated alcohol having 8 carbon atom, which is the aromatic component (A), refers to an alcohol having 8 carbon atoms per molecule and having one or more carbon-carbon unsaturated bonds (except for a double bond, a triple bond, or an aromatic ring). A hydroxyl group may or may not be attached to the terminal carbon in the molecule, and the number of hydroxyl groups may be one or two or more. For example, alcohols having a molecular structure with one hydroxyl group attached to non-terminal carbon are preferable. Preferred specific examples of the unsaturated alcohol having 8 carbon atoms include 1-octen-3-ol (CAS number: 3391-86-4).

As the lower limit of the content of the 1-octen-3-ol in the acetic acid-containing food or drink, the peak area ratio measured by solid-phase microextraction-gas chromatography-mass spectrometry may be 1 ppm part or more with respect to 1 part of acetic acid. However, from the standpoint of the intensity of the effects, the peak area ratio is preferably 5 ppm parts or more, and more preferably 10 ppm parts or more. Further, as the upper limit of the content of the 1-octen-3-ol, the peak area ratio measured by solid-phase microextraction-gas chromatography-mass spectrometry may be 5 parts or less with respect to 1 part of acetic acid. However, from the standpoint of not adding the flavor of the aromatic component as much as possible, the peak area ratio is preferably 2.5 parts or less, and more preferably 1 part or less. As the content range of the 1-octen-3-ol, the peak area ratio measured by solid-phase microextraction-gas chromatography-mass spectrometry is, for example, 1 ppm part or more and 5 parts or less, preferably 5 ppm parts or more and 5 parts or less, more preferably 5 ppm parts or more and 2.5 parts or less, even more preferably 10 ppm parts or more and 2.5 parts or less, and still even more preferably 10 ppm parts or more and 1 part or less, with respect to 1 part of acetic acid.

More specifically, in the case of foods and drinks that are produced or processed under conditions in which acetic acid vaporizes, the 1-octen-3-ol is preferably contained, as the lower limit, so that the peak area ratio measured by solid-phase microextraction-gas chromatography-mass spectrometry is 0.0001 parts or more with respect to 1 part of acetic acid. However, from the standpoint of the intensity of the effects, the peak area ratio is more preferably 0.0005 parts or more, and particularly preferably 0.001 parts or more. Moreover, in the case of these foods and drinks, as the upper limit of the 1-octen-3-ol, the peak area ratio measured by solid-phase microextraction-gas chromatography-mass spectrometry is preferably 5 parts or less with respect to 1 part of acetic acid. However, from the standpoint of not adding the flavor of the aromatic component as much as possible, the peak area ratio is more preferably 2.5 parts or less, and even more preferably 1 part or less. As the content range of the 1-octen-3-ol, the peak area ratio measured by solid-phase microextraction-gas chromatography-mass spectrometry is preferably 0.0001 parts or more and 5 parts or less, more preferably 0.0005 parts or more and 5 parts or less, even more preferably 0.0005 parts or more and 2.5 parts or less, still even more preferably 0.001 parts or more and 2.5 parts or less, and particularly preferably 0.001 parts or more and 1 part or less, with respect to 1 part of acetic acid.

Furthermore, in the case of foods and drinks that are not produced or processed under conditions in which acetic acid vaporizes (excluding the heating process performed on sealed containers, such as heating sterilization performed after a container is filled and sealed), the 1-octen-3-ol is preferably contained, as the lower limit, so that the peak area ratio measured by solid-phase microextraction-gas chromatography-mass spectrometry is 1 ppm part or more with respect to 1 part of acetic acid. However, from the standpoint of the intensity of the effects, the peak area ratio is more preferably 5 ppm parts or more, and particularly preferably 10 ppm parts or more. Moreover, in the case of these foods and drinks, as the upper limit of the 1-octen-3-ol, the peak area ratio measured by solid-phase microextraction-gas chromatography-mass spectrometry is preferably 0.1 parts or less with respect to 1 part of acetic acid. However, from the standpoint of not adding the flavor of the aromatic component as much as possible, the peak area ratio is more preferably 0.05 parts or less, and even more preferably 0.01 parts or less. As the content range of the 1-octen-3-ol, the peak area ratio measured by solid-phase microextraction-gas chromatography-mass spectrometry is preferably 1 ppm part or more and 0.1 parts or less, more preferably 5 ppm parts or more and 0.1 parts or less, even more preferably 5 ppm parts or more and 0.05 parts or less, still even more preferably 10 ppm parts or more and 0.05 parts or less, and particularly preferably 10 ppm parts or more and 0.01 parts or less, with respect to 1 part of acetic acid.

In order to exhibit the effects of the present invention to suppress the sour taste and sour odor and to enhance the original flavor of the food or drink, the monoterpene or sesquiterpene, which is the aromatic component (B), may be contained, as the lower limit, so that the peak area ratio measured by solid-phase microextraction-gas chromatography-mass spectrometry is 1 ppm part or more with respect to 1 part of acetic acid. However, from the standpoint of the intensity of the effects, the peak area ratio is preferably 5 ppm parts or more, and more preferably 10 ppm parts or more. Further, as the upper limit of the aromatic component (B), the peak area ratio measured by solid-phase microextraction-gas chromatography-mass spectrometry may be 10 parts or less with respect to 1 part of acetic acid. However, from the standpoint of not adding the flavor of the aromatic component as much as possible, the peak area ratio is preferably 7.5 parts or less, and more preferably 5 parts or less. As the content range of the aromatic component (B), the peak area ratio measured by solid-phase microextraction-gas chromatography-mass spectrometry is, for example, 1 ppm part or more and 10 parts or less, preferably 5 ppm parts or more and 10 parts or less, more preferably 5 ppm parts or more and 7.5 parts or less, even more preferably 10 ppm parts or more and 7.5 parts or less, and still even more preferably 10 ppm parts or more and 5 parts or less, with respect to 1 part of acetic acid.

More specifically, in the case of foods and drinks that are produced or processed under conditions in which acetic acid vaporizes, the aromatic component (B) is preferably contained, as the lower limit, so that the peak area ratio measured by solid-phase microextraction-gas chromatography-mass spectrometry is 0.0001 parts or more with respect to 1 part of acetic acid. However, from the standpoint of the intensity of the effects, the peak area ratio is more preferably 0.0005 parts or more, and particularly preferably 0.001 parts or more. Moreover, in the case of these foods and drinks, as the upper limit of the aromatic component (B), the peak area ratio measured by solid-phase microextraction-gas chromatography-mass spectrometry is preferably 10 parts or less with respect to 1 part of acetic acid. However, from the standpoint of not adding the flavor of the aromatic component as much as possible, the peak area ratio is more preferably 7.5 parts or less, and even more preferably 5 parts or less. As the content range of the aromatic component (B), the peak area ratio measured by solid-phase microextraction-gas chromatography-mass spectrometry is preferably 0.0001 parts or more and 10 parts or less, more preferably 0.0005 parts or more and 10 parts or less, even more preferably 0.0005 parts or more and 7.5 parts or less, still even more preferably 0.001 parts or more and 7.5 parts or less, and particularly preferably 0.001 parts or more and 5 parts or less, with respect to 1 part of acetic acid.

Furthermore, in the case of foods and drinks that are not produced or processed under conditions in which acetic acid vaporizes (excluding the heating process performed on sealed containers, such as heating sterilization performed after a container is filled and sealed), the aromatic component (B) is preferably contained, as the lower limit, so that the peak area ratio measured by solid-phase microextraction-gas chromatography-mass spectrometry is 1 ppm or more with respect to 1 part of acetic acid. However, from the standpoint of the intensity of the effects, the peak area ratio is more preferably 5 ppm or more, and particularly preferably 10 ppm or more. Moreover, in the case of these foods and drinks, as the upper limit of the aromatic component (B), the peak area ratio measured by solid-phase microextraction-gas chromatography-mass spectrometry is preferably 1 part or less with respect to 1 part of acetic acid. However, from the standpoint of not adding the flavor of the aromatic component as much as possible, the peak area ratio is more preferably 0.5 parts or less, and even more preferably 0.1 parts or less. As the content range of the aromatic component (B), the peak area ratio measured by solid-phase microextraction-gas chromatography-mass spectrometry is preferably 1 ppm part or more and 1 part or less, more preferably 5 ppm parts or more and 1 part or less, even more preferably 5 ppm parts or more and 0.5 parts or less, still even more preferably 10 ppm parts or more and 0.5 parts or less, and particularly preferably 10 ppm parts or more and 0.1 parts or less, with respect to 1 part of acetic acid.

Examples of the aromatic component (B) include terpenes. According to the number of isoprene units, terpenes are classified as follows: hemiterpenes having 5 carbon atoms, monoterpenes having 10 carbon atoms, sesquiterpenes having 15 carbon atoms, diterpenes having 20 carbon atoms, sesterterpenes having 25 carbon atoms, triterpenes having 30 carbon atoms, sesquarterpenes having 35 carbon atoms, tetraterpenes having 40 carbon atoms, and the like. Examples of terpenes suitable in the present invention include those having 2 or fewer isoprene units, further 1.5 or fewer isoprene units, and more specifically include monoterpenes and sesquiterpenes. Monoterpenes may have any of an acyclic structure, a monocyclic structure, and a bicyclic structure; however, monoterpenes having a monocyclic structure are preferable. Sesquiterpenes may have any of an acyclic structure, a monocyclic structure, and a polycyclic structure.

Preferred specific examples of the monoterpenes or sesquiterpenes, which are the aromatic components (B), include limonene (CAS number: 5989-27-5 (d-limonene), 5989-54-8 (l-limonene), 138-86-3 ((−)-limonene)), terpinene (99-86-5 (α-terpinene), 99-84-3 (β-terpinene), 99-85-4 (γ-terpinene), and 586-62-9 (δ-terpinene)), p-cymene (CAS number: 99-87-6, 25155-15-1), muurolol (CAS number: 19912-62-0 (i-muurolol) and 19435-97-3 (α-muurolol)), and cadalene (CAS number: 483-78-3).

As the lower limit of the content of each of the limonene, terpinene, and p-cymene in the acetic acid-containing food or drink, the peak area ratio measured by solid-phase microextraction-gas chromatography-mass spectrometry may be 1 ppm part or more with respect to 1 part of acetic acid. However, from the standpoint of the intensity of the effects, the peak area ratio is preferably 5 ppm parts or more, and more preferably 10 ppm parts or more. Further, as the upper limit of the content of each of the limonene, terpinene, and p-cymene, the peak area ratio measured by solid-phase microextraction-gas chromatography-mass spectrometry may be 5 parts or less with respect to 1 part of acetic acid. However, from the standpoint of not adding the flavor of the aromatic component as much as possible, the peak area ratio is preferably 2.5 parts or less, and more preferably 1 part or less. As the content range of each of the limonene, terpinene, and p-cymene, the peak area ratio measured by solid-phase microextraction-gas chromatography-mass spectrometry is, for example, 1 ppm part or more and 5 parts or less, preferably 5 ppm parts or more and 5 parts or less, more preferably 5 ppm parts or more and 2.5 parts or less, even more preferably 10 ppm parts or more and 2.5 parts or less, and still even more preferably 10 ppm parts or more and 1 part or less, with respect to 1 part of acetic acid.

More specifically, in the case of foods and drinks that are produced or processed under conditions in which acetic acid vaporizes, each of the limonene, terpinene, and p-cymene is preferably contained, as the lower limit, so that the peak area ratio measured by solid-phase microextraction-gas chromatography-mass spectrometry is 0.0001 parts or more with respect to 1 part of acetic acid. However, from the standpoint of the intensity of the effects, the peak area ratio is more preferably 0.0005 parts or more, and particularly preferably 0.001 parts or more. Moreover, in the case of these foods and drinks, as the upper limit of each of the limonene, terpinene, and p-cymene, the peak area ratio measured by solid-phase microextraction-gas chromatography-mass spectrometry is preferably 5 parts or less with respect to 1 part of acetic acid. However, from the standpoint of not adding the flavor of the aromatic component as much as possible, the peak area ratio is more preferably 2.5 parts or less, and even more preferably 1 part or less. As the content range of each of the limonene, terpinene, and p-cymene, the peak area ratio measured by solid-phase microextraction-gas chromatography-mass spectrometry is preferably 0.0001 parts or more and 5 parts or less, more preferably 0.0005 parts or more and 5 parts or less, even more preferably 0.0005 parts or more and 2.5 parts or less, still even more preferably 0.001 parts or more and 2.5 parts or less, and particularly preferably 0.001 parts or more and 1 part or less, with respect to 1 part of acetic acid.

Furthermore, in the case of foods and drinks that are not produced or processed under conditions in which acetic acid vaporizes (excluding the heating process performed on sealed containers, such as heating sterilization performed after a container is filled and sealed), each of the limonene, terpinene, and p-cymene is preferably contained, as the lower limit, so that the peak area ratio measured by solid-phase microextraction-gas chromatography-mass spectrometry is 1 ppm part or more with respect to 1 part of acetic acid. However, from the standpoint of the intensity of the effects, the peak area ratio is more preferably 5 ppm parts or more, and particularly preferably 10 ppm or more. Moreover, in the case of these foods and drinks, as the upper limit of each of the limonene, terpinene, and p-cymene, the peak area ratio measured by solid-phase microextraction-gas chromatography-mass spectrometry is preferably 0.1 parts or less with respect to 1 part of acetic acid. However, from the standpoint of not adding the flavor of the aromatic component as much as possible, the peak area ratio is more preferably 0.05 parts or less, and even more preferably 0.01 parts or less. As the content range of each of the limonene, terpinene, and p-cymene, the peak area ratio measured by solid-phase microextraction-gas chromatography-mass spectrometry is preferably 1 ppm part or more and 0.1 parts or less, more preferably 5 ppm parts or more and 0.1 parts or less, even more preferably 5 ppm parts or more and 0.05 parts or less, still even more preferably 10 ppm parts or more and 0.05 parts or less, and particularly preferably 10 ppm parts or more and 0.01 parts or less, with respect to 1 part of acetic acid.

As the lower limit of the content of each of the muurolol and cadalene in the acetic acid-containing food or drink, the peak area ratio measured by solid-phase microextraction-gas chromatography-mass spectrometry may be 1 ppm part or more with respect to 1 part of acetic acid. However, from the standpoint of the intensity of the effects, the peak area ratio is preferably 5 ppm parts or more, and more preferably 10 ppm parts or more. Further, as the upper limit of the content of each of the muurolol and cadalene in the acetic acid-containing food or drink, the peak area ratio measured by solid-phase microextraction-gas chromatography-mass spectrometry may be 10 parts or less with respect to 1 part of acetic acid. However, from the standpoint of not adding the flavor of the aromatic component as much as possible, the peak area ratio is preferably 7.5 parts or less, and more preferably 5 parts or less. As the content range of each of the muurolol and cadalene, the peak area ratio measured by solid-phase microextraction-gas chromatography-mass spectrometry is, for example, 1 ppm part or more and 10 parts or less, preferably 5 ppm parts or more and 10 parts or less, more preferably 5 ppm parts or more and 7.5 parts or less, even more preferably 10 ppm parts or more and 7.5 parts or less, and still even more preferably 10 ppm parts or more and 5 parts or less, with respect to 1 part of acetic acid.

More specifically, in the case of foods and drinks that are produced or processed under conditions in which acetic acid vaporizes, each of the muurolol and cadalene is preferably contained, as the lower limit, so that the peak area ratio measured by solid-phase microextraction-gas chromatography-mass spectrometry is 0.001 parts or more with respect to 1 part of acetic acid. However, from the standpoint of the intensity of the effects, the peak area ratio is more preferably 0.005 parts or more, and particularly preferably 0.01 parts or more. Moreover, in the case of these foods and drinks, as the upper limit of the content of each of the muurolol and cadalene, the peak area ratio measured by solid-phase microextraction-gas chromatography-mass spectrometry is preferably 10 parts or less with respect to 1 part of acetic acid. However, from the standpoint of not adding the flavor of the aromatic component as much as possible, the peak area ratio is more preferably 7.5 parts or less, and even more preferably 5 parts or less. As the content range of each of the muurolol and cadalene, the peak area ratio measured by solid-phase microextraction-gas chromatography-mass spectrometry is preferably 0.001 parts or more and 10 parts or less, more preferably 0.005 parts or more and 10 parts or less, even more preferably 0.005 parts or more and 7.5 parts or less, still even more preferably 0.01 parts or more and 7.5 parts or less, and particularly preferably 0.01 parts or more and 5 parts or less, with respect to 1 part of acetic acid.

Furthermore, in the case of foods and drinks that are not produced or processed under conditions in which acetic acid vaporizes (excluding the heating process performed on sealed containers, such as heating sterilization performed after a container is filled and sealed), each of the muurolol and cadalene is preferably contained, as the lower limit, so that the peak area ratio measured by solid-phase microextraction-gas chromatography-mass spectrometry is 1 ppm part or more with respect to 1 part of acetic acid. However, from the standpoint of the intensity of the effects, the peak area ratio is more preferably 5 ppm parts or more, and particularly preferably 10 ppm parts or more. Moreover, in the case of these foods and drinks, as the upper limit of each of the muurolol and cadalene, the peak area ratio measured by solid-phase microextraction-gas chromatography-mass spectrometry is preferably 1 part or less with respect to 1 part of acetic acid. However, from the standpoint of not adding the flavor of the aromatic component as much as possible, the peak area ratio is more preferably 0.5 parts or less, and even more preferably 0.1 parts or less. As the content range of each of the muurolol and cadalene, the peak area ratio measured by solid-phase microextraction-gas chromatography-mass spectrometry is preferably 1 ppm part or more and 1 part or less, more preferably 5 ppm parts or more and 1 part or less, even more preferably 5 ppm parts or more and 0.5 parts or less, still even more preferably 10 ppm parts or more and 0.5 parts or less, and particularly preferably 10 ppm parts or more and 0.1 parts or less, with respect to 1 part of acetic acid.

In order to exhibit the effects of the present invention to suppress the sour taste and sour odor and to enhance the original flavor of the food or drink, it is sufficient that the acetic acid-containing food or drink contains only one of the aromatic components (A) and (B); however, in order to more reliably exhibit the effects of the present invention, it is preferable that the aromatic components (A) and (B) are both contained.

Further, in order to even more reliably exhibit the effects of the present invention to suppress the sour taste and sour odor and to enhance the original flavor of the food or drink, it is preferable to further contain, in addition to the aromatic components (A) and/or (B), at least one member selected from furan compounds having 5 or 6 carbon atoms, which are the aromatic components (C), and/or at least one member selected from aliphatic aldehydes having 6 to 9 carbon atoms, which are the aromatic components (D).

The furan compound having 5 or 6 carbon atoms, which is the aromatic component (C), refers to a heterocyclic aromatic compound that has a furan ring composed of four carbon atoms and one oxygen atom, and that has a structure in which one or two carbon atom-containing groups are attached to the furan ring. Preferred specific examples of the aromatic component (C) include furfural (CAS number: 98-01-1), furfuryl alcohol (CAS number: 98-00-0), 2-acetylfuran (CAS number: 1192-62-7), 3-methylfuran (CAS number: 930-27-8), 2-methylfuran (CAS number: 534-22-5), and 2-(5H)-furanone (CAS number: 497-23-4). The acetic acid-containing food or drink may contain one or two or more furan compounds having 5 or 6 carbon atoms among the above specific examples.

Specific examples of the aliphatic aldehyde having 6 to 9 carbon atoms, which is the aromatic component (D), include hexanal (CAS number: 66-25-1), heptanal (CAS number: 111-71-7), octanal (CAS number: 124-13-0), and nonanal (CAS number: 124-19-6). The acetic acid-containing food or drink may contain one or two or more aliphatic aldehydes having 6 to 9 carbon atoms among the above specific examples.

Further, it is more preferable that the aromatic components (C) and (D) are both contained, in addition to the aromatic components (A) and/or (B).

More specifically, it is more preferable to contain at least one member selected from the group consisting of furfural, furfuryl alcohol, 2-acetylfuran, 3-methylfuran, 2-methylfuran, and 2-(5H)-furanone, which are the aromatic components (C), and at least one member selected from the group consisting of hexanal, heptanal, octanal, and nonanal, which are the aromatic components (D).

In order to exhibit the effects of the present invention to suppress the sour taste and sour odor and to enhance the original flavor of the food or drink, the furan compound having 5 or 6 carbon atoms, which is the aromatic component (C), may be contained, as the lower limit, so that the peak area ratio measured by solid-phase microextraction-gas chromatography-mass spectrometry is 1 ppm part or more with respect to 1 part of acetic acid. However, from the standpoint of the intensity of the effects, the peak area ratio is preferably 5 ppm parts or more, and more preferably 10 ppm parts or more. Further, as the upper limit of the aromatic component (C), the peak area ratio measured by solid-phase microextraction-gas chromatography-mass spectrometry may be 15 parts or less with respect to 1 part of acetic acid. However, from the standpoint of not adding the flavor of the aromatic component as much as possible, the peak area ratio is preferably 12.5 parts or less, and more preferably 10 parts or less. As the content range of the aromatic component (C), the peak area ratio measured by solid-phase microextraction-gas chromatography-mass spectrometry is, for example, 1 ppm part or more and 15 parts or less, preferably 5 ppm parts or more and 15 parts or less, more preferably 5 ppm parts or more and 12.5 parts or less, even more preferably 10 ppm parts or more and 12.5 parts or less, and still even more preferably 10 ppm parts or more and 10 parts or less, with respect to 1 part of acetic acid.

More specifically, in the case of foods and drinks that are produced or processed under conditions in which acetic acid vaporizes, the aromatic component (C) is preferably contained, as the lower limit, so that the peak area ratio measured by solid-phase microextraction-gas chromatography-mass spectrometry is 0.0001 parts or more with respect to 1 part of acetic acid. However, from the standpoint of the intensity of the effects, the peak area ratio is more preferably 0.0005 parts or more, and particularly preferably 0.001 parts or more. Moreover, in the case of these foods and drinks, as the upper limit of the aromatic component (C), the peak area ratio measured by solid-phase microextraction-gas chromatography-mass spectrometry is preferably 15 parts or less with respect to 1 part of acetic acid. However, from the standpoint of not adding the flavor of the aromatic component as much as possible, the peak area ratio is more preferably 12.5 parts or less, and even more preferably 10 parts or less. As the content range of the aromatic component (C), the peak area ratio measured by solid-phase microextraction-gas chromatography-mass spectrometry is preferably 0.0001 parts or more and 15 parts or less, more preferably 0.0005 parts or more and 15 parts or less, even more preferably 0.0005 parts or more and 12.5 parts or less, still even more preferably 0.001 parts or more and 12.5 parts or less, and particularly preferably 0.001 parts or more and 10 parts or less, with respect to 1 part of acetic acid.

Furthermore, in the case of foods and drinks that are not produced or processed under conditions in which acetic acid vaporizes (excluding the heating process performed on sealed containers, such as heating sterilization performed after a container is filled and sealed), the aromatic component (C) is preferably contained, as the lower limit, so that the peak area ratio measured by solid-phase microextraction-gas chromatography-mass spectrometry is 1 ppm part or more with respect to 1 part of acetic acid. However, from the standpoint of the intensity of the effects, the peak area ratio is more preferably 5 ppm parts or more, and particularly preferably 10 ppm parts or more. Moreover, in the case of these foods and drinks, as the upper limit of the aromatic component (C), the peak area ratio measured by solid-phase microextraction-gas chromatography-mass spectrometry is preferably 5 parts or less with respect to 1 part of acetic acid. However, from the standpoint of not adding the flavor of the aromatic component as much as possible, the peak area ratio is more preferably 2.5 parts or less, and even more preferably 1 part or less. As the content range of the aromatic component (C), the peak area ratio measured by solid-phase microextraction-gas chromatography-mass spectrometry is preferably 1 ppm part or more and 5 parts or less, more preferably 5 ppm parts or more and 5 parts or less, even more preferably 5 ppm parts or more and 2.5 parts or less, still even more preferably 10 ppm parts or more and 2.5 parts or less, and particularly preferably 10 ppm parts or more and 1 part or less, with respect to 1 part of acetic acid.

The aromatic component (C) is preferably furfural, furfuryl alcohol, 2-acetylfuran, 3-methylfuran, 2-methylfuran, or 2-(5H)-furanone.

As the lower limit of the furfural, the peak area ratio measured by solid-phase microextraction-gas chromatography-mass spectrometry may be 0.0001 parts or more with respect to 1 part of acetic acid. However, from the standpoint of the intensity of the effects, the peak area ratio is preferably 0.0005 parts or more, and more preferably 0.001 parts or more. Further, as the upper limit of the furfural, the peak area ratio measured by solid-phase microextraction-gas chromatography-mass spectrometry may be 5 parts or less with respect to 1 part of acetic acid. However, from the standpoint of not adding the flavor of the aromatic component as much as possible, the peak area ratio is preferably 2.5 parts or less, and more preferably 1 part or less. As the content range of the furfural, the peak area ratio measured by solid-phase microextraction-gas chromatography-mass spectrometry is, for example, 0.0001 parts or more and 5 parts or less, preferably 0.0005 parts or more and 5 parts or less, more preferably 0.0005 parts or more and 2.5 parts or less, even more preferably 0.001 parts or more and 2.5 parts or less, and still even more preferably 0.001 parts or more and 1 part or less, with respect to 1 part of acetic acid.

More specifically, in the case of foods and drinks that are produced or processed under conditions in which acetic acid vaporizes, as the lower limit of the furfural content, the peak area ratio measured by solid-phase microextraction-gas chromatography-mass spectrometry is preferably 0.0001 parts or more with respect to 1 part of acetic acid. However, from the standpoint of the intensity of the effects, the peak area ratio is more preferably 0.0005 parts or more, and particularly preferably 0.001 parts or more. Moreover, in the case of these foods and drinks, as the upper limit of the furfural, the peak area ratio measured by solid-phase microextraction-gas chromatography-mass spectrometry may be 5 parts or less with respect to 1 part of acetic acid. However, from the standpoint of not adding the flavor of the aromatic component as much as possible, the peak area ratio is preferably 2.5 parts or less, and more preferably 1 part or less. As the content range of the furfural, the peak area ratio measured by solid-phase microextraction-gas chromatography-mass spectrometry is preferably 0.0001 parts or more and 5 parts or less, more preferably 0.0005 parts or more and 5 parts or less, even more preferably 0.0005 parts or more and 2.5 parts or less, still even more preferably 0.001 parts or more and 2.5 parts or less, and particularly preferably 0.001 parts or more and 1 part or less, with respect to 1 part of acetic acid.

Furthermore, in the case of foods and drinks that are not produced or processed under conditions in which acetic acid vaporizes (excluding the heating process performed on sealed containers, such as heating sterilization performed after a container is filled and sealed), as the lower limit of the furfural, the peak area ratio measured by solid-phase microextraction-gas chromatography-mass spectrometry is preferably 0.0001 parts or more with respect to 1 part of acetic acid. However, from the standpoint of the intensity of the effects, the peak area ratio is more preferably 0.0005 parts or more, and particularly preferably 0.001 parts or more. Further, as the upper limit of the furfural, the peak area ratio measured by solid-phase microextraction-gas chromatography-mass spectrometry may be 5 parts or less with respect to 1 part of acetic acid. However, from the standpoint of not adding the flavor of the aromatic component as much as possible, the peak area ratio is preferably 2.5 parts or less, and more preferably 1 part or less. As the content range of the furfural, the peak area ratio measured by solid-phase microextraction-gas chromatography-mass spectrometry is preferably 0.0001 parts or more and 5 parts or less, more preferably 0.0005 parts or more and 5 parts or less, even more preferably 0.0005 parts or more and 2.5 parts or less, still even more preferably 0.001 parts or more and 2.5 parts or less, and particularly preferably 0.001 parts or more and 1 part or less, with respect to 1 part of acetic acid.

As the lower limit of the furfuryl alcohol, the peak area ratio measured by solid-phase microextraction-gas chromatography-mass spectrometry may be 10 ppm parts or more with respect to 1 part of acetic acid. However, from the standpoint of the intensity of the effects, the peak area ratio is preferably 50 ppm parts or more, and more preferably 0.0001 parts or more. Further, as the upper limit of the furfuryl alcohol, the peak area ratio measured by solid-phase microextraction-gas chromatography-mass spectrometry may be 15 parts or less with respect to 1 part of acetic acid. However, from the standpoint of not adding the flavor of the aromatic component as much as possible, the peak area ratio is preferably 12.5 parts or less, and more preferably 10 parts or less. As the content range of the furfuryl alcohol, the peak area ratio measured by solid-phase microextraction-gas chromatography-mass spectrometry is, for example, 10 ppm parts or more and 15 parts or less, preferably 50 ppm parts or more and 15 parts or less, more preferably 50 ppm parts or more and 12.5 parts or less, even more preferably 0.0001 parts or more and 12.5 parts or less, and still even more preferably 0.0001 parts or more and 10 parts or less, with respect to 1 part of acetic acid.

More specifically, in the case of foods and drinks that are produced or processed under conditions in which acetic acid vaporizes, as the lower limit of the furfuryl alcohol, the peak area ratio measured by solid-phase microextraction-gas chromatography-mass spectrometry is preferably 0.001 parts or more with respect to 1 part of acetic acid. However, from the standpoint of the intensity of the effects, the peak area ratio is more preferably 0.005 parts or more, and particularly preferably 0.01 parts or more. Further, as the upper limit of the furfuryl alcohol, the peak area ratio measured by solid-phase microextraction-gas chromatography-mass spectrometry may be 15 parts or less with respect to 1 part of acetic acid. However, from the standpoint of not adding the flavor of the aromatic component as much as possible, the peak area ratio is preferably 12.5 parts or less, and more preferably 10 parts or less. As the content range of the furfuryl alcohol, the peak area ratio measured by solid-phase microextraction-gas chromatography-mass spectrometry is preferably 0.001 parts or more and 15 parts or less, more preferably 0.005 parts or more and 15 parts or less, even more preferably 0.005 parts or more and 12.5 parts or less, still even more preferably 0.01 parts or more and 12.5 parts or less, and particularly preferably 0.01 parts or more and 10 parts or less, with respect to 1 part of acetic acid.

Furthermore, in the case of foods and drinks that are not produced or processed under conditions in which acetic acid vaporizes (excluding the heating process performed on sealed containers, such as heating sterilization performed after a container is filled and sealed), as the lower limit of the furfuryl alcohol, the peak area ratio measured by solid-phase microextraction-gas chromatography-mass spectrometry is preferably 10 ppm parts or more with respect to 1 part of acetic acid. However, from the standpoint of the intensity of the effects, the peak area ratio is more preferably 50 ppm parts or more, and particularly preferably 0.0001 parts or more. Further, as the upper limit of the furfuryl alcohol, the peak area ratio measured by solid-phase microextraction-gas chromatography-mass spectrometry may be 5 parts or less with respect to 1 part of acetic acid. However, from the standpoint of not adding the flavor of the aromatic component as much as possible, the peak area ratio is preferably 2.5 parts or less, and more preferably 1 part or less. As the content range of the furfuryl alcohol, the peak area ratio measured by solid-phase microextraction-gas chromatography-mass spectrometry is preferably 10 ppm parts or more and 5 parts or less, more preferably 50 ppm parts or more and 5 parts or less, even more preferably 50 ppm parts or more and 2.5 parts or less, still even more preferably 0.0001 parts or more and 2.5 parts or less, and particularly preferably 0.0001 parts or more and 1 part or less, with respect to 1 part of acetic acid.

As the lower limit of the 2-acetylfuran, the peak area ratio measured by solid-phase microextraction-gas chromatography-mass spectrometry may be 10 ppm parts or more with respect to 1 part of acetic acid. However, from the standpoint of the intensity of the effects, the peak area ratio is preferably 50 ppm parts or more, and more preferably 0.0001 parts or more. Further, as the upper limit of the 2-acetylfuran, the peak area ratio measured by solid-phase microextraction-gas chromatography-mass spectrometry may be 15 parts or less with respect to 1 part of acetic acid. However, from the standpoint of not adding the flavor of the aromatic component as much as possible, the peak area ratio is preferably 12.5 parts or less, and more preferably 10 parts or less. As the content range of the 2-acetylfuran, the peak area ratio measured by solid-phase microextraction-gas chromatography-mass spectrometry is, for example, 10 ppm parts or more and 15 parts or less, preferably 50 ppm parts or more and 15 parts or less, more preferably 50 ppm parts or more and 12.5 parts or less, even more preferably 0.0001 parts or more and 12.5 parts or less, and still even more preferably 0.0001 parts or more and 10 parts or less, with respect to 1 part of acetic acid.

More specifically, in the case of foods and drinks that are produced or processed under conditions in which acetic acid vaporizes, as the lower limit of the 2-acetylfuran, the peak area ratio measured by solid-phase microextraction-gas chromatography-mass spectrometry is preferably 0.0001 parts or more with respect to 1 part of acetic acid. However, from the standpoint of the intensity of the effects, the peak area ratio is more preferably 0.0005 parts or more, and particularly preferably 0.001 parts or more. Further, as the upper limit of the 2-acetylfuran, the peak area ratio measured by solid-phase microextraction-gas chromatography-mass spectrometry may be 15 parts or less with respect to 1 part of acetic acid. However, from the standpoint of not adding the flavor of the aromatic component as much as possible, the peak area ratio is preferably 12.5 parts or less, and more preferably 10 parts or less. As the content range of the 2-acetylfuran, the peak area ratio measured by solid-phase microextraction-gas chromatography-mass spectrometry is preferably 0.0001 parts or more and 15 parts or less, more preferably 0.0005 parts or more and 15 parts or less, even more preferably 0.0005 parts or more and 12.5 parts or less, still even more preferably 0.001 parts or more and 12.5 parts or less, and particularly preferably 0.001 parts or more and 10 parts or less, with respect to 1 part of acetic acid.

Furthermore, in the case of foods and drinks that are not produced or processed under conditions in which acetic acid vaporizes (excluding the heating process performed on sealed containers, such as heating sterilization performed after a container is filled and sealed), as the lower limit of the 2-acetylfuran, the peak area ratio measured by solid-phase microextraction-gas chromatography-mass spectrometry is preferably 10 ppm parts or more with respect to 1 part of acetic acid. However, from the standpoint of the intensity of the effects, the peak area ratio is more preferably 50 ppm parts or more, and particularly preferably 0.0001 parts or more. Further, as the upper limit of the 2-acetylfuran, the peak area ratio measured by solid-phase microextraction-gas chromatography-mass spectrometry may be 1 part or less with respect to 1 part of acetic acid. However, from the standpoint of not adding the flavor of the aromatic component as much as possible, the peak area ratio is preferably 0.5 parts or less, and more preferably 0.1 parts or less. As the content range of the 2-acetylfuran, the peak area ratio measured by solid-phase microextraction-gas chromatography-mass spectrometry is preferably 10 ppm parts or more and 1 part or less, more preferably 50 ppm parts or more and 1 part or less, even more preferably 50 ppm parts or more and 0.5 parts or less, still even more preferably 0.0001 parts or more and 0.5 parts or less, and particularly preferably 0.0001 parts or more and 0.1 parts or less, with respect to 1 part of acetic acid.

As the lower limit of each of the 3-methylfuran, 2-methylfuran, and 2-(5H)-furanone, the peak area ratio measured by solid-phase microextraction-gas chromatography-mass spectrometry may be 1 ppm part or more with respect to 1 part of acetic acid. However, from the standpoint of the intensity of the effects, the peak area ratio is preferably 5 ppm parts or more, and more preferably 10 ppm parts or more. Further, as the upper limit of each of the 3-methylfuran, 2-methylfuran, and 2-(5H)-furanone, the peak area ratio measured by solid-phase microextraction-gas chromatography-mass spectrometry may be 15 parts or less with respect to 1 part of acetic acid. However, from the standpoint of not adding the flavor of the aromatic component as much as possible, the peak area ratio is preferably 12.5 parts or less, and more preferably 10 parts or less. As the content range of each of the 3-methylfuran, 2-methylfuran, and 2-(5H)-furanone, the peak area ratio measured by solid-phase microextraction-gas chromatography-mass spectrometry is, for example, 1 ppm part or more and 15 parts or less, preferably 5 ppm parts or more and 15 parts or less, more preferably 5 ppm parts or more and 12.5 parts or less, even more preferably 10 ppm parts or more and 12.5 parts or less, and still even more preferably 10 ppm parts or more and 10 parts or less, with respect to 1 part of acetic acid.

More specifically, in the case of foods and drinks that are produced or processed under conditions in which acetic acid vaporizes, as the lower limit of each of the 3-methylfuran, 2-methylfuran, and 2-(5H)-furanone, the peak area ratio measured by solid-phase microextraction-gas chromatography-mass spectrometry is preferably 0.0001 parts or more with respect to 1 part of acetic acid. However, from the standpoint of the intensity of the effects, the peak area ratio is more preferably 0.0005 parts or more, and particularly preferably 0.001 parts or more. Further, as the upper limit of each of the 3-methylfuran, 2-methylfuran, and 2-(5H)-furanone, the peak area ratio measured by solid-phase microextraction-gas chromatography-mass spectrometry may be 15 parts or less with respect to 1 part of acetic acid. However, from the standpoint of not adding the flavor of the aromatic component as much as possible, the peak area ratio is preferably 12.5 parts or less, and more preferably 10 parts or less. As the content range of each of the 3-methylfuran, 2-methylfuran, and 2-(5H)-furanone, the peak area ratio measured by solid-phase microextraction-gas chromatography-mass spectrometry is preferably 0.0001 parts or more and 15 parts or less, more preferably 0.0005 parts or more and 15 parts or less, even more preferably 0.0005 parts or more and 12.5 parts or less, still even more preferably 0.001 parts or more and 12.5 parts or less, and particularly preferably 0.001 parts or more and 10 parts or less, with respect to 1 part of acetic acid.

Furthermore, in the case of foods and drinks that are not produced or processed under conditions in which acetic acid vaporizes (excluding the heating process performed on sealed containers, such as heating sterilization performed after a container is filled and sealed), as the lower limit of each of the 3-methylfuran, 2-methylfuran, and 2-(5H)-furanone, the peak area ratio measured by solid-phase microextraction-gas chromatography-mass spectrometry is preferably 1 ppm part or more with respect to 1 part of acetic acid. However, from the standpoint of the intensity of the effects, the peak area ratio is more preferably 5 ppm parts or more, and particularly preferably 10 ppm parts or more. Further, as the upper limit of each of the 3-methylfuran, 2-methylfuran, and 2-(5H)-furanone, the peak area ratio measured by solid-phase microextraction-gas chromatography-mass spectrometry may be 0.1 parts or less with respect to 1 part of acetic acid. However, from the standpoint of not adding the flavor of the aromatic component as much as possible, the peak area ratio is preferably 0.05 parts or less, and more preferably 0.01 parts or less. As the content range of each of the 3-methylfuran, 2-methylfuran, and 2-(5H)-furanone, the peak area ratio measured by solid-phase microextraction-gas chromatography-mass spectrometry is preferably 1 ppm part or more and 0.1 parts or less, more preferably 5 ppm parts or more and 0.1 parts or less, even more preferably 5 ppm parts or more and 0.05 parts or less, still even more preferably 10 ppm parts or more and 0.05 parts or less, and particularly preferably 10 ppm parts or more and 0.01 parts or less, with respect to 1 part of acetic acid.

In order to exhibit the effects of the present invention to suppress the sour taste and sour odor and to enhance the original flavor of the food or drink, the aliphatic aldehyde having 6 to 9 carbon atoms, which is the aromatic component (D), may be contained, as the lower limit, so that the peak area ratio measured by solid-phase microextraction-gas chromatography-mass spectrometry is 1 ppm part or more with respect to 1 part of acetic acid. However, from the standpoint of the intensity of the effects, the peak area ratio is preferably 5 ppm parts or more, and more preferably 10 ppm parts or more. Further, as the upper limit of the aromatic component (D), the peak area ratio measured by solid-phase microextraction-gas chromatography-mass spectrometry may be 15 parts or less with respect to 1 part of acetic acid. However, from the standpoint of not adding the flavor of the aromatic component as much as possible, the peak area ratio is preferably 12.5 parts or less, and more preferably 10 parts or less. As the content range of the aromatic component (D), the peak area ratio measured by solid-phase microextraction-gas chromatography-mass spectrometry is, for example, 1 ppm part or more and 15 parts or less, preferably 5 ppm parts or more and 15 parts or less, more preferably 5 ppm parts or more and 12.5 parts or less, even more preferably 10 ppm parts or more and 12.5 parts or less, and still even more preferably 10 ppm parts or more and 10 parts or less, with respect to 1 part of acetic acid.

More specifically, in the case of foods and drinks that are produced or processed under conditions in which acetic acid vaporizes, the aromatic component (D) is preferably contained, as the lower limit, so that the peak area ratio measured by solid-phase microextraction-gas chromatography-mass spectrometry is 0.0001 parts or more with respect to 1 part of acetic acid. However, from the standpoint of the intensity of the effects, the peak area ratio is more preferably 0.0005 parts or more, and particularly preferably 0.001 parts or more. Further, as the upper limit of the aromatic component (D), the peak area ratio measured by solid-phase microextraction-gas chromatography-mass spectrometry may be 15 parts or less with respect to 1 part of acetic acid. However, from the standpoint of not adding the flavor of the aromatic component as much as possible, the peak area ratio is preferably 12.5 parts or less, and more preferably 10 parts or less. As the content range of the aromatic component (D), the peak area ratio measured by solid-phase microextraction-gas chromatography-mass spectrometry is preferably 0.0001 parts or more and 15 parts or less, more preferably 0.0005 parts or more and 15 parts or less, even more preferably 0.0005 parts or more and 12.5 parts or less, still even more preferably 0.001 parts or more and 12.5 parts or less, and particularly preferably 0.001 parts or more and 10 parts or less, with respect to 1 part of acetic acid.

Furthermore, in the case of foods and drinks that are not produced or processed under conditions in which acetic acid vaporizes (excluding the heating process performed on sealed containers, such as heating sterilization performed after a container is filled and sealed), the aromatic component (D) is preferably contained, as the lower limit, so that the peak area ratio measured by solid-phase microextraction-gas chromatography-mass spectrometry is 1 ppm part or more with respect to 1 part of acetic acid. However, from the standpoint of the intensity of the effects, the peak area ratio is more preferably 5 ppm parts or more, and particularly preferably 10 ppm parts or more. Further, as the upper limit of the aromatic component (D), the peak area ratio measured by solid-phase microextraction-gas chromatography-mass spectrometry may be 1 part or less with respect to 1 part of acetic acid. However, from the standpoint of not adding the flavor of the aromatic component as much as possible, the peak area ratio is preferably 0.5 parts or less, and more preferably 0.1 parts or less. As the content range of the aromatic component (D), the peak area ratio measured by solid-phase microextraction-gas chromatography-mass spectrometry is preferably 1 ppm part or more and 1 part or less, more preferably 5 ppm parts or more and 1 part or less, even more preferably 5 ppm parts or more and 0.5 parts or less, still even more preferably 10 ppm parts or more and 0.5 parts or less, and particularly preferably 10 ppm parts or more and 0.1 parts or less, with respect to 1 part of acetic acid.

The aromatic component (D) is preferably hexanal, heptanal, octanal, or nonanal.

As the lower limit of the hexanal, the peak area ratio measured by solid-phase microextraction-gas chromatography-mass spectrometry may be 1 ppm part or more with respect to 1 part of acetic acid. However, from the standpoint of the intensity of the effects, the peak area ratio is preferably 5 ppm parts or more, and more preferably 10 ppm parts or more. Further, as the upper limit of the hexanal, the peak area ratio measured by solid-phase microextraction-gas chromatography-mass spectrometry may be 15 parts or less with respect to 1 part of acetic acid. However, from the standpoint of not adding the flavor of the aromatic component as much as possible, the peak area ratio is preferably 12.5 parts or less, and more preferably 10 parts or less. As the content range of the hexanal, the peak area ratio measured by solid-phase microextraction-gas chromatography-mass spectrometry is, for example, 1 ppm part or more and 15 parts or less, preferably 5 ppm parts or more and 15 parts or less, more preferably 5 ppm parts or more and 12.5 parts or less, even more preferably 10 ppm parts or more and 12.5 parts or less, and still even more preferably 10 ppm parts or more and 10 parts or less, with respect to 1 part of acetic acid.

More specifically, in the case of foods and drinks that are produced or processed under conditions in which acetic acid vaporizes, the hexanal is preferably contained, as the lower limit, so that the peak area ratio measured by solid-phase microextraction-gas chromatography-mass spectrometry is 0.001 parts or more with respect to 1 part of acetic acid. However, from the standpoint of the intensity of the effects, the peak area ratio is more preferably 0.005 parts or more, and particularly preferably 0.01 parts or more. Further, as the upper limit of the hexanal, the peak area ratio measured by solid-phase microextraction-gas chromatography-mass spectrometry may be 15 parts or less with respect to 1 part of acetic acid. However, from the standpoint of not adding the flavor of the aromatic component as much as possible, the peak area ratio is preferably 12.5 parts or less, and more preferably 10 parts or less. As the content range of the hexanal as the aromatic component, the peak area ratio measured by solid-phase microextraction-gas chromatography-mass spectrometry is preferably 0.001 parts or more and 15 parts or less, more preferably 0.005 parts or more and 15 parts or less, even more preferably 0.005 parts or more and 12.5 parts or less, still even more preferably 0.01 parts or more and 12.5 parts or less, and particularly preferably 0.01 parts or more and 10 parts or less, with respect to 1 part of acetic acid.

Furthermore, in the case of foods and drinks that are not produced or processed under conditions in which acetic acid vaporizes (excluding the heating process performed on sealed containers, such as heating sterilization performed after a container is filled and sealed), the hexanal is preferably contained, as the lower limit, so that the peak area ratio measured by solid-phase microextraction-gas chromatography-mass spectrometry is 1 ppm part or more with respect to 1 part of acetic acid. However, from the standpoint of the intensity of the effects, the peak area ratio is preferably 5 ppm parts or more, and particularly preferably 10 ppm or more. Further, as the upper limit of the hexanal, the peak area ratio measured by solid-phase microextraction-gas chromatography-mass spectrometry may be 1 part or less with respect to 1 part of acetic acid. However, from the standpoint of not adding the flavor of the aromatic component as much as possible, the peak area ratio is preferably 0.5 parts or less, and more preferably 0.1 parts or less. As the content range of the hexanal, the peak area ratio measured by solid-phase microextraction-gas chromatography-mass spectrometry is preferably 1 ppm part or more and 1 part or less, more preferably 5 ppm parts or more and 1 part or less, even more preferably 5 ppm parts or more and 0.5 parts or less, still even more preferably 10 ppm parts or more and 0.5 parts or less, and particularly preferably 10 ppm parts or more and 0.1 parts or less, with respect to 1 part of acetic acid.

As the lower limit of each of the heptanal, octanal, and nonanal, the peak area ratio measured by solid-phase microextraction-gas chromatography-mass spectrometry may be 1 ppm part or more with respect to 1 part of acetic acid. However, from the standpoint of the intensity of the effects, the peak area ratio is preferably 5 ppm parts or more, and more preferably 10 ppm parts or more. Further, as the upper limit of each of the heptanal, octanal, and nonanal, the peak area ratio measured by solid-phase microextraction-gas chromatography-mass spectrometry may be 15 parts or less with respect to 1 part of acetic acid. However, from the standpoint of not adding the flavor of the aromatic component as much as possible, the peak area ratio is preferably 12.5 parts or less, and more preferably 10 parts or less. As the content range of each of the heptanal, octanal, and nonanal, the peak area ratio measured by solid-phase microextraction-gas chromatography-mass spectrometry is, for example, 1 ppm part or more and 15 parts or less, preferably 5 ppm parts or more and 15 parts or less, more preferably 5 ppm parts or more and 12.5 parts or less, even more preferably 10 ppm parts or more and 12.5 parts or less, and still even more preferably 10 ppm parts or more and 10 parts or less, with respect to 1 part of acetic acid.

Moreover, in the case of foods and drinks that are produced or processed under conditions in which acetic acid vaporizes, each of the heptanal, octanal, and nonanal is preferably contained, as the lower limit, so that the peak area ratio measured by solid-phase microextraction-gas chromatography-mass spectrometry is 0.0001 parts or more with respect to 1 part of acetic acid. However, from the standpoint of the intensity of the effects, the peak area ratio is more preferably 0.0005 parts or more, and particularly preferably 0.001 parts or more. Further, as the upper limit of each of the heptanal, octanal, and nonanal, the peak area ratio measured by solid-phase microextraction-gas chromatography-mass spectrometry may be 15 parts or less with respect to 1 part of acetic acid. However, from the standpoint of not adding the flavor of the aromatic component as much as possible, the peak area ratio is preferably 12.5 parts or less, and more preferably 10 parts or less. As the content range of each of the heptanal, octanal, and nonanal, the peak area ratio measured by solid-phase microextraction-gas chromatography-mass spectrometry is preferably 0.0001 parts or more and 15 parts or less, more preferably 0.0005 parts or more and 15 parts or less, even more preferably 0.0005 parts or more and 12.5 parts or less, still even more preferably 0.001 parts or more and 12.5 parts or less, and particularly preferably 0.001 parts or more and 10 parts or less, with respect to 1 part of acetic acid.

In the case of foods and drinks that are not produced or processed under conditions in which acetic acid vaporizes (excluding the heating process performed on sealed containers, such as heating sterilization performed after a container is filled and sealed), each of the heptanal, octanal, and nonanal is preferably contained, as the lower limit, so that the peak area ratio measured by solid-phase microextraction-gas chromatography-mass spectrometry is 1 ppm or more with respect to 1 part of acetic acid. However, from the standpoint of the intensity of the effects, the peak area ratio is more preferably 5 ppm or more, and particularly preferably 10 ppm or more. Further, as the upper limit of each of the heptanal, octanal, and nonanal, the peak area ratio measured by solid-phase microextraction-gas chromatography-mass spectrometry may be 0.1 parts or less with respect to 1 part of acetic acid. However, from the standpoint of not adding the flavor of the aromatic component as much as possible, the peak area ratio is preferably 0.05 parts or less, and more preferably 0.01 parts or less. As the content range of each of the heptanal, octanal, and nonanal, the peak area ratio measured by solid-phase microextraction-gas chromatography-mass spectrometry is preferably 1 ppm part or more and 0.1 parts or less, more preferably 5 ppm parts or more and 0.1 parts or less, even more preferably 5 ppm parts or more and 0.05 parts or less, still even more preferably 10 ppm parts or more and 0.05 parts or less, and particularly preferably 10 ppm parts or more and 0.01 parts or less, with respect to 1 part of acetic acid.

The content of each aromatic component may be adjusted by mixing and adding the aromatic component itself with a known concentration, or a food ingredient containing each aromatic component, so that the content of each aromatic component falls within the above range. Further, the content of each aromatic component can be measured by using a general method for measuring aromatic components. For example, it may be confirmed whether the peak area ratio measured by solid-phase microextraction-gas chromatography-mass spectrometry (SPME-GC-MS) is within the above concentration range, according to the following conditions.

Method and Conditions for Measuring Each Aromatic Component

Measurement by solid-phase microextraction-gas chromatography-mass spectrometry (SPME-GC-MS)

1. Method for separating and concentrating aromatic components

The aromatic components are separated and concentrated by the solid-phase microextraction method according to the following conditions.

Solid-Phase Microextraction Conditions

SPME Fiber StableFlex 50/30 μm, DVB/Carboxen/PDMS (produced by SUPELCO)

Volatile component extraction device

PAL3 RSI120 (produced by CTC Analytics)

Preheating: 40° C., 15 min

Stirring speed: 300 rpm

Volatile component extraction: 40° C., 20 min

Desorption time: 10 min

2. Method for Measuring Aromatic Components

Using gas chromatography and mass spectrometry, the ratio of the peak area of each aromatic component to the peak area of acetic acid is measured according to the following conditions.

Gas Chromatograph Conditions
- Measurement equipment: Agilent 7980B GC System (produced by Agilent Technologies)
- GC column: DB-WAX (produced by Agilent Technologies) length: 30 m, diameter: 0.25 mm, film thickness: 0.25 μm
- Carrier: He gas, gas flow rate: 1.0 mL/min
- Temperature conditions: maintained at 35° C. (5 min)→heating to 120° C. at 5° C./min→heating to 220° C. at 15° C./min→maintained for 6 min Mass Spectrometry Conditions
- Measurement equipment: Agilent 7000C GC/MS Triple Quad (produced by Agilent Technologies)
- Ionization method: EI (ionization voltage: 70 eV)
- Scan mass: m/z 29.0 to 350.0

The timing of adding the aromatic components may be before the addition of acetic acid to a food or drink to which acetic acid is added, at the same time as the addition of acetic acid, or after the addition of acetic acid. Alternatively, in the process of producing or processing the food or drink to which acetic acid is added, raw materials may be previously compounded so that the aromatic components are produced.

As the mode of addition, the aromatic components themselves may be added directly, or may be added via a food ingredient containing the aromatic components. The nature of the food ingredient may be any of powdered powder, liquid mixed with a solvent or a food or drink, and emulsified liquid obtained by emulsifying them; the mode is irrelevant. The mode may be appropriately selected according to the suitability of the food or drink to which acetic acid is added.

The present invention also includes a method for producing the acetic acid-containing food or drink by adding acetic acid to a food or drink, and adjusting its content within the above range; and adding each of the aromatic components and adjusting their content within the above range. Specifically, the present invention includes a method for producing the acetic acid-containing food or drink, comprising adding acetic acid and adjusting its content so that the acetic acid content when eating is 0.015 mass % or more and 5 mass % or less, and adjusting the content of at least one aromatic component selected from the group consisting of (A) and (B) above to the above-mentioned suitable amount. In this case, the content of at least one aromatic component selected from the group consisting of (C) and (D) above may be further adjusted to the above-mentioned suitable amount.

Further, the present invention also includes a method for improving the quality of the acetic acid-containing food or drink by adding acetic acid to a food or drink, and adjusting its content within the above range; and adding each of the aromatic components and adjusting their content within the above range, thereby suppressing the sour taste and sour odor of the acetic acid-containing food or drink, and enhancing the original flavor of the food or drink to which acetic acid is added. Specifically, the present invention includes a method for improving the quality of the acetic acid-containing food or drink, comprising adjusting the amount of acetic acid so that the acetic acid content when eating is 0.015 mass % or more and 5 mass % or less, and adjusting the content of at least one aromatic component selected from the group consisting of (A) and (B) above to the above-mentioned suitable amount, thereby suppressing the sour taste and sour odor of the acetic acid-containing food or drink, and enhancing the original flavor of the food or drink to which acetic acid is added. In this case, the content of at least one aromatic component selected from the group consisting of (C) and (D) above may be adjusted to the above-mentioned suitable amount.

EXAMPLE

The following describes the present invention with reference to Examples. However, the present invention is not limited to these Examples.

Example 1: Extraction and Selection of Aromatic Components that Reduce Sour Taste and Sour Odor

1

A preliminary test was conducted using white rice, because a sour taste and sour odor would be easily perceived as an odd flavor in white rice due to its subtle original flavor as a food. Various aromatic components were added to acetic acid-containing white rice. (1 mass % of vinegar with an acetic acid content of 7.3 mass % was added to cooked rice to prepare white rice with an improved shelf life. The acetic acid content of the white rice was 0.073 mass %. This white rice had a clear sour taste and sour odor. This rice is hereinafter referred to as "white rice.") Some aromatic components were found to have a more than slight sour taste and sour odor suppression effect. Additionally, some aromatic components were found to have not only the sour taste and sour odor suppression effect, but also the effect of making the original flavor of the food or drink more perceivable (hereinafter referred to as "original-food-or-drink-flavor maintenance and enhancement effect"). The same test was also conducted on foods and drinks in addition to white rice (salted rice, red bean rice, okowa (sticky glutinous rice), spaghetti, vegetable salad, chikuzenni (a dish of braised chicken and vegetables), and simmered pumpkin). The results were similar.

From among the aromatic components, those that have a particularly strong sour taste and sour odor suppression effect were selected, and the following test was conducted. As shown in Table 1, each of the selected aromatic components was added to the prepared white rice such that the peak area ratio as measured by solid-phase microextraction-gas chromatography-mass spectrometry was 0.01 parts with respect to 1 part of acetic acid contained in the white rice. The aromatic components for use were all pure products.

The sour taste and sour odor suppression effect, and the original-food-or-drink-flavor maintenance and enhancement effect were evaluated by five specialized panelists based on the following criteria (the number after the decimal point was rounded off). The individual components of (B), (C), and (D) in Table 1 were added together by group, and the effects were examined.

Evaluation criteria 3 (comprehensive evaluation) rated preference in terms of the effect of the present invention on a scale of 1 to 5, based on the evaluation results obtained from evaluation criteria 1 (sour taste and sour odor suppression effect) and evaluation criteria 2 (original-food-or-drink-flavor maintenance and enhancement effect). In addition to evaluation criteria 1 and 2, any factor that is greatly related to the quality of a food or drink (e.g., an unpleasant feel in flavor or an unfavorable taste as a food or drink caused by, for example, the original flavor of an aromatic component), if found, was added as a remark in scoring the grade.

Evaluation Criteria 1: Sour Taste and Sour Odor Suppression Effect
5: Sour taste and sour odor are remarkably and strongly suppressed.
4: Sour taste and sour odor are strongly suppressed.
3: Sour taste and sour odor are suppressed.
2: Sour taste and sour odor are somewhat suppressed.
1: Sour taste and sour odor remain the same.
Evaluation Criteria 2: Original-Food-or-Drink-Flavor Maintenance and Enhancement Effect
5: The original flavor of food or drink is particularly strongly perceived.
4: The original flavor of food or drink is strongly perceived.
3: The original flavor of food or drink is perceived.
2: The original flavor of food or drink is slightly perceived.
1: Almost no original flavor of food or drink is perceived.
Evaluation Criteria 3: Comprehensive Evaluation
5: Excellent
4: Very good
3: Good
2: Average
1: Poor Table 1 shows the results.

materials of the cooked acetic acid-containing rice. The monoterpenes or sesquiterpenes (B) (Test Example 2) were found to have a sour taste and sour odor suppression effect overall; as well as an effect of maintaining and enhancing the original flavor of the white rice, which is the main component of the raw materials of the cooked acetic acid-containing rice. Additionally, components (A) and (B) both imparted no unpleasant feel derived from the aromatic components added to the white rice, and were found to provide the excellent effect of the present invention.

Thus, it was found that in order to bring about the effect of the present invention, at least one aromatic component selected from the group consisting of (A) unsaturated alcohols having 8 carbon atoms and (B) monoterpenes or sesquiterpenes, together with acetic acid, may be added to a food or drink such that the food or drink contains the at least one aromatic component.

Additionally, (C) furan compounds having 5 or 6 carbon atoms (Test Example 3) and (D) aliphatic aldehydes having 6 to 9 carbon atoms (Test Example 4) both did not impart an aromatic component-derived unpleasant feel to the flavor of the white rice. However, their individual sour taste and sour

TABLE 1

| | Aromatic Component | | Detection Amount (part) with respect to 1 part of Acetic Acid | Sour Taste and Sour Odor Suppression Effect | Flavor Enhancement Effect | Comprehensive Evaluation (including Notes) |
|---|---|---|---|---|---|---|
| Test Example 1 | (A) Unsaturated Alcohols Having 8 Carbon Atoms | 1-Octen-3-Ol | 0.01 | 4 | 4 | 4 |
| Test Example 2 | (B) Monoterpenes or Sesquiterpenes | Limonene | 0.01 | 3 | 4 | 4 |
| | | Terpinene | 0.01 | | | |
| | | p-Cymene | 0.01 | | | |
| | | Muurolol | 0.01 | | | |
| | | Cadalene | 0.01 | | | |
| Test Example 3 | (C) Furan Compounds Having 5 or 6 Carbon Atoms | Furfural | 0.01 | 3 | 2 | 3 |
| | | Furfuryl Alcohol | 0.01 | | | |
| | | 2-Acetylfuran | 0.01 | | | |
| | | 3-Methylfuran | 0.01 | | | |
| | | 2-Methylfuran | 0.01 | | | |
| | | 2-(5H)-Furanone | 0.01 | | | |
| Test Example 4 | (D) Aliphatic Aldehydes Having 6 to 9 Carbon Atoms | Hexanal | 0.01 | 2 | 2 | 2 |
| | | Heptanal | 0.01 | | | |
| | | Octanal | 0.01 | | | |
| | | Nonanal | 0.01 | | | |

| | | Aromatic Component | | Notes |
|---|---|---|---|---|
| | Test Example 1 | (A) Unsaturated Alcohols Having 8 Carbon Atoms | 1-Octen-3-Ol | No Unpleasant Feel in Flavor |
| | Test Example 2 | (B) Monoterpenes or Sesquiterpenes | Limonene Terpinene p-Cymene Muurolol Cadalene | No Unpleasant Feel in Flavor |
| | Test Example 3 | (C) Furan Compounds Having 5 or 6 Carbon Atoms | Furfural Furfuryl Alcohol 2-Acetylfuran 3-Methylfuran 2-Methylfuran 2-(5H)-Furanone | No Unpleasant Feel in Flavor |
| | Test Example 4 | (D) Aliphatic Aldehydes Having 6 to 9 Carbon Atoms | Hexanal Heptanal Octanal Nonanal | No Unpleasant Feel in Flavor |

As shown in Table 1, the unsaturated alcohol having 8 carbon atoms (A) (Test Example 1) was found to have a strong sour taste and sour odor suppression effect; as well as an effect of maintaining the original flavor of the white rice, which is the main component of the raw odor suppression effect was weaker than that of components (A) and (B). Their effect of maintaining and enhancing the original flavor of the white rice, which is the main component of the raw materials of the acetic acid-containing white rice, was also weak. Thus, although these components individually have some effect, their effect appeared to be insufficient compared with those of components (A) and (B).

Example 2: Extraction and Selection of Aromatic Components that Reduce Sour Taste and Sour Odor 2

In Example 1, the use of individual aromatic component (A) or (B) was confirmed to provide the effect of the present invention. However, the use of individual aromatic component (C) or (D) was confirmed to be insufficient in terms of the effect. Thus, a combined effect provided by aromatic components (A) and/or (B) with (C) and/or (D) was examined, as shown in Table 2. The individual components of (B), (C), and (D) in Table 2 were added together by group, and the effects due to their combined use were examined.

The method of test and evaluation was the same as in Example 1.

Table 2 shows the results.

TABLE 2

| Aromatic Component | | Detection Amount (part) with respect to 1 part of Acetic Acid | Test Example 1 (Control 1) | Test Example 2 (Control 2) | Test Example 3 (Control 3) | Test Example 4 (Control 4) |
|---|---|---|---|---|---|---|
| (A) Unsaturated Alcohols Having 8 Carbon Atoms | 1-Octen-3-Ol | 0.01 | ○ | — | — | — |
| (B) Monoterpenes or Sesquiterpenes | Limonene | 0.01 | — | ○ | — | — |
| | Terpinene | 0.01 | | | | |
| | p-Cymene | 0.01 | | | | |
| | Muurolol | 0.01 | | | | |
| | Cadalene | 0.01 | | | | |
| (C) Furan Compounds Having 5 or 6 Carbon Atoms | Furfural | 0.01 | — | — | ○ | — |
| | Furfuryl Alcohol | 0.01 | | | | |
| | 2-Acetylfuran | 0.01 | | | | |
| | 3-Methylfuran | 0.01 | | | | |
| | 2-Methylfuran | 0.01 | | | | |
| | 2-(5H)-Furanone | 0.01 | | | | |
| (D) Aliphatic Aldehydes Having 6 to 9 Carbon Atoms | Hexanal | 0.01 | — | — | — | ○ |
| | Heptanal | 0.01 | | | | |
| | Octanal | 0.01 | | | | |
| | Nonanal | 0.01 | | | | |
| Sour Taste and Sour Odor Suppression Effect | | | 4 | 3 | 3 | 2 |
| Flavor Enhancement Effect | | | 4 | 4 | 2 | 2 |
| Comprehensive Evaluation (including Notes) | | | 4 | 3 | 3 | 2 |
| Notes | | | No Unpleasant Feel in Flavor | No Unpleasant Feel in Flavor | No Unpleasant Feel in Flavor | No Unpleasant Feel in Flavor |

| Aromatic Component | | Detection Amount (part) with respect to 1 part of Acetic Acid | Test Example 5 | Test Example 6 | Test Example 7 | Test Example 8 |
|---|---|---|---|---|---|---|
| (A) Unsaturated Alcohols Having 8 Carbon Atoms | 1-Octen-3-Ol | 0.01 | ○ | — | ○ | — |
| (B) Monoterpenes or Sesquiterpenes | Limonene | 0.01 | — | ○ | — | ○ |
| | Terpinene | 0.01 | | | | |
| | p-Cymene | 0.01 | | | | |
| | Muurolol | 0.01 | | | | |
| | Cadalene | 0.01 | | | | |
| (C) Furan Compounds Having 5 or 6 Carbon Atoms | Furfural | 0.01 | ○ | ○ | — | — |
| | Furfuryl Alcohol | 0.01 | | | | |
| | 2-Acetylfuran | 0.01 | | | | |
| | 3-Methylfuran | 0.01 | | | | |
| | 2-Methylfuran | 0.01 | | | | |
| | 2-(5H)-Furanone | 0.01 | | | | |
| (D) Aliphatic Aldehydes Having 6 to 9 Carbon Atoms | Hexanal | 0.01 | — | — | ○ | ○ |
| | Heptanal | 0.01 | | | | |
| | Octanal | 0.01 | | | | |
| | Nonanal | 0.01 | | | | |
| Sour Taste and Sour Odor Suppression Effect | | | 5 | 4 | 5 | 5 |
| Flavor Enhancement Effect | | | 5 | 5 | 5 | 4 |
| Comprehensive Evaluation (including Notes) | | | 5 | 4 | 5 | 4 |
| Notes | | | No Unpleasant Feel in Flavor | No Unpleasant Feel in Flavor | No Unpleasant Feel in Flavor | No Unpleasant Feel in Flavor |

| Aromatic Component | | Detection Amount (part) with respect to 1 part of Acetic Acid | Test Example 9 | Test Example 10 |
|---|---|---|---|---|
| (A) Unsaturated Alcohols Having 8 Carbon Atoms | 1-Octen-3-Ol | 0.01 | ○ | — |
| (B) Monoterpenes or Sesquiterpenes | Limonene | 0.01 | — | ○ |
| | Terpinene | 0.01 | | |
| | p-Cymene | 0.01 | | |
| | Muurolol | 0.01 | | |
| | Cadalene | 0.01 | | |

TABLE 2-continued

| | | | | | |
|---|---|---|---|---|---|
| (C) Furan Compounds Having 5 or 6 Carbon Atoms | Furfural | 0.01 | | ◯ | ◯ |
| | Furfuryl Alcohol | 0.01 | | | |
| | 2-Acetylfuran | 0.01 | | | |
| | 3-Methylfuran | 0.01 | | | |
| | 2-Methylfuran | 0.01 | | | |
| | 2-(5H)-Furanone | 0.01 | | | |
| (D) Aliphatic Aldehydes Having 6 to 9 Carbon Atoms | Hexanal | 0.01 | | ◯ | ◯ |
| | Heptanal | 0.01 | | | |
| | Octanal | 0.01 | | | |
| | Nonanal | 0.01 | | | |
| Sour Taste and Sour Odor Suppression Effect | | | | 5 | 5 |
| Flavor Enhancement Effect | | | | 5 | 5 |
| Comprehensive Evaluation (including Notes) | | | | 5 | 5 |
| Notes | | | | No Unpleasant Feel in Flavor | No Unpleasant Feel in Flavor |

Symbol "◯" indicates addition, and symbol "—" indicates no addition.

As shown in Table 2, an effect of the combined use of aromatic component (A) or (B) with (C) and/or (D) was confirmed. Specifically, the combined use of components (A) and (C) (Test Example 5) and the combined use of components (B) and (C) (Test Example 6) exhibited a higher sour taste and sour odor suppression effect, and a higher effect of maintaining and enhancing the original flavor of white rice, than the use of component (A) alone (control 1), component (B) alone (control 2), or component (C) alone (control 3). Moreover, the combined use of components (A) and (D) (Test Example 7) exhibited a higher sour taste and sour odor suppression effect, and a higher effect of maintaining and enhancing the original flavor of white rice, than the use of component (A) alone (control 1) or component (D) (control 4) alone. The combined use of components (B) and (D) (Test Example 8) exhibited a higher sour taste and sour odor suppression effect than the use of component (B) alone (control 2) or component (D) alone (control 4).

Thus, it was confirmed that it is more preferable to add at least one aromatic component selected from the group consisting of components (A) and (B), and at least one aromatic component selected from (C) furan compounds having 5 or 6 carbon atoms or at least one aromatic component selected from (D) aliphatic aldehydes having 6 to 9 carbon atoms, together with acetic acid, to a food or drink such that the food or drink contains these aromatic components.

Additionally, the combined use of aromatic components (A), (C), and (D), and the combined use of components (B), (C), and (D) (Test Examples 9 and 10) exhibited a particularly stronger sour taste and sour odor suppression effect, and an effect of maintaining and enhancing the original flavor of white rice, which is the main component of the raw materials of acetic acid-containing white rice, than the use of component (A) alone (control 1), component (B) alone (control 2), component (C) alone (control 3), component (D) alone (control 4), the combined use of components (A) and (C) (Test Example 5), the combined use of components (B) and (C) (Test Example 6), the combined use of components (A) and (D) (Test Example 7), or the combined use of components (B) and (D) (Test Example 8).

Thus, it was found that it is still more preferable to add at least one aromatic component selected from the group consisting of components (A) and (B), at least one aromatic component selected from (C) furan compounds having 5 or 6 carbon atoms, and at least one aromatic component selected from (D) aliphatic aldehydes having 6 to 9 carbon atoms, together with acetic acid, to a food or drink such that the food or drink contains these aromatic components.

Example 3: Study on the Range of Concentration of Aromatic Component for Suppressing Sour Taste and Sour Odor 1

In Examples 1 and 2, the effects of the present invention brought about by selectively adding components (A) to (D), or by adding components (A) to (D) in combination, was examined. In Example 3, the effect of the individual aromatic components that belong to respective aromatic component groups and the range of concentration of each aromatic component were studied.

As shown in Table 3, the effect of the present invention was studied by changing the concentration of each aromatic component added. The method of test and study was the same as in Example 1. Each aromatic component was also added to a vinegar drink (an apple-flavored vinegar drink was selected as a typical example), from which a high amount of acetic acid can be consumed and a particularly strong acid pungency is given to the mouth (particularly among acetic-acid containing foods and drinks). A test and study were also conducted on the vinegar drink in the same manner. The vinegar drink was prepared by mixing apple vinegar (produced by Mizkan, acidity (acetic acid content): 5.0 mass %) with commercially available apple juice. The prepared vinegar drink with an acetic acid content of 2.5 mass % was used in the test. These two items (cooked rice and vinegar drink) were evaluated and rated in accordance with the criteria in Example 1, based on the results thereof. Table 3 shows the results.

TABLE 3-1

| | (A) Unsaturated Alcohols Having 8 Carbon Atoms | | Experimental Plot 1 | Experimental Plot 2 | Experimental Plot 3 | Experimental Plot 4 |
|---|---|---|---|---|---|---|
| | Acetic Acid (parts) | | 1 | 1 | 1 | 1 |
| Test Example a | 1-Octen-3-Ol (parts) | | 0.05 ppm | 0.1 ppm | 1 ppm | 5 ppm |
| | Sour Taste and Sour Odor Suppression Effect on White Rice | | 1 | 1 | 2 | 2 |
| | Flavor Enhancement Effect on White Rice | | 1 | 1 | 3 | 3 |
| | Sour Taste and Sour Odor Suppression Effect on Vinegar Drink | | 1 | 1 | 3 | 4 |
| | Flavor Enhancement Effect on Vinegar Drink | | 1 | 1 | 3 | 3 |

TABLE 3-1-continued

| | | | | |
|---|---|---|---|---|
| Comprehensive Evaluation (including Notes) | 1 | 1 | 3 | 3 |
| Notes | No effect due to the addition of aromatic components was observed. | — | — | |

| | (A) Unsaturated Alcohols Having 8 Carbon Atoms | Experimental Plot 5 | Experimental Plot 6 | Experimental Plot 7 | Experimental Plot 8 |
|---|---|---|---|---|---|
| Test Example a | Acetic Acid (parts) | 1 | 1 | 1 | 1 |
| | 1-Octen-3-Ol (parts) | 10 ppm | 0.0001 | 0.0005 | 0.001 |
| | Sour Taste and Sour Odor Suppression Effect on White Rice | 3 | 4 | 4 | 4 |
| | Flavor Enhancement Effect on White Rice | 3 | 3 | 4 | 4 |
| | Sour Taste and Sour Odor Suppression Effect on Vinegar Drink | 4 | 4 | 4 | 4 |
| | Flavor Enhancement Effect on Vinegar Drink | 4 | 4 | 4 | 4 |
| | Comprehensive Evaluation (including Notes) | 4 | 4 | 4 | 4 |
| | Notes | — | — | — | — |

| | (A) Unsaturated Alcohols Having 8 Carbon Atoms | Experimental Plot 9 | Experimental Plot 10 | Experimental Plot 11 | Experimental Plot 12 |
|---|---|---|---|---|---|
| Test Example a | Acetic Acid (parts) | 1 | 1 | 1 | 1 |
| | 1-Octen-3-Ol (parts) | 0.01 | 0.05 | 0.1 | 1 |
| | Sour Taste and Sour Odor Suppression Effect on White Rice | 4 | 4 | 4 | 4 |
| | Flavor Enhancement Effect on White Rice | 4 | 4 | 4 | 4 |
| | Sour Taste and Sour Odor Suppression Effect on Vinegar Drink | 4 | 4 | 4 | 4 |
| | Flavor Enhancement Effect on Vinegar Drink | 4 | 3 | 3 | 2 |
| | Comprehensive Evaluation (including Notes) | 4 | 4 | 4 | 4 |
| | Notes | — | — | — | — |

| | (A) Unsaturated Alcohols Having 8 Carbon Atoms | Experimental Plot 13 | Experimental Plot 14 | Experimental Plot 15 | Experimental Plot 16 |
|---|---|---|---|---|---|
| Test Example a | Acetic Acid (parts) | 1 | 1 | 1 | 1 |
| | 1-Octen-3-Ol (parts) | 2.5 | 5 | 7.5 | 10 |
| | Sour Taste and Sour Odor Suppression Effect on White Rice | 4 | 4 | 4 | 4 |
| | Flavor Enhancement Effect on White Rice | 3 | 3 | 2 | 1 |
| | Sour Taste and Sour Odor Suppression Effect on Vinegar Drink | 4 | 4 | 4 | 4 |
| | Flavor Enhancement Effect on Vinegar Drink | 2 | 2 | 1 | 1 |
| | Comprehensive Evaluation (including Notes) | 4 | 4 | 1 | 1 |
| | Notes | — | A slightly unpleasant feel, but acceptable | An unpleasant feel due to an aromatic component-derived flavor, with the flavor of white rice masked | |

| | (A) Unsaturated Alcohols Having 8 Carbon Atoms | Experimental Plot 17 |
|---|---|---|
| Test Example a | Acetic Acid (parts) | 1 |
| | 1-Octen-3-Ol (parts) | 12.5 |
| | Sour Taste and Sour Odor Suppression Effect on White Rice | 4 |
| | Flavor Enhancement Effect on White Rice | 1 |
| | Sour Taste and Sour Odor Suppression Effect on Vinegar Drink | 4 |
| | Flavor Enhancement Effect on Vinegar Drink | 1 |
| | Comprehensive Evaluation (including Notes) | 1 |
| | Notes | An unpleasant feel due to an aromatic component-derived flavor, with the flavor of white rice masked |

As shown in Table 3-1, the concentration of (A) an unsaturated alcohol having 8 carbon atoms necessary to bring about the effect of the present invention is within a range in which the peak area ratio measured by solid-phase microextraction-gas chromatography-mass spectrometry was 1 ppm part or more and 5 parts or less with respect to 1 part of acetic acid. From the standpoint of the intensity of the effect, the lower limit is preferably 5 ppm parts or more, and more preferably 10 ppm parts or more. From the standpoint of added flavor derived from the aromatic component, the upper limit is preferably 2.5 parts or less, and more preferably 1 part or less.

More specifically, it was found that in order to bring about the effect of the present invention, the concentration of 1-octen-3-ol, which is (A) an unsaturated alcohol having 8 carbon atoms, should be within a range in which the peak area ratio measured by solid-phase microextraction-gas chromatography-mass spectrometry is 1 ppm part or more and 5 parts or less with respect to 1 part of acetic acid (experimental plots 3 to 14 of Test Example a). It was also found that from the standpoint of the intensity of the effects, the lower limit is more preferably 5 ppm parts or more, and still more preferably 10 ppm parts or more. From the standpoint of added flavor derived from the aromatic component, it was found that the upper limit is more preferably 2.5 parts or less, and still more preferably 1 part or less.

Additionally, it was found that for foods and drinks that are produced or processed under conditions in which acetic acid vaporizes, such as cooked rice, the concentration of 1-octen-3-ol that falls within a range in which the peak area ratio measured by solid-phase microextraction-gas chromatography-mass spectrometry is 0.0001 parts or more to 5 parts or less with respect to 1 part of acetic acid is particularly effective (experimental plots 6 to 14 of Test Example a). It was found that from the standpoint of the intensity of the effects, the lower limit is more preferably 0.0005 parts or more, and still more preferably 0.001 parts or more. From the standpoint of added flavor derived from the aromatic component, it was found that the upper limit is more preferably 2.5 parts or less, and still more preferably 1 part or less.

Additionally, for foods and drinks that are not produced or processed under conditions in which acetic acid vaporizes (excluding the heating process performed on sealed containers, such as heating sterilization performed after a container is filled and sealed), the concentration of 1-octen-3-ol that falls within a range in which the peak area ratio measured by solid-phase microextraction-gas chromatography-mass spectrometry is 1 ppm part or more and 0.1 parts or less with respect to 1 part of acetic acid is particularly effective (experimental plots 3 to 11 of Test Example a). It was found that from the standpoint of the intensity of the effects, the lower limit is more preferably 5 ppm parts or more, and still more preferably 10 ppm parts or more. From the standpoint of added flavor derived from the aromatic component, it was found that the upper limit is more preferably 0.05 parts or less, and still more preferably 0.01 parts or less.

TABLE 3-2

| | (B) Monoterpenes or Sesquiterpenes | Experimental Plot 1 | Experimental Plot 2 | Experimental Plot 3 | Experimental Plot 4 | Experimental Plot 5 |
|---|---|---|---|---|---|---|
| | Acetic Acid (parts) | 1 | 1 | 1 | 1 | 1 |
| Test Example b | Limonene (parts) | 0.05 ppm | 0.1 ppm | 1 ppm | 5 ppm | 10 ppm |
| | Sour Taste and Sour Odor Suppression Effect on White Rice | 1 | 1 | 3 | 3 | 3 |
| | Flavor Enhancement Effect on White Rice | 1 | 1 | 2 | 2 | 2 |
| | Sour Taste and Sour Odor Suppression Effect on Vinegar Drink | 1 | 1 | 2 | 3 | 3 |
| | Flavor Enhancement Effect on Vinegar Drink | 1 | 1 | 3 | 3 | 4 |
| | Comprehensive Evaluation (including Notes) | 1 | 1 | 3 | 3 | 3 |
| | Notes | | No effect due to the addition of aromatic components was observed. | — | — | — |
| Test Example c | Terpinene (parts) | 0.05 ppm | 0.1 ppm | 1 ppm | 5 ppm | 10 ppm |
| | Sour Taste and Sour Odor Suppression Effect on White Rice | 1 | 1 | 3 | 3 | 3 |
| | Flavor Enhancement Effect on White Rice | 1 | 1 | 2 | 2 | 2 |
| | Sour Taste and Sour Odor Suppression Effect on Vinegar Drink | 1 | 1 | 2 | 3 | 3 |
| | Flavor Enhancement Effect on Vinegar Drink | 1 | 1 | 3 | 3 | 4 |
| | Comprehensive Evaluation (including Notes) | 1 | 1 | 3 | 3 | 3 |
| | Notes | | No effect due to the addition of aromatic components was observed. | — | — | — |
| Test Example d | p-Cymene (parts) | 0.05 ppm | 0.1 ppm | 1 ppm | 5 ppm | 10 ppm |
| | Sour Taste and Sour Odor Suppression Effect on White Rice | 1 | 1 | 3 | 3 | 3 |
| | Flavor Enhancement Effect on White Rice | 1 | 1 | 2 | 2 | 2 |
| | Sour Taste and Sour Odor Suppression Effect on Vinegar Drink | 1 | 1 | 2 | 3 | 3 |
| | Flavor Enhancement Effect on Vinegar Drink | 1 | 1 | 3 | 3 | 4 |
| | Comprehensive Evaluation (including Notes) | 1 | 1 | 3 | 3 | 3 |
| | Notes | | No effect due to the addition of aromatic components was observed. | — | — | — |
| Test Example e | Muurolol (parts) | 0.5 ppm | 1 ppm | 5 ppm | 10 ppm | 0.0001 |
| | Sour Taste and Sour Odor Suppression Effect on White Rice | 1 | 3 | 3 | 3 | 3 |
| | Flavor Enhancement Effect on White Rice | 1 | 2 | 2 | 2 | 2 |
| | Sour Taste and Sour Odor Suppression Effect on Vinegar Drink | 1 | 2 | 3 | 3 | 3 |
| | Flavor Enhancement Effect on Vinegar Drink | 1 | 3 | 3 | 4 | 4 |
| | Comprehensive Evaluation (including Notes) | 1 | 3 | 3 | 3 | 3 |
| | Notes | No effect due to the addition of aromatic components was observed. | — | — | — | — |
| Test Example f | Cadalene (parts) | 0.5 ppm | 1 ppm | 5 ppm | 10 ppm | 0.0001 |
| | Sour Taste and Sour Odor Suppression Effect on White Rice | 1 | 3 | 3 | 3 | 3 |
| | Flavor Enhancement Effect on White Rice | 1 | 2 | 2 | 2 | 2 |
| | Sour Taste and Sour Odor Suppression Effect on Vinegar Drink | 1 | 2 | 3 | 3 | 3 |
| | Flavor Enhancement Effect on Vinegar Drink | 1 | 3 | 3 | 4 | 4 |
| | Comprehensive Evaluation (including Notes) | 1 | 3 | 3 | 3 | 3 |

TABLE 3-2-continued

| | | | | | | |
|---|---|---|---|---|---|---|
| Notes | | No effect due to the addition of aromatic components was observed. | — | — | — | — |

| | (B) Monoterpenes or Sesquiterpenes | Experimental Plot 6 | Experimental Plot 7 | Experimental Plot 8 | Experimental Plot 9 | Experimental Plot 10 |
|---|---|---|---|---|---|---|
| | Acetic Acid (parts) | 1 | 1 | 1 | 1 | 1 |
| Test Example b | Limonene (parts) | 0.0001 | 0.0005 | 0.001 | 0.01 | 0.05 |
| | Sour Taste and Sour Odor Suppression Effect on White Rice | 3 | 3 | 3 | 3 | 3 |
| | Flavor Enhancement Effect on White Rice | 3 | 3 | 4 | 4 | 4 |
| | Sour Taste and Sour Odor Suppression Effect on Vinegar Drink | 3 | 3 | 3 | 3 | 3 |
| | Flavor Enhancement Effect on Vinegar Drink | 4 | 4 | 4 | 4 | 3 |
| | Comprehensive Evaluation (including Notes) | 3 | 3 | 3 | 3 | 3 |
| | Notes | — | — | — | — | — |
| Test Example c | Terpinene (parts) | 0.0001 | 0.0005 | 0.001 | 0.01 | 0.05 |
| | Sour Taste and Sour Odor Suppression Effect on White Rice | 3 | 3 | 3 | 3 | 3 |
| | Flavor Enhancement Effect on White Rice | 3 | 3 | 4 | 4 | 4 |
| | Sour Taste and Sour Odor Suppression Effect on Vinegar Drink | 3 | 3 | 3 | 3 | 3 |
| | Flavor Enhancement Effect on Vinegar Drink | 4 | 4 | 4 | 4 | 3 |
| | Comprehensive Evaluation (including Notes) | 3 | 3 | 3 | 3 | 3 |
| | Notes | — | — | — | — | — |
| Test Example d | p-Cymene (parts) | 0.0001 | 0.0005 | 0.001 | 0.01 | 0.05 |
| | Sour Taste and Sour Odor Suppression Effect on White Rice | 3 | 3 | 3 | 3 | 3 |
| | Flavor Enhancement Effect on White Rice | 3 | 3 | 4 | 4 | 4 |
| | Sour Taste and Sour Odor Suppression Effect on Vinegar Drink | 3 | 3 | 3 | 3 | 3 |
| | Flavor Enhancement Effect on Vinegar Drink | 4 | 4 | 4 | 4 | 3 |
| | Comprehensive Evaluation (including Notes) | 3 | 3 | 3 | 3 | 3 |
| | Notes | — | — | — | — | — |
| Test Example e | Muurolol (parts) | 0.001 | 0.005 | 0.01 | 0.1 | 0.5 |
| | Sour Taste and Sour Odor Suppression Effect on White Rice | 3 | 3 | 3 | 3 | 3 |
| | Flavor Enhancement Effect on White Rice | 3 | 3 | 4 | 4 | 4 |
| | Sour Taste and Sour Odor Suppression Effect on Vinegar Drink | 3 | 3 | 3 | 3 | 3 |
| | Flavor Enhancement Effect on Vinegar Drink | 4 | 4 | 4 | 4 | 3 |
| | Comprehensive Evaluation (including Notes) | 3 | 3 | 3 | 3 | 3 |
| | Notes | — | — | — | — | — |
| Test Example f | Cadalene (parts) | 0.001 | 0.005 | 0.01 | 0.1 | 0.5 |
| | Sour Taste and Sour Odor Suppression Effect on White Rice | 3 | 3 | 3 | 3 | 3 |
| | Flavor Enhancement Effect on White Rice | 3 | 3 | 4 | 4 | 4 |
| | Sour Taste and Sour Odor Suppression Effect on Vinegar Drink | 3 | 3 | 3 | 3 | 3 |
| | Flavor Enhancement Effect on Vinegar Drink | 4 | 4 | 4 | 4 | 3 |
| | Comprehensive Evaluation (including Notes) | 3 | 3 | 3 | 3 | 3 |
| | Notes | — | — | — | — | — |

| | (B) Monoterpenes or Sesquiterpenes | Experimental Plot 11 | Experimental Plot 12 | Experimental Plot 13 | Experimental Plot 14 |
|---|---|---|---|---|---|
| | Acetic Acid (parts) | 1 | 1 | 1 | 1 |
| Test Example b | Limonene (parts) | 0.1 | 1 | 2.5 | 5 |
| | Sour Taste and Sour Odor Suppression Effect on White Rice | 3 | 3 | 3 | 3 |
| | Flavor Enhancement Effect on White Rice | 4 | 4 | 3 | 3 |
| | Sour Taste and Sour Odor Suppression Effect on Vinegar Drink | 3 | 3 | 3 | 3 |
| | Flavor Enhancement Effect on Vinegar Drink | 2 | 2 | 2 | 2 |
| | Comprehensive Evaluation (including Notes) | 3 | 3 | 3 | 3 |
| | Notes | — | — | A slightly unpleasant feel, but acceptable | A slightly unpleasant feel, but acceptable |
| Test Example c | Terpinene (parts) | 0.1 | 1 | 2.5 | 5 |
| | Sour Taste and Sour Odor Suppression Effect on White Rice | 3 | 3 | 3 | 3 |
| | Flavor Enhancement Effect on White Rice | 4 | 4 | 3 | 3 |
| | Sour Taste and Sour Odor Suppression Effect on Vinegar Drink | 3 | 3 | 3 | 3 |
| | Flavor Enhancement Effect on Vinegar Drink | 2 | 2 | 2 | 2 |
| | Comprehensive Evaluation (including Notes) | 3 | 3 | 3 | 3 |
| | Notes | — | — | A slightly unpleasant feel, but acceptable | |
| Test Example d | p-Cymene (parts) | 0.1 | 1 | 2.5 | 5 |
| | Sour Taste and Sour Odor Suppression Effect on White Rice | 3 | 3 | 3 | 3 |
| | Flavor Enhancement Effect on White Rice | 4 | 4 | 3 | 3 |
| | Sour Taste and Sour Odor Suppression Effect on Vinegar Drink | 3 | 3 | 3 | 3 |
| | Flavor Enhancement Effect on Vinegar Drink | 2 | 2 | 2 | 2 |
| | Comprehensive Evaluation (including Notes) | 3 | 3 | 3 | 3 |
| | Notes | — | — | | A slightly unpleasant feel, but acceptable |

TABLE 3-2-continued

| | | | | | |
|---|---|---|---|---|---|
| Test Example e | Muurolol (parts) | 1 | 5 | 7.5 | 10 |
| | Sour Taste and Sour Odor Suppression Effect on White Rice | 3 | 3 | 3 | 3 |
| | Flavor Enhancement Effect on White Rice | 4 | 4 | 3 | 3 |
| | Sour Taste and Sour Odor Suppression Effect on Vinegar Drink | 3 | 3 | 3 | 3 |
| | Flavor Enhancement Effect on Vinegar Drink | 2 | 2 | 2 | 2 |
| | Comprehensive Evaluation (including Notes) | 3 | 3 | 3 | 3 |
| | Notes | — | — | | A slightly unpleasant feel, but acceptable |
| Test Example f | Cadalene (parts) | 1 | 5 | 7.5 | 10 |
| | Sour Taste and Sour Odor Suppression Effect on White Rice | 3 | 3 | 3 | 3 |
| | Flavor Enhancement Effect on White Rice | 4 | 4 | 3 | 3 |
| | Sour Taste and Sour Odor Suppression Effect on Vinegar Drink | 3 | 3 | 3 | 3 |
| | Flavor Enhancement Effect on Vinegar Drink | 2 | 2 | 2 | 2 |
| | Comprehensive Evaluation (including Notes) | 3 | 3 | 3 | 3 |
| | Notes | — | — | | A slightly unpleasant feel, but acceptable |

| | | (B) Monoterpenes or Sesquiterpenes | Experimental Plot 15 | Experimental Plot 16 | Experimental Plot 17 |
|---|---|---|---|---|---|
| | | Acetic Acid (parts) | 1 | 1 | 1 |
| Test Example b | | Limonene (parts) | 7.5 | 10 | 12.5 |
| | | Sour Taste and Sour Odor Suppression Effect on White Rice | 3 | 3 | 3 |
| | | Flavor Enhancement Effect on White Rice | 1 | 1 | 1 |
| | | Sour Taste and Sour Odor Suppression Effect on Vinegar Drink | 3 | 3 | 3 |
| | | Flavor Enhancement Effect on Vinegar Drink | 1 | 1 | 1 |
| | | Comprehensive Evaluation (including Notes) | 1 | 1 | 1 |
| | | Notes | | An unpleasant feel due to an aromatic component-derived flavor, with the flavor of white rice masked | |
| Test Example c | | Terpinene (parts) | 7.5 | 10 | 12.5 |
| | | Sour Taste and Sour Odor Suppression Effect on White Rice | 3 | 3 | 3 |
| | | Flavor Enhancement Effect on White Rice | 1 | 1 | 1 |
| | | Sour Taste and Sour Odor Suppression Effect on Vinegar Drink | 3 | 3 | 3 |
| | | Flavor Enhancement Effect on Vinegar Drink | 1 | 1 | 1 |
| | | Comprehensive Evaluation (including Notes) | 1 | 1 | 1 |
| | | Notes | | An unpleasant feel due to an aromatic component-derived flavor, with the flavor of white rice masked | |
| Test Example d | | p-Cymene (parts) | 7.5 | 10 | 12.5 |
| | | Sour Taste and Sour Odor Suppression Effect on White Rice | 3 | 3 | 3 |
| | | Flavor Enhancement Effect on White Rice | 1 | 1 | 1 |
| | | Sour Taste and Sour Odor Suppression Effect on Vinegar Drink | 3 | 3 | 3 |
| | | Flavor Enhancement Effect on Vinegar Drink | 1 | 1 | 1 |
| | | Comprehensive Evaluation (including Notes) | 1 | 1 | 1 |
| | | Notes | | An unpleasant feel due to an aromatic component-derived flavor, with the flavor of white rice masked | |
| Test Example e | | Muurolol (parts) | 12.5 | 15 | 17.5 |
| | | Sour Taste and Sour Odor Suppression Effect on White Rice | 3 | 3 | 3 |
| | | Flavor Enhancement Effect on White Rice | 1 | 1 | 1 |
| | | Sour Taste and Sour Odor Suppression Effect on Vinegar Drink | 3 | 3 | 3 |
| | | Flavor Enhancement Effect on Vinegar Drink | 1 | 1 | 1 |
| | | Comprehensive Evaluation (including Notes) | 1 | 1 | 1 |
| | | Notes | | An unpleasant feel due to an aromatic component-derived flavor, with the flavor of white rice masked | |
| Test Example f | | Cadalene (parts) | 12.5 | 15 | 17.5 |
| | | Sour Taste and Sour Odor Suppression Effect on White Rice | 3 | 3 | 3 |
| | | Flavor Enhancement Effect on White Rice | 1 | 1 | 1 |
| | | Sour Taste and Sour Odor Suppression Effect on Vinegar Drink | 3 | 3 | 3 |
| | | Flavor Enhancement Effect on Vinegar Drink | 1 | 1 | 1 |
| | | Comprehensive Evaluation (including Notes) | 1 | 1 | 1 |

TABLE 3-2-continued

| Notes | An unpleasant feel due to an aromatic component-derived flavor, with the flavor of white rice masked |
|---|---|

As shown in Table 3-2, the concentration of (B) a monoterpene or sesquiterpene necessary to bring about the effect of the present invention was within a range in which the peak area ratio measured by solid-phase microextraction-gas chromatography-mass spectrometry is 1 ppm part or more and 10 parts or less with respect to 1 part of acetic acid. It was found that from the standpoint of the intensity of the effects, the lower limit is more preferably 5 ppm parts or more, and still more preferably 10 ppm parts or more. From the standpoint of added flavor derived from the aromatic component, it was found that the upper limit is more preferably 7.5 parts or less, and still more preferably 5 parts or less.

More specifically, it was found that in order to bring about the effect of the present invention, the concentration of limonene, terpinene, or p-cymene, which are (B) a monoterpene or a sesquiterpene, should be within a range in which the peak area ratio measured by solid-phase microextraction-gas chromatography-mass spectrometry is 1 ppm part or more and 5 parts or less with respect to 1 part of acetic acid (experimental plots 3 to 14 of Test Examples b, c, and d). It was also found that from the standpoint of the intensity of the effects, the lower limit is more preferably 5 ppm parts or more, and still more preferably 10 ppm parts or more. From the standpoint of added flavor derived from the aromatic component, the upper limit is more preferably 2.5 parts or less, and still more preferably 1 part or less.

Additionally, it was found that for foods and drinks that are produced or processed under conditions in which acetic acid vaporizes, such as cooked rice, the concentration of limonene, terpinene, or p-cymene that falls within a range in which the peak area ratio measured by solid-phase microextraction-gas chromatography-mass spectrometry is 0.0001 parts or more and 5 parts or less with respect to 1 part of acetic acid is particularly effective (experimental plots 6 to 14 of Test Examples b, c, and d). It was found that from the standpoint of the intensity of the effects, the lower limit is more preferably 0.0005 parts or more, and still more preferably 0.001 parts or more. From the standpoint of added flavor derived from the aromatic component, the upper limit is more preferably 2.5 parts or less, and still more preferably 1 part or less.

Additionally, it was found that for foods and drinks that are not produced or processed under conditions in which acetic acid vaporizes (excluding the heating process performed on sealed containers, such as heating sterilization performed after a container is filled and sealed), the concentration of limonene, terpinene, or p-cymene that falls within a range in which the peak area ratio measured by solid-phase microextraction-gas chromatography-mass spectrometry is 1 ppm part or more and 0.1 parts or less with respect to 1 part of acetic acid is particularly effective (experimental plots 3 to 11 of Test Examples b, c, and d). It was found that from the standpoint of the intensity of the effects, the lower limit is more preferably 5 ppm parts or more, and still more preferably 10 ppm parts or more. From the standpoint of added flavor derived from the aromatic component, it was found that the upper limit is more preferably 0.05 parts or less, and more preferably 0.01 parts or less.

Similarly, it was found that the concentration of muurolol or the concentration of cadalene necessary to bring about the effect of the present invention falls within a range in which the peak area ratio measured by solid-phase microextraction-gas chromatography-mass spectrometry is 1 ppm part or more and 10 parts or less with respect to 1 part of acetic acid (experimental plots 2 to 14 of Test Examples e and f). It was found that from the standpoint of the intensity of the effects, the lower limit is more preferably 5 ppm parts or more, and still more preferably 10 ppm parts or more. From the standpoint of added flavor derived from the aromatic component, it was found that the upper limit is more preferably 7.5 parts or less, and still more preferably 5 parts or less.

Additionally, it was found that for foods and drinks that are produced or processed under conditions in which acetic acid vaporizes, such as cooked rice, the concentration of muurolol and the concentration of cadalene that each fall within a range in which the peak area ratio measured by solid-phase microextraction-gas chromatography-mass spectrometry is 0.001 parts or more and 10 parts or less with respect to 1 part of acetic acid is particularly effective (experimental plots 6 to 14 of Test Examples e and f). It was found that from the standpoint of the intensity of the effects, the lower limit is more preferably 0.005 parts or more, and still more preferably 0.01 parts or more. From the standpoint of added flavor derived from the aromatic component, it was found that the upper limit is more preferably 7.5 parts or less, and still more preferably 5 parts or less.

Additionally, it was found that for foods and drinks that are not produced or processed under conditions in which acetic acid vaporizes (excluding the heating process performed on sealed containers, such as heating sterilization performed after a container is filled and sealed), the concentration of muurolol and the concentration of cadalene that each fall within a range in which the peak area ratio measured by solid-phase microextraction-gas chromatography-mass spectrometry is 1 ppm part or more and 1 part or less with respect to 1 part of acetic acid are particularly effective (experimental plots 2 to 11 of Test Examples e and f). It was also found that from the standpoint of the intensity of the effects, the lower limit is more preferably 5 ppm parts or more, and still more preferably 10 ppm parts or more. From the standpoint of added flavor derived from the aromatic component, it was found that the upper limit is more preferably 0.5 parts or less, and still more preferably 0.1 parts or less.

Example 4: Study on the Range of Concentration of Aromatic Component for Suppressing Sour Taste and Sour Odor 2

In Example 3, the effect and the range of concentration of each of the aromatic components that belong to the groups of aromatic components (A) and (B) were studied. In this Example, the effect and the range of concentration of each of the aromatic components that belong to the group of aromatic component (C) in combined use with an aromatic component that belongs to the group of aromatic component (A) or (B), studied in Example 2, were studied as shown in Table 4. The method of test and study was the same as in Example 3.

Table 4 shows the results.

TABLE 4-1

|  |  | (C) Furan compounds having 5 or 6 carbon atoms | Experimental Plot 1 | Experimental Plot 2 | Experimental Plot 3 |
|---|---|---|---|---|---|
| Combined Component Test Example g | | Acetic Acid (parts) | 1 | 1 | 1 |
| | | Component (A): 1-Octen-3-Ol (parts) | 0.01 | 0.01 | 0.01 |
| | | Furfural (parts) | 0.1 ppm | 1 ppm | 5 ppm |
| | | Sour Taste and Sour Odor Suppression Effect on White Rice | 4 | 4 | 4 |
| | | Flavor Enhancement Effect on White Rice | 4 | 4 | 4 |
| | | Sour Taste and Sour Odor Suppression Effect on Vinegar Drink | 4 | 4 | 4 |
| | | Flavor Enhancement Effect on Vinegar Drink | 4 | 4 | 4 |
| | | Comprehensive Evaluation (including Notes) | 4 | 4 | 4 |
| | | Notes | | No synergy due to combinational use was observed. | |
| Test Example h | | Furfuryl Alcohol (parts) | 0.01 ppm | 0.1 ppm | 1 ppm |
| | | Sour Taste and Sour Odor Suppression Effect on White Rice | 4 | 4 | 4 |
| | | Flavor Enhancement Effect on White Rice | 4 | 4 | 4 |
| | | Sour Taste and Sour Odor Suppression Effect on Vinegar Drink | 4 | 4 | 4 |
| | | Flavor Enhancement Effect on Vinegar Drink | 4 | 4 | 4 |
| | | Comprehensive Evaluation (including Notes) | 4 | 4 | 4 |
| | | Notes | | No synergy due to combinational use was observed. | |
| Test Example i | | 2-Acetylfuran (parts) | 0.01 ppm | 0.1 ppm | 1 ppm |
| | | Sour Taste and Sour Odor Suppression Effect on White Rice | 4 | 4 | 4 |
| | | Flavor Enhancement Effect on White Rice | 4 | 4 | 4 |
| | | Sour Taste and Sour Odor Suppression Effect on Vinegar Drink | 4 | 4 | 4 |
| | | Flavor Enhancement Effect on Vinegar Drink | 4 | 4 | 4 |
| | | Comprehensive Evaluation (including Notes) | 4 | 4 | 4 |
| | | Notes | | No synergy due to combinational use was observed. | |
| Test Example j | | 3-Methylferan (parts) | 0.01 ppm | 0.1 ppm | 1 ppm |
| | | Sour Taste and Sour Odor Suppression Effect on White Rice | 4 | 4 | 4 |
| | | Flavor Enhancement Effect on White Rice | 4 | 4 | 4 |
| | | Sour Taste and Sour Odor Suppression Effect on Vinegar Drink | 4 | 4 | 5 |
| | | Flavor Enhancement Effect on Vinegar Drink | 4 | 4 | 4 |
| | | Comprehensive Evaluation (including Notes) | 4 | 4 | 4 |
| | | Notes | | No synergy due to combinational use was observed. | Persistence of the flavor was increased in addition to increased flavor in line with an increase in the amount of the aromatic component. |
| Test Example k | | 2-Methylferan (parts) | 0.01 ppm | 0.1 ppm | 1 ppm |
| | | Sour Taste and Sour Odor Suppression Effect on White Rice | 4 | 4 | 4 |
| | | Flavor Enhancement Effect on White Rice | 4 | 4 | 4 |
| | | Sour Taste and Sour Odor Suppression Effect on Vinegar Drink | 4 | 4 | 5 |
| | | Flavor Enhancement Effect on Vinegar Drink | 4 | 4 | 4 |
| | | Comprehensive Evaluation (including Notes) | 4 | 4 | 4 |
| | | Notes | | No synergy due to combinational use was observed. | Persistence of the flavor was increased in addition to increased flavor in line with an increase in the amount of the aromatic component. |
| Test Example l | | 2-(5H)-Furanone (parts) | 0.01 ppm | 0.1 ppm | 1 ppm |
| | | Sour Taste and Sour Odor Suppression Effect on White Rice | 4 | 4 | 4 |
| | | Flavor Enhancement Effect on White Rice | 4 | 4 | 4 |
| | | Sour Taste and Sour Odor Suppression Effect on Vinegar Drink | 4 | 4 | 5 |
| | | Flavor Enhancement Effect on Vinegar Drink | 4 | 4 | 4 |
| | | Comprehensive Evaluation (including Notes) | 4 | 4 | 4 |
| | | Notes | | No synergy due to combinational use was observed. | Persistence of the flavor was increased in addition to increased flavor in line with an increase in the amount of the aromatic component. |

TABLE 4-1-continued

| | (C) Furan compounds having 5 or 6 carbon atoms | Experimental Plot 4 | Experimental Plot 5 | Experimental Plot 6 |
|---|---|---|---|---|
| Combined Component | Acetic Acid (parts) | 1 | 1 | 1 |
| | Component (A): 1-Octen-3-Ol (parts) | 0.01 | 0.01 | 0.01 |
| Test Example g | Furfural (parts) | 10 ppm | 50 ppm | 0.0001 |
| | Sour Taste and Sour Odor Suppression Effect on White Rice | 4 | 4 | 5 |
| | Flavor Enhancement Effect on White Rice | 4 | 4 | 4 |
| | Sour Taste and Sour Odor Suppression Effect on Vinegar Drink | 4 | 4 | 4 |
| | Flavor Enhancement Effect on Vinegar Drink | 4 | 4 | 4 |
| | Comprehensive Evaluation (including Notes) | 4 | 4 | 4 |
| | Notes | | No synergy due to combinational use was observed. | Persistence of the flavor was increased in addition to increased flavor in line with an increase in the amount of the aromatic component. |
| Test Example h | Furfuryl Alcohol (parts) | 10 ppm | 50 ppm | 0.0001 |
| | Sour Taste and Sour Odor Suppression Effect on White Rice | 4 | 5 | 5 |
| | Flavor Enhancement Effect on White Rice | 4 | 4 | 4 |
| | Sour Taste and Sour Odor Suppression Effect on Vinegar Drink | 5 | 5 | 5 |
| | Flavor Enhancement Effect on Vinegar Drink | 4 | 4 | 5 |
| | Comprehensive Evaluation (including Notes) | 4 | 5 | 5 |
| | Notes | | | Persistence of the flavor was increased in addition to increased flavor in line with an increase in the amount of the aromatic component. |
| Test Example i | 2-Acetylfuran (parts) | 10 ppm | 50 ppm | 0.0001 |
| | Sour Taste and Sour Odor Suppression Effect on White Rice | 4 | 4 | 5 |
| | Flavor Enhancement Effect on White Rice | 4 | 4 | 4 |
| | Sour Taste and Sour Odor Suppression Effect on Vinegar Drink | 5 | 5 | 5 |
| | Flavor Enhancement Effect on Vinegar Drink | 4 | 4 | 5 |
| | Comprehensive Evaluation (including Notes) | 4 | 4 | 5 |
| | Notes | | | Persistence of the flavor was increased in addition to increased flavor in line with an increase in the amount of the aromatic component. |
| Test Example j | 3-Methylferan (parts) | 5 ppm | 10 ppm | 0.0001 |
| | Sour Taste and Sour Odor Suppression Effect on White Rice | 4 | 4 | 5 |
| | Flavor Enhancement Effect on White Rice | 4 | 4 | 4 |
| | Sour Taste and Sour Odor Suppression Effect on Vinegar Drink | 5 | 5 | 5 |
| | Flavor Enhancement Effect on Vinegar Drink | 4 | 5 | 5 |
| | Comprehensive Evaluation (including Notes) | 4 | 5 | 5 |
| | Notes | | | Persistence of the flavor was increased in addition to increased flavor in line with an increase in the amount of the aromatic component. |
| Test Example k | 2-Methylferan (parts) | 5 ppm | 10 ppm | 0.0001 |
| | Sour Taste and Sour Odor Suppression Effect on White Rice | 4 | 4 | 5 |
| | Flavor Enhancement Effect on White Rice | 4 | 4 | 4 |
| | Sour Taste and Sour Odor Suppression Effect on Vinegar Drink | 5 | 5 | 5 |
| | Flavor Enhancement Effect on Vinegar Drink | 4 | 5 | 5 |
| | Comprehensive Evaluation (including Notes) | 4 | 5 | 5 |
| | Notes | | | Persistence of the flavor was increased in addition to increased flavor in line with an increase in the amount of the aromatic component. |
| Test Example l | 2-(5H)-Furanone (parts) | 5 ppm | 10 ppm | 0.0001 |
| | Sour Taste and Sour Odor Suppression Effect on White Rice | 4 | 4 | 5 |
| | Flavor Enhancement Effect on White Rice | 4 | 4 | 4 |
| | Sour Taste and Sour Odor Suppression Effect on Vinegar Drink | 5 | 5 | 5 |
| | Flavor Enhancement Effect on Vinegar Drink | 4 | 5 | 5 |
| | Comprehensive Evaluation (including Notes) | 4 | 5 | 5 |
| | Notes | | | Persistence of the flavor was increased in addition to increased flavor in line with an increase in the amount of the aromatic component. |

TABLE 4-1-continued

| | (C) Furan compounds having 5 or 6 carbon atoms | Experimental Plot 7 | Experimental Plot 8 | Experimental Plot 9 | Experimental Plot 10 |
|---|---|---|---|---|---|
| Combined Component Test Example g | Acetic Acid (parts) | 1 | 1 | 1 | 1 |
| | Component (A): 1-Octen-3-Ol (parts) | 0.01 | 0.01 | 0.01 | 0.01 |
| | Furfural (parts) | 0.0005 | 0.001 | 0.005 | 0.01 |
| | Sour Taste and Sour Odor Suppression Effect on White Rice | 5 | 5 | 5 | 5 |
| | Flavor Enhancement Effect on White Rice | 4 | 5 | 5 | 5 |
| | Sour Taste and Sour Odor Suppression Effect on Vinegar Drink | 5 | 5 | 5 | 5 |
| | Flavor Enhancement Effect on Vinegar Drink | 4 | 5 | 5 | 5 |
| | Comprehensive Evaluation (including Notes) | 5 | 5 | 5 | 5 |
| | Notes | | Persistence of the flavor was increased in addition to increased flavor in line with an increase in the amount of the aromatic component. | | |
| Test Example h | Furfuryl Alcohol (parts) | 0.001 | 0.005 | 0.01 | 0.1 |
| | Sour Taste and Sour Odor Suppression Effect on White Rice | 5 | 5 | 5 | 5 |
| | Flavor Enhancement Effect on White Rice | 5 | 5 | 5 | 5 |
| | Sour Taste and Sour Odor Suppression Effect on Vinegar Drink | 5 | 5 | 5 | 5 |
| | Flavor Enhancement Effect on Vinegar Drink | 5 | 5 | 5 | 5 |
| | Comprehensive Evaluation (including Notes) | 5 | 5 | 5 | 5 |
| | Notes | | Persistence of the flavor was increased in addition to increased flavor in line with an increase in the amount of the aromatic component. | | |
| Test Example i | 2-Acetylfuran (parts) | 0.0005 | 0.001 | 0.01 | 0.1 |
| | Sour Taste and Sour Odor Suppression Effect on White Rice | 5 | 5 | 5 | 5 |
| | Flavor Enhancement Effect on White Rice | 5 | 5 | 5 | 5 |
| | Sour Taste and Sour Odor Suppression Effect on Vinegar Drink | 5 | 5 | 5 | 5 |
| | Flavor Enhancement Effect on Vinegar Drink | 5 | 5 | 5 | 5 |
| | Comprehensive Evaluation (including Notes) | 5 | 5 | 5 | 5 |
| | Notes | | Persistence of the flavor was increased in addition to increased flavor in line with an increase in the amount of the aromatic component. | | |
| Test Example j | 3-Methylferan (parts) | 0.0005 | 0.001 | 0.01 | 0.05 |
| | Sour Taste and Sour Odor Suppression Effect on White Rice | 5 | 5 | 5 | 5 |
| | Flavor Enhancement Effect on White Rice | 5 | 5 | 5 | 5 |
| | Sour Taste and Sour Odor Suppression Effect on Vinegar Drink | 5 | 5 | 5 | 5 |
| | Flavor Enhancement Effect on Vinegar Drink | 5 | 5 | 5 | 4 |
| | Comprehensive Evaluation (including Notes) | 5 | 5 | 5 | 5 |
| | Notes | | Persistence of the flavor was increased in addition to increased flavor in line with an increase in the amount of the aromatic component. | | |
| Test Example k | 2-Methylferan (parts) | 0.0005 | 0.001 | 0.01 | 0.05 |
| | Sour Taste and Sour Odor Suppression Effect on White Rice | 5 | 5 | 5 | 5 |
| | Flavor Enhancement Effect on White Rice | 5 | 5 | 5 | 5 |
| | Sour Taste and Sour Odor Suppression Effect on Vinegar Drink | 5 | 5 | 5 | 5 |
| | Flavor Enhancement Effect on Vinegar Drink | 5 | 5 | 5 | 4 |
| | Comprehensive Evaluation (including Notes) | 5 | 5 | 5 | 5 |
| | Notes | | Persistence of the flavor was increased in addition to increased flavor in line with an increase in the amount of the aromatic component. | | |
| Test Example l | 2-(5H)-Furanone (parts) | 0.0005 | 0.001 | 0.01 | 0.05 |
| | Sour Taste and Sour Odor Suppression Effect on White Rice | 5 | 5 | 5 | 5 |
| | Flavor Enhancement Effect on White Rice | 5 | 5 | 5 | 5 |
| | Sour Taste and Sour Odor Suppression Effect on Vinegar Drink | 5 | 5 | 5 | 5 |
| | Flavor Enhancement Effect on Vinegar Drink | 5 | 5 | 5 | 4 |
| | Comprehensive Evaluation (including Notes) | 5 | 5 | 5 | 5 |
| | Notes | | Persistence of the flavor was increased in addition to increased flavor in line with an increase in the amount of the aromatic component. | | |

TABLE 4-1-continued

| | (C) Furan compounds having 5 or 6 carbon atoms | Experimental Plot 11 | Experimental Plot 12 | Experimental Plot 13 | Experimental Plot 14 |
|---|---|---|---|---|---|
| Combined Component | Acetic Acid (parts) | 1 | 1 | 1 | 1 |
| | Component (A): 1-Octen-3-Ol (parts) | 0.01 | 0.01 | 0.01 | 0.01 |
| Test Example g | Furfural (parts) | 0.05 | 0.1 | 0.5 | 1 |
| | Sour Taste and Sour Odor Suppression Effect on White Rice | 5 | 5 | 5 | 5 |
| | Flavor Enhancement Effect on White Rice | 5 | 5 | 5 | 5 |
| | Sour Taste and Sour Odor Suppression Effect on Vinegar Drink | 5 | 5 | 5 | 5 |
| | Flavor Enhancement Effect on Vinegar Drink | 5 | 5 | 5 | 5 |
| | Comprehensive Evaluation (including Notes) | 5 | 5 | 5 | 5 |
| | Notes | | Persistence of the flavor was increased in addition to increased flavor in line with an increase in the amount of the aromatic component. | | |
| Test Example h | Furfuryl Alcohol (parts) | 1 | 2.5 | 5 | 10 |
| | Sour Taste and Sour Odor Suppression Effect on White Rice | 5 | 5 | 5 | 5 |
| | Flavor Enhancement Effect on White Rice | 5 | 5 | 5 | 5 |
| | Sour Taste and Sour Odor Suppression Effect on Vinegar Drink | 5 | 5 | 5 | 4 |
| | Flavor Enhancement Effect on Vinegar Drink | 5 | 4 | 4 | 4 |
| | Comprehensive Evaluation (including Notes) | 5 | 5 | 5 | 5 |
| | Notes | | Persistence of the flavor was increased in addition to increased flavor in line with an increase in the amount of the aromatic component. | | |
| Test Example i | 2-Acetylfuran (parts) | 0.5 | 1 | 5 | 10 |
| | Sour Taste and Sour Odor Suppression Effect on White Rice | 5 | 5 | 5 | 5 |
| | Flavor Enhancement Effect on White Rice | 5 | 5 | 5 | 5 |
| | Sour Taste and Sour Odor Suppression Effect on Vinegar Drink | 5 | 5 | 4 | 4 |
| | Flavor Enhancement Effect on Vinegar Drink | 4 | 4 | 4 | 4 |
| | Comprehensive Evaluation (including Notes) | 5 | 5 | 5 | 5 |
| | Notes | | Persistence of the flavor was increased in addition to increased flavor in line with an increase in the amount of the aromatic component. | | |
| Test Example j | 3-Methylferan (parts) | 0.1 | 1 | 5 | 10 |
| | Sour Taste and Sour Odor Suppression Effect on White Rice | 5 | 5 | 5 | 5 |
| | Flavor Enhancement Effect on White Rice | 5 | 5 | 5 | 5 |
| | Sour Taste and Sour Odor Suppression Effect on Vinegar Drink | 5 | 4 | 4 | 4 |
| | Flavor Enhancement Effect on Vinegar Drink | 4 | 4 | 4 | 4 |
| | Comprehensive Evaluation (including Notes) | 5 | 5 | 5 | 5 |
| | Notes | | Persistence of the flavor was increased in addition to increased flavor in line with an increase in the amount of the aromatic component. | | |
| Test Example k | 2-Methylferan (parts) | 0.1 | 1 | 5 | 10 |
| | Sour Taste and Sour Odor Suppression Effect on White Rice | 5 | 5 | 5 | 5 |
| | Flavor Enhancement Effect on White Rice | 5 | 5 | 5 | 5 |
| | Sour Taste and Sour Odor Suppression Effect on Vinegar Drink | 5 | 4 | 4 | 4 |
| | Flavor Enhancement Effect on Vinegar Drink | 4 | 4 | 4 | 4 |
| | Comprehensive Evaluation (including Notes) | 5 | 5 | 5 | 5 |
| | Notes | | Persistence of the flavor was increased in addition to increased flavor in line with an increase in the amount of the aromatic component. | | |
| Test Example l | 2-(5H)-Furanone (parts) | 0.1 | 1 | 5 | 10 |
| | Sour Taste and Sour Odor Suppression Effect on White Rice | 5 | 5 | 5 | 5 |
| | Flavor Enhancement Effect on White Rice | 5 | 5 | 5 | 5 |
| | Sour Taste and Sour Odor Suppression Effect on Vinegar Drink | 5 | 4 | 4 | 4 |
| | Flavor Enhancement Effect on Vinegar Drink | 4 | 4 | 4 | 4 |
| | Comprehensive Evaluation (including Notes) | 5 | 5 | 5 | 5 |
| | Notes | | Persistence of the flavor was increased in addition to increased flavor in line with an increase in the amount of the aromatic component. | | |

TABLE 4-1-continued

| | (C) Furan compounds having 5 or 6 carbon atoms | Experimental Plot 15 | Experimental Plot 16 | Experimental Plot 17 |
|---|---|---|---|---|
| Combined Component Test Example g | Acetic Acid (parts) | 1 | 1 | 1 |
| | Component (A): 1-Octen-3-Ol (parts) | 0.01 | 0.01 | 0.01 |
| | Furfural (parts) | 2.5 | 5 | 7.5 |
| | Sour Taste and Sour Odor Suppression Effect on White Rice | 5 | 5 | 4 |
| | Flavor Enhancement Effect on White Rice | 4 | 4 | 3 |
| | Sour Taste and Sour Odor Suppression Effect on Vinegar Drink | 5 | 4 | 4 |
| | Flavor Enhancement Effect on Vinegar Drink | 4 | 4 | 3 |
| | Comprehensive Evaluation (including Notes) | 5 | 4 | 2 |
| | Notes | | A slightly unpleasant feel, but acceptable | An unpleasant feel due to an aromatic component-derived flavor with the flavor of white rice masked |
| Test Example h | Furfuryl Alcohol (parts) | 12.5 | 15 | 17.5 |
| | Sour Taste and Sour Odor Suppression Effect on White Rice | 5 | 5 | 5 |
| | Flavor Enhancement Effect on White Rice | 4 | 3 | 3 |
| | Sour Taste and Sour Odor Suppression Effect on Vinegar Drink | 4 | 4 | 4 |
| | Flavor Enhancement Effect on Vinegar Drink | 4 | 4 | 2 |
| | Comprehensive Evaluation (including Notes) | 4 | 4 | 1 |
| | Notes | | A slightly unpleasant feel, but acceptable | An unpleasant feel due to an aromatic component-derived flavor with the flavor of white rice masked |
| Test Example i | 2-Acetylfuran (parts) | 12.5 | 15 | 17.5 |
| | Sour Taste and Sour Odor Suppression Effect on White Rice | 5 | 5 | 5 |
| | Flavor Enhancement Effect on White Rice | 4 | 3 | 3 |
| | Sour Taste and Sour Odor Suppression Effect on Vinegar Drink | 4 | 4 | 4 |
| | Flavor Enhancement Effect on Vinegar Drink | 4 | 4 | 2 |
| | Comprehensive Evaluation (including Notes) | 4 | 4 | 1 |
| | Notes | | A slightly unpleasant feel, but acceptable | An unpleasant feel due to an aromatic component-derived flavor with the flavor of white rice masked |
| Test Example j | 3-Methylferan (parts) | 12.5 | 15 | 17.5 |
| | Sour Taste and Sour Odor Suppression Effect on White Rice | 5 | 5 | 5 |
| | Flavor Enhancement Effect on White Rice | 4 | 3 | 3 |
| | Sour Taste and Sour Odor Suppression Effect on Vinegar Drink | 4 | 4 | 4 |
| | Flavor Enhancement Effect on Vinegar Drink | 4 | 4 | 2 |
| | Comprehensive Evaluation (including Notes) | 4 | 4 | 1 |
| | Notes | | A slightly unpleasant feel, but acceptable | An unpleasant feel due to an aromatic component-derived flavor with the flavor of white rice masked |
| Test Example k | 2-Methylferan (parts) | 12.5 | 15 | 17.5 |
| | Sour Taste and Sour Odor Suppression Effect on White Rice | 5 | 5 | 5 |
| | Flavor Enhancement Effect on White Rice | 4 | 4 | 3 |
| | Sour Taste and Sour Odor Suppression Effect on Vinegar Drink | 4 | 4 | 4 |
| | Flavor Enhancement Effect on Vinegar Drink | 3 | 3 | 2 |
| | Comprehensive Evaluation (including Notes) | 4 | 4 | 1 |
| | Notes | | A slightly unpleasant feel, but acceptable | An unpleasant feel due to an aromatic component-derived flavor with the flavor of white rice masked |
| Test Example l | 2-(5H)-Furanone (parts) | 12.5 | 15 | 17.5 |
| | Sour Taste and Sour Odor Suppression Effect on White Rice | 5 | 5 | 5 |
| | Flavor Enhancement Effect on White Rice | 4 | 4 | 3 |
| | Sour Taste and Sour Odor Suppression Effect on Vinegar Drink | 4 | 4 | 4 |
| | Flavor Enhancement Effect on Vinegar Drink | 3 | 3 | 2 |
| | Comprehensive Evaluation (including Notes) | 4 | 4 | 1 |
| | Notes | | A slightly unpleasant feel, but acceptable | An unpleasant feel due to an aromatic component-derived flavor with the flavor of white rice masked |

As shown in Table 4-1, it was found that in the combined use of 1-octen-3-ol, which is (A) an unsaturated alcohol having 8 carbon atoms, with (B) a furan compound having 5 or 6 carbon atoms, the concentration of component (C) necessary to bring about the effect of the present invention falls within a range in which the peak area ratio measured by solid-phase microextraction-gas chromatography-mass spectrometry is 1 ppm part or more and 15 parts or less with respect to 1 part of acetic acid. It was found that from the standpoint of the intensity of the effects and the persistence of the flavor, the lower limit is more preferably 5 ppm parts or more, and still more preferably 10 ppm parts or more. From the standpoint of added flavor derived from the aromatic component, it was found that the upper limit is more preferably 12.5 parts or less, and still more preferably 10 parts or less.

More specifically, it was similarly found that the concentration of furfural, which is (C) a furan compound having 5 or 6 carbon atoms, necessary to bring about the effect of the present invention should be within a range in which the peak area ratio measured by solid-phase microextraction-gas chromatography-mass spectrometry is 0.0001 parts or more and 5 parts or less with respect to 1 part of acetic acid (experimental plots 6-16 of Test Example g). From the standpoint of the intensity of the effect and the persistence of the flavor, the lower limit is more preferably 0.0005 parts or more, and still more preferably 0.001 parts or more. From the standpoint of added flavor derived from the aromatic component, it was found that the upper limit is more preferably 2.5 parts or less, and still more preferably 1 part or less.

Additionally, it was found that for foods and drinks that are produced or processed under conditions in which acetic acid vaporizes, such as cooked rice, the concentration of furfural that falls within a range in which the peak area ratio measured by solid-phase microextraction-gas chromatography-mass spectrometry is 0.0001 parts or more and 5 parts or less with respect to 1 part of acetic acid is particularly effective (experimental plots 6 to 16 of Test Example g). From the standpoint of the intensity of the effect, it was found that the lower limit is more preferably 0.0005 parts or more, and still more preferably 0.001 parts or more. From the standpoint of added flavor derived from the aromatic component, it was found that the upper limit is more preferably 2.5 parts or less, and still more preferably 1 part or less.

Additionally, for foods and drinks that are not produced or processed under conditions in which acetic acid vaporizes (excluding the heating process performed on sealed containers, such as heating sterilization performed after a container is filled and sealed), the concentration of furfural that falls within a range in which the peak area ratio measured by solid-phase microextraction-gas chromatography-mass spectrometry is 0.0001 parts or more and 5 parts or less with respect to 1 part of acetic acid is particularly effective (experimental plots 6 to 16 of Test Example g). It was found that from the standpoint of the intensity of the effects, the lower limit is more preferably 0.0005 parts or more, and still more preferably 0.001 parts or more. It was found that from the standpoint of added flavor derived from the aromatic component, the upper limit is more preferably 2.5 parts or less, and still more preferably 1 part or less.

Similarly, it was found that the concentration of furfuryl alcohol necessary to bring about the effect of the present invention is within a range in which the peak area ratio measured by solid-phase microextraction-gas chromatography-mass spectrometry is 10 ppm parts or more and 15 parts or less with respect to 1 part of acetic acid (experimental plots 4 to 16 of Test Example h). It was found that from the standpoint of the intensity of the effects and the persistence of the flavor, the lower limit is more preferably 50 ppm parts or more, and still more preferably 0.0001 parts or more. It was found that from the standpoint of added flavor derived from the aromatic component, the upper limit is more preferably 12.5 parts or less, and still more preferably 10 parts or less.

Additionally, it was found that for foods and drinks that are produced or processed under conditions in which acetic acid vaporizes, such as cooked rice, the concentration of furfuryl alcohol that falls within a range in which the peak area ratio measured by solid-phase microextraction-gas chromatography-mass spectrometry is 0.001 parts or more and 15 parts or less with respect to 1 part of acetic acid is particularly effective (experimental plots 7 to 16 of Test Example h). It was found that from the standpoint of the intensity of the effects, the lower limit is more preferably 0.005 parts or more, and still more preferably 0.01 parts or more. It was found that from the standpoint of added flavor derived from the aromatic component, the upper limit is more preferably 12.5 parts or less, and still more preferably 10 parts or less.

Additionally, it was found that for foods and drinks that are not produced or processed under conditions in which acetic acid vaporizes (excluding the heating process performed on sealed containers, such as heating sterilization performed after a container is filled and sealed), the concentration of furfuryl alcohol that falls within a range in which the peak area ratio measured by solid-phase microextraction-gas chromatography-mass spectrometry is 10 ppm parts or more and 5 parts or less with respect to 1 part of acetic acid is particularly effective (experimental plots 4 to 13 of Test Example h). It was found that from the standpoint of the intensity of the effects, the lower limit is more preferably 50 ppm parts or more, and still more preferably 0.0001 parts or more. It was found that from the standpoint of added flavor derived from the aromatic component, the upper limit is more preferably 2.5 parts or less, and still more preferably 1 part or less.

Similarly, it was found that the concentration of 2-acetylfuran necessary to bring about the effect of the present invention is within a range in which the peak area ratio measured by solid-phase microextraction-gas chromatography-mass spectrometry is 10 ppm parts or more and 15 parts or less with respect to 1 part of acetic acid (experimental plots 4 to 16 of Test Example i). It was found that from the standpoint of the intensity of the effects and the persistence of the flavor, the lower limit is more preferably 50 ppm parts or more, and still more preferably 0.0001 parts or more. It was found that from the standpoint of added flavor derived from the aromatic component, the upper limit is more preferably 12.5 parts or less, and still more preferably 10 parts or less.

Additionally, it was found that for foods and drinks that are produced or processed under conditions in which acetic acid vaporizes, such as cooked rice, the concentration of 2-acetylfuran that falls within a range in which the peak area ratio measured by solid-phase microextraction-gas chromatography-mass spectrometry is 0.0001 parts or more and 15 parts or less with respect to 1 part of acetic acid is particularly effective (experimental plots 6 to 16 of Test Example i). It was found that from the standpoint of the intensity of the effects, the lower limit is more preferably 0.0005 parts or more, and still more preferably 0.001 parts or more. It was found that from the standpoint of added flavor derived from the aromatic component, the upper limit is more preferably 12.5 parts or less, and still more preferably 10 parts or less.

Additionally, it was found that for foods and drinks that are not produced or processed under conditions in which acetic acid vaporizes (excluding the heating process performed on sealed containers, such as heating sterilization performed after a container is filled and sealed), the concentration of 2-acetylfuran that falls within a range in which the peak area ratio measured by solid-phase microextraction-gas chromatography-mass spectrometry is 10 ppm parts or more and 1 part or less with respect to 1 part of acetic acid is particularly effective (experimental plots 4 to 11 of Test Example i). It was found that from the standpoint of the intensity of the effects, the lower limit is more preferably 50 ppm parts or more, and still more preferably 0.0001 parts or more. It was found that from the standpoint of added flavor derived from the aromatic component, the upper limit is more preferably 0.5 parts or less, and still more preferably 0.1 parts or less.

Similarly, it was found that the concentration of 3-methylfuran, 2-methylfuran, or 2-(5H)-furanone necessary to bring about the effect of the present invention falls within a range in which the peak area ratio measured by solid-phase microextraction-gas chromatography-mass spectrometry is 1 ppm part or more and 15 parts or less with respect to 1 part of acetic acid (experimental plots 3 to 16 of Test Examples j, k, and l). It was found that from the standpoint of the intensity of the effects and the persistence of the flavor, the lower limit is more preferably 5 ppm or more, and still more preferably 10 ppm or more. It was found that from the standpoint of added flavor derived from the aromatic component, the upper limit is more preferably 12.5 parts or less, and still more preferably 10 parts or less.

Additionally, it was found that for foods and drinks that are produced or processed under conditions in which acetic acid vaporizes, such as cooked rice, the concentration of 3-methylfuran, 2-methylfuran, or 2-(5H)-furanone that falls within a range in which the peak area ratio measured by solid-phase microextraction-gas chromatography-mass spectrometry is 0.0001 parts or more and 15 parts or less with respect to 1 part of acetic acid is particularly effective (experimental plots 6 to 16 of Test Examples j, k, and l). It was found that from the standpoint of the intensity of the effects, the lower limit is more preferably 0.0005 parts or more, and still more preferably 0.001 parts or more. It was found that from the standpoint of added flavor derived from the aromatic component, the upper limit is more preferably 12.5 parts or less, and still more preferably 10 parts or less.

Additionally, it was found that for foods and drinks that are not produced or processed under conditions in which acetic acid vaporizes (excluding the heating process performed on sealed containers, such as heating sterilization performed after a container is filled and sealed), the concentration of 3-methylfuran, 2-methylfuran, or 2-(5H)-furanone that falls within a range in which the peak area ratio measured by solid-phase microextraction-gas chromatography-mass spectrometry is 1 ppm part or more and 0.1 parts or less with respect to 1 part of acetic acid is particularly effective (experimental plots 3 to 11 of Test Examples j, k, and l). It was found that from the standpoint of the intensity of the effects, the lower limit is more preferably 5 ppm parts or more, and still more preferably 10 ppm parts or more. It was found that from the standpoint of added flavor derived from the aromatic component, the upper limit is more preferably 0.05 parts or less, and still more preferably 0.01 parts or less.

TABLE 4-2

| | (C) Furan compounds having 5 or 6 carbon atoms | Experimental Plot 1 | Experimental Plot 2 | Experimental Plot 3 |
|---|---|---|---|---|
| Combined Component Test Example m | Acetic Acid (parts) | 1 | 1 | 1 |
| | Component (B): Limonene (ppm) | 0.01 | 0.01 | 0.01 |
| | Furfural (parts) | 0.1 ppm | 1 ppm | 5 ppm |
| | Sour Taste and Sour Odor Suppression Effect on White Rice | 3 | 3 | 3 |
| | Flavor Enhancement Effect on White Rice | 4 | 4 | 4 |
| | Sour Taste and Sour Odor Suppression Effect on Vinegar Drink | 3 | 3 | 3 |
| | Flavor Enhancement Effect on Vinegar Drink | 4 | 4 | 4 |
| | Comprehensive Evaluation (including Notes) | 3 | 3 | 3 |
| | Notes | | No synergy due to combinational use was observed. | |
| Test Example n | Furfuryl Alcohol (parts) | 0.01 ppm | 0.1 ppm | 1 ppm |
| | Sour Taste and Sour Odor Suppression Effect on White Rice | 3 | 3 | 3 |
| | Flavor Enhancement Effect on White Rice | 4 | 4 | 4 |
| | Sour Taste and Sour Odor Suppression Effect on Vinegar Drink | 3 | 3 | 3 |
| | Flavor Enhancement Effect on Vinegar Drink | 4 | 4 | 4 |
| | Comprehensive Evaluation (including Notes) | 3 | 3 | 3 |
| | Notes | | No synergy due to combinational use was observed. | |
| Test Example o | 2-Acetylfuran (parts) | 0.01 ppm | 0.1 ppm | 1 ppm |
| | Sour Taste and Sour Odor Suppression Effect on White Rice | 3 | 3 | 3 |
| | Flavor Enhancement Effect on White Rice | 4 | 4 | 4 |
| | Sour Taste and Sour Odor Suppression Effect on Vinegar Drink | 3 | 3 | 3 |
| | Flavor Enhancement Effect on Vinegar Drink | 4 | 4 | 4 |
| | Comprehensive Evaluation (including Notes) | 3 | 3 | 3 |
| | Notes | | No synergy due to combinational use was observed. | |
| Test Example p | 3-Methylfuran (parts) | 0.01 ppm | 0.1 ppm | 1 ppm |
| | Sour Taste and Sour Odor Suppression Effect on White Rice | 3 | 3 | 3 |
| | Flavor Enhancement Effect on White Rice | 4 | 4 | 4 |

TABLE 4-2-continued

|  |  |  |  |  |
|---|---|---|---|---|
|  | Sour Taste and Sour Odor Suppression Effect on Vinegar Drink | 3 | 3 | 4 |
|  | Flavor Enhancement Effect on Vinegar Drink | 4 | 4 | 4 |
|  | Comprehensive Evaluation (including Notes) | 3 | 3 | 4 |
|  | Notes |  | No synergy due to combinational use was observed. | Persistence of the flavor was increased in addition to increased flavor in line with an increase in the amount of the aromatic component. |
| Test Example q | 2-Methylfuran (parts) | 0.01 ppm | 0.1 ppm | 1 ppm |
|  | Sour Taste and Sour Odor Suppression Effect on White Rice | 3 | 3 | 4 |
|  | Flavor Enhancement Effect on White Rice | 4 | 4 | 4 |
|  | Sour Taste and Sour Odor Suppression Effect on Vinegar Drink | 3 | 3 | 4 |
|  | Flavor Enhancement Effect on Vinegar Drink | 4 | 4 | 4 |
|  | Comprehensive Evaluation (including Notes) | 3 | 3 | 4 |
|  | Notes |  | No synergy due to combinational use was observed. | Persistence of the flavor was increased in addition to increased flavor in line with an increase in the amount of the aromatic component. |
| Test Example r | 2-(5H)-Furanone (parts) | 0.01 ppm | 0.1 ppm | 1 ppm |
|  | Sour Taste and Sour Odor Suppression Effect on White Rice | 3 | 3 | 3 |
|  | Flavor Enhancement Effect on White Rice | 4 | 4 | 4 |
|  | Sour Taste and Sour Odor Suppression Effect on Vinegar Drink | 3 | 3 | 4 |
|  | Flavor Enhancement Effect on Vinegar Drink | 4 | 4 | 4 |
|  | Comprehensive Evaluation (including Notes) | 3 | 3 | 4 |
|  | Notes |  | No synergy due to combinational use was observed. | Persistence of the flavor was increased in addition to increased flavor in line with an increase in the amount of the aromatic component. |

|  | (C) Furan compounds having 5 or 6 carbon atoms | Experimental Plot 4 | Experimental Plot 5 | Experimental Plot 6 |
|---|---|---|---|---|
| Combined Component | Acetic Acid (parts) | 1 | 1 | 1 |
|  | Component (B): Limonene (ppm) | 0.01 | 0.01 | 0.01 |
| Test Example m | Furfural (parts) | 10 ppm | 50 ppm | 0.0001 |
|  | Sour Taste and Sour Odor Suppression Effect on White Rice | 3 | 3 | 4 |
|  | Flavor Enhancement Effect on White Rice | 4 | 4 | 4 |
|  | Sour Taste and Sour Odor Suppression Effect on Vinegar Drink | 3 | 3 | 4 |
|  | Flavor Enhancement Effect on Vinegar Drink | 4 | 4 | 4 |
|  | Comprehensive Evaluation (including Notes) | 3 | 3 | 4 |
|  | Notes |  | No synergy due to combinational use was observed. | Persistence of the flavor was increased in addition to increased flavor in line with an increase in the amount of the aromatic component. |
| Test Example n | Furfuryl Alcohol (parts) | 10 ppm | 50 ppm | 0.0001 |
|  | Sour Taste and Sour Odor Suppression Effect on White Rice | 4 | 4 | 4 |
|  | Flavor Enhancement Effect on White Rice | 4 | 4 | 4 |
|  | Sour Taste and Sour Odor Suppression Effect on Vinegar Drink | 4 | 4 | 4 |
|  | Flavor Enhancement Effect on Vinegar Drink | 4 | 5 | 5 |
|  | Comprehensive Evaluation (including Notes) | 4 | 4 | 4 |
|  | Notes |  | Persistence of the flavor was increased in addition to increased flavor in line with an increase in the amount of the aromatic component. |  |
| Test Example o | 2-Acetylfuran (parts) | 10 ppm | 50 ppm | 0.0001 |
|  | Sour Taste and Sour Odor Suppression Effect on White Rice | 4 | 4 | 4 |
|  | Flavor Enhancement Effect on White Rice | 4 | 4 | 5 |
|  | Sour Taste and Sour Odor Suppression Effect on Vinegar Drink | 4 | 4 | 4 |
|  | Flavor Enhancement Effect on Vinegar Drink | 4 | 5 | 5 |
|  | Comprehensive Evaluation (including Notes) | 4 | 4 | 4 |
|  | Notes |  | Persistence of the flavor was increased in addition to increased flavor in line with an increase in the amount of the aromatic component. |  |
| Test Example p | 3-Methylfuran (parts) | 5 ppm | 10 ppm | 0.0001 |
|  | Sour Taste and Sour Odor Suppression Effect on White Rice | 3 | 3 | 4 |
|  | Flavor Enhancement Effect on White Rice | 4 | 4 | 4 |
|  | Sour Taste and Sour Odor Suppression Effect on Vinegar Drink | 4 | 4 | 4 |
|  | Flavor Enhancement Effect on Vinegar Drink | 4 | 5 | 5 |
|  | Comprehensive Evaluation (including Notes) | 4 | 4 | 4 |

TABLE 4-2-continued

|  |  |  |  |  |
|---|---|---|---|---|
|  | Notes |  | Persistence of the flavor was increased in addition to increased flavor in line with an increase in the amount of the aromatic component. |  |
| Test Example q | 2-Methylfuran (parts) | 5 ppm | 10 ppm | 0.0001 |
|  | Sour Taste and Sour Odor Suppression Effect on White Rice | 3 | 3 | 4 |
|  | Flavor Enhancement Effect on White Rice | 4 | 4 | 4 |
|  | Sour Taste and Sour Odor Suppression Effect on Vinegar Drink | 4 | 4 | 4 |
|  | Flavor Enhancement Effect on Vinegar Drink | 4 | 5 | 5 |
|  | Comprehensive Evaluation (including Notes) | 4 | 4 | 4 |
|  | Notes |  | Persistence of the flavor was increased in addition to increased flavor in line with an increase in the amount of the aromatic component. |  |
| Test Example r | 2-(5H)-Furanone (parts) | 5 ppm | 10 ppm | 0.0001 |
|  | Sour Taste and Sour Odor Suppression Effect on White Rice | 3 | 3 | 4 |
|  | Flavor Enhancement Effect on White Rice | 4 | 4 | 4 |
|  | Sour Taste and Sour Odor Suppression Effect on Vinegar Drink | 4 | 4 | 4 |
|  | Flavor Enhancement Effect on Vinegar Drink | 4 | 5 | 5 |
|  | Comprehensive Evaluation (including Notes) | 4 | 4 | 4 |
|  | Notes |  | Persistence of the flavor was increased in addition to increased flavor in line with an increase in the amount of the aromatic component. |  |

|  | (C) Furan compounds having 5 or 6 carbon atoms | Experimental Plot 7 | Experimental Plot 8 | Experimental Plot 9 | Experimental Plot 10 |
|---|---|---|---|---|---|
| Combined Component | Acetic Acid (parts) | 1 | 1 | 1 | 1 |
|  | Component (B): Limonene (ppm) | 0.01 | 0.01 | 0.01 | 0.01 |
| Test Example m | Furfural (parts) | 0.0005 | 0.001 | 0.005 | 0.01 |
|  | Sour Taste and Sour Odor Suppression Effect on White Rice | 4 | 4 | 4 | 4 |
|  | Flavor Enhancement Effect on White Rice | 5 | 5 | 5 | 5 |
|  | Sour Taste and Sour Odor Suppression Effect on Vinegar Drink | 4 | 4 | 4 | 4 |
|  | Flavor Enhancement Effect on Vinegar Drink | 4 | 5 | 5 | 5 |
|  | Comprehensive Evaluation (including Notes) | 4 | 4 | 4 | 4 |
|  | Notes |  | Persistence of the flavor was increased in addition to increased flavor in line with an increase in the amount of the aromatic component. |  |  |
| Test Example n | Furfuryl Alcohol (parts) | 0.001 | 0.005 | 0.01 | 0.1 |
|  | Sour Taste and Sour Odor Suppression Effect on White Rice | 4 | 4 | 4 | 4 |
|  | Flavor Enhancement Effect on White Rice | 4 | 5 | 5 | 5 |
|  | Sour Taste and Sour Odor Suppression Effect on Vinegar Drink | 4 | 4 | 4 | 4 |
|  | Flavor Enhancement Effect on Vinegar Drink | 5 | 5 | 5 | 5 |
|  | Comprehensive Evaluation (including Notes) | 4 | 4 | 4 | 4 |
|  | Notes |  | Persistence of the flavor was increased in addition to increased flavor in line with an increase in the amount of the aromatic component. |  |  |
| Test Example o | 2-Acetylfuran (parts) | 0.0005 | 0.001 | 0.01 | 0.1 |
|  | Sour Taste and Sour Odor Suppression Effect on White Rice | 4 | 4 | 4 | 4 |
|  | Flavor Enhancement Effect on White Rice | 5 | 5 | 5 | 5 |
|  | Sour Taste and Sour Odor Suppression Effect on Vinegar Drink | 4 | 4 | 4 | 4 |
|  | Flavor Enhancement Effect on Vinegar Drink | 5 | 5 | 5 | 5 |
|  | Comprehensive Evaluation (including Notes) | 4 | 4 | 4 | 4 |
|  | Notes |  | Persistence of the flavor was increased in addition to increased flavor in line with an increase in the amount of the aromatic component. |  |  |
| Test Example p | 3-Methylfuran (parts) | 0.0005 | 0.001 | 0.01 | 0.05 |
|  | Sour Taste and Sour Odor Suppression Effect on White Rice | 4 | 4 | 4 | 4 |
|  | Flavor Enhancement Effect on White Rice | 5 | 5 | 5 | 5 |
|  | Sour Taste and Sour Odor Suppression Effect on Vinegar Drink | 4 | 4 | 4 | 4 |
|  | Flavor Enhancement Effect on Vinegar Drink | 5 | 5 | 5 | 5 |
|  | Comprehensive Evaluation (including Notes) | 4 | 4 | 4 | 4 |
|  | Notes |  | Persistence of the flavor was increased in addition to increased flavor in line with an increase in the amount of the aromatic component. |  |  |
| Test Example q | 2-Methylfuran (parts) | 0.0005 | 0.001 | 0.01 | 0.05 |
|  | Sour Taste and Sour Odor Suppression Effect on White Rice | 4 | 4 | 4 | 4 |

TABLE 4-2-continued

|  |  |  |  |  |  |
|---|---|---|---|---|---|
|  | Flavor Enhancement Effect on White Rice | 5 | 5 | 5 | 5 |
|  | Sour Taste and Sour Odor Suppression Effect on Vinegar Drink | 4 | 4 | 4 | 4 |
|  | Flavor Enhancement Effect on Vinegar Drink | 5 | 5 | 5 | 5 |
|  | Comprehensive Evaluation (including Notes) | 4 | 4 | 4 | 4 |
|  | Notes |  | Persistence of the flavor was increased in addition to increased flavor in line with an increase in the amount of the aromatic component. | | |
| Test Example r | 2-(5H)-Furanone (parts) | 0.0005 | 0.001 | 0.01 | 0.05 |
|  | Sour Taste and Sour Odor Suppression Effect on White Rice | 4 | 4 | 4 | 4 |
|  | Flavor Enhancement Effect on White Rice | 5 | 5 | 5 | 5 |
|  | Sour Taste and Sour Odor Suppression Effect on Vinegar Drink | 4 | 4 | 4 | 4 |
|  | Flavor Enhancement Effect on Vinegar Drink | 5 | 5 | 5 | 5 |
|  | Comprehensive Evaluation (including Notes) | 4 | 4 | 4 | 4 |
|  | Notes |  | Persistence of the flavor was increased in addition to increased flavor in line with an increase in the amount of the aromatic component. | | |

|  | (C) Furan compounds having 5 or 6 carbon atoms | Experimental Plot 11 | Experimental Plot 12 | Experimental Plot 13 | Experimental Plot 14 |
|---|---|---|---|---|---|
| Combined Component | Acetic Acid (parts) | 1 | 1 | 1 | 1 |
|  | Component (B): Limonene (ppm) | 0.01 | 0.01 | 0.01 | 0.01 |
| Test Example m | Furfural (parts) | 0.05 | 0.1 | 0.5 | 1 |
|  | Sour Taste and Sour Odor Suppression Effect on White Rice | 4 | 4 | 4 | 4 |
|  | Flavor Enhancement Effect on White Rice | 5 | 5 | 5 | 5 |
|  | Sour Taste and Sour Odor Suppression Effect on Vinegar Drink | 4 | 4 | 4 | 4 |
|  | Flavor Enhancement Effect on Vinegar Drink | 5 | 5 | 5 | 5 |
|  | Comprehensive Evaluation (including Notes) | 4 | 4 | 4 | 4 |
|  | Notes |  | Persistence of the flavor was increased in addition to increased flavor in line with an increase in the amount of the aromatic component. | | |
| Test Example n | Furfuryl Alcohol (parts) | 1 | 2.5 | 5 | 10 |
|  | Sour Taste and Sour Odor Suppression Effect on White Rice | 4 | 5 | 5 | 5 |
|  | Flavor Enhancement Effect on White Rice | 5 | 5 | 5 | 5 |
|  | Sour Taste and Sour Odor Suppression Effect on Vinegar Drink | 4 | 4 | 4 | 4 |
|  | Flavor Enhancement Effect on Vinegar Drink | 5 | 5 | 5 | 5 |
|  | Comprehensive Evaluation (including Notes) | 4 | 4 | 4 | 4 |
|  | Notes |  | Persistence of the flavor was increased in addition to increased flavor in line with an increase in the amount of the aromatic component. | | |
| Test Example o | 2-Acetylfuran (parts) | 0.5 | 1 | 5 | 10 |
|  | Sour Taste and Sour Odor Suppression Effect on White Rice | 4 | 4 | 4 | 4 |
|  | Flavor Enhancement Effect on White Rice | 5 | 5 | 5 | 5 |
|  | Sour Taste and Sour Odor Suppression Effect on Vinegar Drink | 4 | 4 | 4 | 4 |
|  | Flavor Enhancement Effect on Vinegar Drink | 5 | 5 | 5 | 5 |
|  | Comprehensive Evaluation (including Notes) | 4 | 4 | 4 | 4 |
|  | Notes |  | Persistence of the flavor was increased in addition to increased flavor in line with an increase in the amount of the aromatic component. | | |
| Test Example p | 3-Methylfuran (parts) | 0.1 | 1 | 5 | 10 |
|  | Sour Taste and Sour Odor Suppression Effect on White Rice | 4 | 4 | 4 | 4 |
|  | Flavor Enhancement Effect on White Rice | 5 | 5 | 5 | 5 |
|  | Sour Taste and Sour Odor Suppression Effect on Vinegar Drink | 4 | 4 | 4 | 4 |
|  | Flavor Enhancement Effect on Vinegar Drink | 4 | 4 | 4 | 4 |
|  | Comprehensive Evaluation (including Notes) | 4 | 4 | 4 | 4 |
|  | Notes |  | Persistence of the flavor was increased in addition to increased flavor in line with an increase in the amount of the aromatic component. | | |
| Test Example q | 2-Methylfuran (parts) | 0.1 | 1 | 5 | 10 |
|  | Sour Taste and Sour Odor Suppression Effect on White Rice | 4 | 4 | 4 | 4 |
|  | Flavor Enhancement Effect on White Rice | 5 | 5 | 5 | 5 |
|  | Sour Taste and Sour Odor Suppression Effect on Vinegar Drink | 4 | 4 | 4 | 4 |
|  | Flavor Enhancement Effect on Vinegar Drink | 4 | 4 | 4 | 4 |
|  | Comprehensive Evaluation (including Notes) | 4 | 4 | 4 | 4 |
|  | Notes |  | Persistence of the flavor was increased in addition to increased flavor in line with | | |

TABLE 4-2-continued

| | | | an increase in the amount of the aromatic component. | | |
|---|---|---|---|---|---|
| Test Example r | 2-(5H)-Furanone (parts) | 01 | 1 | 5 | 10 |
| | Sour Taste and Sour Odor Suppression Effect on White Rice | 4 | 4 | 4 | 4 |
| | Flavor Enhancement Effect on White Rice | 5 | 5 | 5 | 5 |
| | Sour Taste and Sour Odor Suppression Effect on Vinegar Drink | 4 | 4 | 4 | 4 |
| | Flavor Enhancement Effect on Vinegar Drink | 4 | 4 | 4 | 4 |
| | Comprehensive Evaluation (including Notes) | 4 | 4 | 4 | 4 |
| | Notes | | Persistence of the flavor was increased in addition to increased flavor in line with an increase in the amount of the aromatic component. | | |

| | (C) Furan compounds having 5 or 6 carbon atoms | Experimental Plot 15 | Experimental Plot 16 | Experimental Plot 17 |
|---|---|---|---|---|
| Combined Component Test Example m | Acetic Acid (parts) | 1 | 1 | 1 |
| | Component (B): Limonene (ppm) | 0.01 | 0.01 | 0.01 |
| | Furfural (parts) | 2.5 | 5 | 7.5 |
| | Sour Taste and Sour Odor Suppression Effect on White Rice | 4 | 4 | 5 |
| | Flavor Enhancement Effect on White Rice | 4 | 4 | 3 |
| | Sour Taste and Sour Odor Suppression Effect on Vinegar Drink | 4 | 4 | 4 |
| | Flavor Enhancement Effect on Vinegar Drink | 5 | 4 | 3 |
| | Comprehensive Evaluation (including Notes) | 4 | 4 | 2 |
| | Notes | | A slightly unpleasant feel, but acceptable | An unpleasant feel due to an aromatic component-derived flavor, with the flavor of white rice masked |
| Test Example n | Furfuryl Alcohol (parts) | 12.5 | 15 | 17.5 |
| | Sour Taste and Sour Odor Suppression Effect on White Rice | 5 | 5 | 5 |
| | Flavor Enhancement Effect on White Rice | 4 | 4 | 3 |
| | Sour Taste and Sour Odor Suppression Effect on Vinegar Drink | 4 | 4 | 4 |
| | Flavor Enhancement Effect on Vinegar Drink | 4 | 4 | 3 |
| | Comprehensive Evaluation (including Notes) | 4 | 4 | 1 |
| | Notes | | A slightly unpleasant feel, but acceptable | An unpleasant feel due to an aromatic component-derived flavor, with the flavor of white rice masked |
| Test Example o | 2-Acetylfuran (parts) | 12.5 | 15 | 17.5 |
| | Sour Taste and Sour Odor Suppression Effect on White Rice | 4 | 4 | 5 |
| | Flavor Enhancement Effect on White Rice | 4 | 3 | 3 |
| | Sour Taste and Sour Odor Suppression Effect on Vinegar Drink | 4 | 4 | 4 |
| | Flavor Enhancement Effect on Vinegar Drink | 4 | 4 | 3 |
| | Comprehensive Evaluation (including Notes) | 4 | 4 | 1 |
| | Notes | | A slightly unpleasant feel, but acceptable | An unpleasant feel due to an aromatic component-derived flavor, with the flavor of white rice masked |
| Test Example p | 3-Methylfuran (parts) | 12.5 | 15 | 17.5 |
| | Sour Taste and Sour Odor Suppression Effect on White Rice | 4 | 4 | 5 |
| | Flavor Enhancement Effect on White Rice | 5 | 4 | 3 |
| | Sour Taste and Sour Odor Suppression Effect on Vinegar Drink | 3 | 3 | 2 |
| | Flavor Enhancement Effect on Vinegar Drink | 4 | 4 | 3 |
| | Comprehensive Evaluation (including Notes) | 4 | 4 | 1 |
| | Notes | | A slightly unpleasant feel, but acceptable | An unpleasant feel due to an aromatic component-derived flavor, with the flavor of white rice masked |
| Test Example q | 2-Methylfuran (parts) | 12.5 | 15 | 17.5 |
| | Sour Taste and Sour Odor Suppression Effect on White Rice | 4 | 4 | 5 |
| | Flavor Enhancement Effect on White Rice | 5 | 4 | 3 |
| | Sour Taste and Sour Odor Suppression Effect on Vinegar Drink | 3 | 3 | 2 |
| | Flavor Enhancement Effect on Vinegar Drink | 4 | 4 | 3 |
| | Comprehensive Evaluation (including Notes) | 4 | 4 | 1 |
| | Notes | | A slightly unpleasant feel, but acceptable | An unpleasant feel due to an aromatic component-derived flavor, with the flavor of white rice masked |

TABLE 4-2-continued

| | | | | |
|---|---|---|---|---|
| Test | 2-(5H)-Furanone (parts) | 12.5 | 15 | 17.5 |
| Example r | Sour Taste and Sour Odor Suppression Effect on White Rice | 4 | 4 | 5 |
| | Flavor Enhancement Effect on White Rice | 5 | 4 | 3 |
| | Sour Taste and Sour Odor Suppression Effect on Vinegar Drink | 3 | 3 | 2 |
| | Flavor Enhancement Effect on Vinegar Drink | 4 | 4 | 3 |
| | Comprehensive Evaluation (including Notes) | 4 | 4 | 1 |
| | Notes | | A slightly unpleasant feel, but acceptable | An unpleasant feel due to an aromatic component-derived flavor, with the flavor of white rice masked |

As shown in Table 4-2, it was found that in combined use of (B) a monoterpene or a sesquiterpene with (C) a furan compound having 5 or 6 carbon atoms, the concentration of component (C) necessary to bring about the effect of the present invention falls within a range in which the peak area ratio measured by solid-phase microextraction-gas chromatography-mass spectrometry is 1 ppm part or more and 15 parts or less with respect to 1 part of acetic acid. It was found that from the standpoint of the intensity of the effects and the persistence of the flavor, the lower limit is more preferably 5 ppm parts or more, and still more preferably 10 ppm parts or more. It was found that from the standpoint of added flavor derived from the aromatic component, the upper limit is more preferably 12.5 parts or less, and still more preferably 10 parts or less.

More specifically, it was similarly found that in order to bring about the effect of the present invention, the concentration of furfural, which is (C) a furan compound having 5 or 6 carbon atoms, should be within a range in which the peak area ratio measured by solid-phase microextraction-gas chromatography-mass spectrometry is 0.0001 parts or more and 5 parts or less with respect to 1 part of acetic acid. It was found that from the standpoint of the intensity of the effects and the persistence of the flavor, the lower limit is more preferably 0.0005 parts or more, and still more preferably 0.001 parts or more. It was found that from the standpoint of added flavor derived from the aromatic component, the upper limit is more preferably 2.5 parts or less, and still more preferably 1 part or less.

Additionally, it was found that for foods and drinks that are produced or processed under conditions in which acetic acid vaporizes, such as cooked rice, the concentration of furfural that falls within a range in which the peak area ratio measured by solid-phase microextraction-gas chromatography-mass spectrometry is 0.0001 parts or more and 5 parts or less with respect to 1 part of acetic acid is particularly effective. It was found that from the standpoint of the intensity of the effects, the lower limit is more preferably 0.0005 parts or more, and still more preferably 0.001 parts or more. It was found that from the standpoint of added flavor derived from the aromatic component, the upper limit is more preferably 2.5 parts or less, and still more preferably 1 part or less.

Additionally, it was found that for foods and drinks that are not produced or processed under conditions in which acetic acid vaporizes (excluding the heating process performed on sealed containers, such as heating sterilization performed after a container is filled and sealed), the concentration of furfural that falls within a range in which the peak area ratio measured by solid-phase microextraction-gas chromatography-mass spectrometry is 0.0001 parts or more and 5 parts or less with respect to 1 part of acetic acid is particularly effective. It was found that from the standpoint of the intensity of the effects, the lower limit is more preferably 0.0005 parts or more, and still more preferably 0.001 parts or more. It was found that from the standpoint of added flavor derived from the aromatic component, the upper limit is more preferably 2.5 parts or less, and still more preferably 1 part or less.

Similarly, it was found that the concentration of furfuryl alcohol necessary to bring about the effect of the present invention should be within a range in which the peak area ratio measured by solid-phase microextraction-gas chromatography-mass spectrometry is 10 ppm parts or more and 15 parts or less with respect to 1 part of acetic acid. It was found that from the standpoint of the intensity of the effects and the persistence of the flavor, the lower limit is more preferably 50 ppm parts or more, and still more preferably 0.0001 parts or more. It was found that from the standpoint of added flavor derived from the aromatic component, the upper limit is more preferably 12.5 parts or less, and still more preferably 10 parts or less.

Additionally, it was found that for foods and drinks that are produced or processed under conditions in which acetic acid vaporizes, such as cooked rice, the concentration of furfuryl alcohol that falls within a range in which the peak area ratio measured by solid-phase microextraction-gas chromatography-mass spectrometry is 0.001 parts or more and 15 parts or less with respect to 1 part of acetic acid is particularly effective. It was found that from the standpoint of the intensity of the effects, the lower limit is more preferably 0.005 parts or more, and still more preferably 0.01 parts or more. It was found that from the standpoint of added flavor derived from the aromatic component, the upper limit is more preferably 12.5 parts or less, and still more preferably 10 parts or less.

Additionally, it was found that for foods and drinks that are not produced or processed under conditions in which acetic acid vaporizes (excluding the heating process performed on sealed containers, such as heating sterilization performed after a container is filled and sealed), the concentration of furfuryl alcohol that falls within a range in which the peak area ratio measured by solid-phase microextraction-gas chromatography-mass spectrometry is 10 ppm parts or more and 5 parts or less with respect to 1 part of acetic acid is particularly effective. It was found that from the standpoint of the intensity of the effects, the lower limit is more preferably 50 ppm parts or more, and still more preferably 0.0001 parts or more. It was found that from the standpoint of added flavor derived from the aromatic component, the upper limit is more preferably 2.5 parts or less, and still more preferably 1 part or less.

Similarly, it was found that the concentration of 2-acetylfuran necessary to bring about the effect of the present invention should be within a range in which the peak area ratio measured by solid-phase microextraction-gas chromatography-mass spectrometry is 10 ppm parts or more and 15 parts or less with respect to 1 part of acetic acid. It was found that from the standpoint of the intensity of the effects and the persistence of the flavor, the lower limit is more preferably 50 ppm parts or more, and still more preferably 0.0001 parts or more. It was found that from the standpoint of added flavor derived from the aromatic component, the upper limit is more preferably 12.5 parts or less, and still more preferably 10 parts or less.

Similarly, the concentration of 3-methylfuran, 2-methylfuran, or 2-(5H)-furanone necessary to bring about the effect of the present invention should be within a range in which the peak area ratio measured by solid-phase microextraction-gas chromatography-mass spectrometry is 1 ppm part or more and 15 parts or less with respect to 1 part of acetic acid. It was found that from the standpoint of the intensity of the effects and the persistence of the flavor, the lower limit is more preferably 5 ppm parts or more, and still more preferably 10 ppm parts or more. It was found that from the standpoint of added flavor derived from the aromatic component, the upper limit is more preferably 12.5 parts or less, and still more preferably 10 parts or less.

Additionally, it was found that for foods and drinks that are produced or processed under conditions in which acetic acid vaporizes, such as cooked rice, the concentration of 3-methylfuran, 2-methylfuran, or 2-(5H)-furanone that falls within a range in which the peak area ratio measured by solid-phase microextraction-gas chromatography-mass spectrometry is 0.0001 parts or more and 15 parts or less with respect to 1 part of acetic acid is particularly effective. It was found that from the standpoint of the intensity of the effects, the lower limit is more preferably 0.0005 parts or more, and still more preferably 0.001 parts or more. It was found that from the standpoint of added flavor derived from the aromatic component, the upper limit is more preferably 12.5 parts or less, and still more preferably 10 parts or less.

Additionally, it was found that for foods and drinks that are not produced or processed under conditions in which acetic acid vaporizes (excluding the heating process performed on sealed containers, such as heating sterilization performed after a container is filled and sealed), the concentration of 3-methylfuran, 2-methylfuran, or 2-(5H)-furanone that falls within a range in which the peak area ratio measured by solid-phase microextraction-gas chromatography-mass spectrometry is 1 ppm part or more and 0.1 parts or less with respect to 1 part of acetic acid is particularly effective. It was found that from the standpoint of the intensity of the effects, the lower limit is more preferably 5 ppm parts or more, and still more preferably 10 ppm parts or more. It was found that from the standpoint of added flavor derived from the aromatic component, the upper limit is more preferably 0.05 parts or less, and still more preferably 0.01 parts or less.

Table 4-2 shows the results of the use of limonene as (B) a monoterpene or sesquiterpene in combination with (C) various furan compounds having 5 or 6 carbon atoms. As (B) monoterpenes or sesquiterpenes, terpinene, p-cymene, muurolol, and cadalene, which have a similar structure, were also studied in terms of the effect in combined use with each aromatic component (C); the results were the same as those shown in Table 4-2.

Example 5: Study on the Range of Concentration of Aromatic Component for Suppressing Sour Taste and Sour Odor 3

In Example 5, the effect and the range of concentration of each of the aromatic components that belong to the group of aromatic component (D) in combined use with aromatic components that belong to group (A) or (B) conducted in Example 2 were studied as shown in Table 5. The method of test and study was the same as in Example 3.

Table 5 shows the results.

TABLE 5-1

| | (D) Aliphatic aldehydes having 6 to 9 carbon atoms | Experimental Plot 1 | Experimental Plot 2 | Experimental Plot 3 | Experimental Plot 4 | Experimental Plot 5 |
|---|---|---|---|---|---|---|
| Combined Component | Acetic Acid (parts) | 1 | 1 | 1 | 1 | 1 |
| | Component (A): 1-Octen-3-Ol (parts) | 0.01 | 0.01 | 0.01 | 0.01 | 0.01 |
| Test Example s | Hexanal (parts) | 0.01 ppm | 0.1 ppm | 1 ppm | 5 ppm | 10 ppm |
| | Sour Taste and Sour Odor Suppression Effect on White Rice | 4 | 4 | 4 | 4 | 4 |
| | Flavor Enhancement Effect on White Rice | 4 | 4 | 4 | 4 | 4 |
| | Sour Taste and Sour Odor Suppression Effect on Vinegar Drink | 4 | 4 | 5 | 5 | 5 |
| | Flavor Enhancement Effect on Vinegar Drink | 4 | 4 | 4 | 4 | 5 |
| | Comprehensive Evaluation (including Notes) | 4 | 4 | 5 | 5 | 5 |
| | Notes | | No synergy due to combinational use was observed. | | Richness of the flavor was increased in addition to increased flavor in line with an increase in the amount of the aromatic component. | |
| Test Example t | Heptanal (parts) | 0.01 ppm | 0.1 ppm | 1 ppm | 5 ppm | 10 ppm |
| | Sour Taste and Sour Odor Suppression Effect on White Rice | 4 | 4 | 4 | 4 | 4 |
| | Flavor Enhancement Effect on White Rice | 4 | 4 | 4 | 4 | 4 |
| | Sour Taste and Sour Odor Suppression Effect on Vinegar Drink | 4 | 4 | 5 | 5 | 5 |
| | Flavor Enhancement Effect on Vinegar Drink | 4 | 4 | 4 | 4 | 5 |
| | Comprehensive Evaluation (including Notes) | 4 | 4 | 5 | 5 | 5 |
| | Notes | | No synergy due to combinational use was observed. | | Richness of the flavor was increased in addition to increased flavor in line with an increase in the amount of the aromatic component. | |
| Test Example u | Octanal (parts) | 0.01 ppm | 0.1 ppm | 1 ppm | 5 ppm | 10 ppm |
| | Sour Taste and Sour Odor Suppression Effect on White Rice | 4 | 4 | 4 | 4 | 4 |
| | Flavor Enhancement Effect on White Rice | 4 | 4 | 4 | 4 | 4 |
| | Sour Taste and Sour Odor Suppression Effect on Vinegar Drink | 4 | 4 | 5 | 5 | 5 |
| | Flavor Enhancement Effect on Vinegar Drink | 4 | 4 | 4 | 4 | 5 |
| | Comprehensive Evaluation (including Notes) | 4 | 4 | 5 | 5 | 5 |

TABLE 5-1-continued

|  |  | | | | | |
|---|---|---|---|---|---|---|
|  | Notes | | No synergy due to combinational use was observed. | | Richness of the flavor was increased in addition to increased flavor in line with an increase in the amount of the aromatic component. | |
| Test Example v | Nonanal (parts) | 0.01 ppm | 0.1 ppm | 1 ppm | 5 ppm | 10 ppm |
|  | Sour Taste and Sour Odor Suppression Effect on White Rice | 4 | 4 | 4 | 4 | 4 |
|  | Flavor Enhancement Effect on White Rice | 4 | 4 | 4 | 4 | 4 |
|  | Sour Taste and Sour Odor Suppression Effect on Vinegar Drink | 4 | 4 | 5 | 5 | 5 |
|  | Flavor Enhancement Effect on Vinegar Drink | 4 | 4 | 4 | 5 | 5 |
|  | Comprehensive Evaluation (including Notes) | 4 | 4 | 5 | 5 | 5 |
|  | Notes | | No synergy due to combinational use was observed. | | Richness of the flavor was increased in addition to increased flavor in line with an increase in the amount of the aromatic component. | |

|  | (D) Aliphatic aldehydes having 6 to 9 carbon atoms | Experimental Plot 6 | Experimental Plot 7 | Experimental Plot 8 | Experimental Plot 9 | Experimental Plot 10 |
|---|---|---|---|---|---|---|
| Combined Component | Acetic Acid (parts) | 1 | 1 | 1 | 1 | 1 |
|  | Component (A): 1-Octen-3-Ol (parts) | 0.01 | 0.01 | 0.01 | 0.01 | 0.01 |
| Test Example s | Hexanal (parts) | 0.0001 | 0.001 | 0.005 | 0.01 | 0.1 |
|  | Sour Taste and Sour Odor Suppression Effect on White Rice | 4 | 5 | 5 | 5 | 5 |
|  | Flavor Enhancement Effect on White Rice | 4 | 4 | 4 | 5 | 5 |
|  | Sour Taste and Sour Odor Suppression Effect on Vinegar Drink | 5 | 5 | 5 | 5 | 5 |
|  | Flavor Enhancement Effect on Vinegar Drink | 5 | 5 | 5 | 5 | 5 |
|  | Comprehensive Evaluation (including Notes) | 5 | 5 | 5 | 5 | 5 |
|  | Notes | | | Richness of the flavor was increased in addition to increased flavor in line with an increase in the amount of the aromatic component. | | |
| Test Example t | Heptanal (parts) | 0.0001 | 0.0005 | 0.001 | 0.01 | 0.05 |
|  | Sour Taste and Sour Odor Suppression Effect on White Rice | 5 | 5 | 5 | 5 | 5 |
|  | Flavor Enhancement Effect on White Rice | 4 | 5 | 5 | 5 | 5 |
|  | Sour Taste and Sour Odor Suppression Effect on Vinegar Drink | 5 | 5 | 5 | 5 | 5 |
|  | Flavor Enhancement Effect on Vinegar Drink | 5 | 5 | 5 | 5 | 5 |
|  | Comprehensive Evaluation (including Notes) | 5 | 5 | 5 | 5 | 5 |
|  | Notes | | | Richness of the flavor was increased in addition to increased flavor in line with an increase in the amount of the aromatic component. | | |
| Test Example u | Octanal (parts) | 0.0001 | 0.001 | 0.005 | 0.01 | 0.05 |
|  | Sour Taste and Sour Odor Suppression Effect on White Rice | 5 | 5 | 5 | 5 | 5 |
|  | Flavor Enhancement Effect on White Rice | 4 | 5 | 5 | 5 | 5 |
|  | Sour Taste and Sour Odor Suppression Effect on Vinegar Drink | 5 | 5 | 5 | 5 | 5 |
|  | Flavor Enhancement Effect on Vinegar Drink | 5 | 5 | 5 | 5 | 5 |
|  | Comprehensive Evaluation (including Notes) | 5 | 5 | 5 | 5 | 5 |
|  | Notes | | | Richness of the flavor was increased in addition to increased flavor in line with an increase in the amount of the aromatic component. | | |
| Test Example v | Nonanal (parts) | 0.0001 | 0.001 | 0.005 | 0.01 | 0.05 |
|  | Sour Taste and Sour Odor Suppression Effect on White Rice | 5 | 5 | 5 | 5 | 5 |
|  | Flavor Enhancement Effect on White Rice | 4 | 5 | 5 | 5 | 5 |
|  | Sour Taste and Sour Odor Suppression Effect on Vinegar Drink | 5 | 5 | 5 | 5 | 5 |
|  | Flavor Enhancement Effect on Vinegar Drink | 5 | 5 | 5 | 5 | 5 |
|  | Comprehensive Evaluation (including Notes) | 5 | 5 | 5 | 5 | 5 |
|  | Notes | | | Richness of the flavor was increased in addition to increased flavor in line with an increase in the amount of the aromatic component. | | |

|  | (D) Aliphatic aldehydes having 6 to 9 carbon atoms | Experimental Plot 11 | Experimental Plot 12 | Experimental Plot 13 | Experimental Plot 14 | Experimental Plot 15 |
|---|---|---|---|---|---|---|
| Combined Component | Acetic Acid (parts) | 1 | 1 | 1 | 1 | 1 |
|  | Component (A): 1-Octen-3-Ol (parts) | 0.01 | 0.01 | 0.01 | 0.01 | 0.01 |
| Test Example s | Hexanal (parts) | 0.5 | 1 | 10 | 12.5 | 15 |
|  | Sour Taste and Sour Odor Suppression Effect on White Rice | 5 | 5 | 5 | 5 | 5 |
|  | Flavor Enhancement Effect on White Rice | 5 | 5 | 5 | 5 | 4 |
|  | Sour Taste and Sour Odor Suppression Effect on Vinegar Drink | 5 | 5 | 5 | 4 | 4 |
|  | Flavor Enhancement Effect on Vinegar Drink | 5 | 4 | 4 | 4 | 4 |
|  | Comprehensive Evaluation (including Notes) | 5 | 5 | 5 | 5 | 4 |

TABLE 5-1-continued

| | | | | | | |
|---|---|---|---|---|---|---|
| | Notes | | Richness of the flavor was increased in addition to increased flavor in line with an increase in the amount of the aromatic component. | | A slightly unpleasant feel, but acceptable | |
| Test Example t | Heptanal (parts) | 0.1 | 1 | 10 | 12.5 | 15 |
| | Sour Taste and Sour Odor Suppression Effect on White Rice | 5 | 5 | 5 | 5 | 5 |
| | Flavor Enhancement Effect on White Rice | 5 | 5 | 5 | 4 | 4 |
| | Sour Taste and Sour Odor Suppression Effect on Vinegar Drink | 5 | 5 | 5 | 5 | 4 |
| | Flavor Enhancement Effect on Vinegar Drink | 4 | 4 | 4 | 4 | 4 |
| | Comprehensive Evaluation (including Notes) | 5 | 5 | 5 | 5 | 4 |
| | Notes | | Richness of the flavor was increased in addition to increased flavor in line with an increase in the amount of the aromatic component. | | A slightly unpleasant feel, but acceptable | |
| Test Example u | Octanal (parts) | 0.1 | 1 | 10 | 12.5 | 15 |
| | Sour Taste and Sour Odor Suppression Effect on White Rice | 5 | 5 | 5 | 5 | 5 |
| | Flavor Enhancement Effect on White Rice | 5 | 5 | 5 | 4 | 4 |
| | Sour Taste and Sour Odor Suppression Effect on Vinegar Drink | 5 | 5 | 5 | 5 | 4 |
| | Flavor Enhancement Effect on Vinegar Drink | 4 | 4 | 4 | 4 | 4 |
| | Comprehensive Evaluation (including Notes) | 5 | 5 | 5 | 5 | 4 |
| | Notes | | Richness of the flavor was increased in addition to increased flavor in line with an increase in the amount of the aromatic component. | | A slightly unpleasant feel, but acceptable | |
| Test Example v | Nonanal (parts) | 0.1 | 1 | 10 | 12.5 | 15 |
| | Sour Taste and Sour Odor Suppression Effect on White Rice | 5 | 5 | 5 | 5 | 5 |
| | Flavor Enhancement Effect on White Rice | 5 | 5 | 5 | 4 | 4 |
| | Sour Taste and Sour Odor Suppression Effect on Vinegar Drink | 5 | 5 | 5 | 4 | 4 |
| | Flavor Enhancement Effect on Vinegar Drink | 4 | 4 | 4 | 4 | 3 |
| | Comprehensive Evaluation (including Notes) | 5 | 5 | 5 | 4 | 4 |
| | Notes | | Richness of the flavor was increased in addition to increased flavor in line with an increase in the amount of the aromatic component. | | A slightly unpleasant feel, but acceptable | |

| | (D) Aliphatic aldehydes having 6 to 9 carbon atoms | Experimental Plot 16 | Experimental Plot 17 |
|---|---|---|---|
| | Acetic Acid (parts) | 1 | 1 |
| Combined Component | Component (A): 1-Octen-3-Ol (parts) | 0.01 | 0.01 |
| Test Example s | Hexanal (parts) | 17.5 | 20 |
| | Sour Taste and Sour Odor Suppression Effect on White Rice | 5 | 5 |
| | Flavor Enhancement Effect on White Rice | 2 | 1 |
| | Sour Taste and Sour Odor Suppression Effect on Vinegar Drink | 4 | 4 |
| | Flavor Enhancement Effect on Vinegar Drink | 3 | 3 |
| | Comprehensive Evaluation (including Notes) | 1 | 1 |
| | Notes | An unpleasant feel due to an aromatic component-derived flavor, with the flavor of white rice masked | |
| Test Example t | Heptanal (parts) | 17.5 | 20 |
| | Sour Taste and Sour Odor Suppression Effect on White Rice | 5 | 5 |
| | Flavor Enhancement Effect on White Rice | 2 | 1 |
| | Sour Taste and Sour Odor Suppression Effect on Vinegar Drink | 4 | 4 |
| | Flavor Enhancement Effect on Vinegar Drink | 3 | 3 |
| | Comprehensive Evaluation (including Notes) | 1 | 1 |
| | Notes | An unpleasant feel due to an aromatic component-derived flavor, with the flavor of white rice masked | |
| Test Example u | Octanal (parts) | 17.5 | 20 |
| | Sour Taste and Sour Odor Suppression Effect on White Rice | 5 | 5 |
| | Flavor Enhancement Effect on White Rice | 2 | 1 |
| | Sour Taste and Sour Odor Suppression Effect on Vinegar Drink | 4 | 4 |
| | Flavor Enhancement Effect on Vinegar Drink | 3 | 3 |
| | Comprehensive Evaluation (including Notes) | 1 | 1 |

TABLE 5-1-continued

| | Notes | An unpleasant feel due to an aromatic component-derived flavor, with the flavor of white rice masked | |
|---|---|---|---|
| Test Example v | Nonanal (parts) | 17.5 | 20 |
| | Sour Taste and Sour Odor Suppression Effect on White Rice | 5 | 5 |
| | Flavor Enhancement Effect on White Rice | 2 | 1 |
| | Sour Taste and Sour Odor Suppression Effect on Vinegar Drink | 4 | 4 |
| | Flavor Enhancement Effect on Vinegar Drink | 3 | 3 |
| | Comprehensive Evaluation (including Notes) | 1 | 1 |
| | Notes | An unpleasant feel due to an aromatic component-derived flavor, with the flavor of white rice masked | |

As shown in Table 5-1, it was found that in combined use of 1-octen-3-ol, which is (A) an unsaturated alcohol having 8 carbon atoms, with (D) an aliphatic aldehyde having 6 to 9 carbon atoms, the concentration of component (D) necessary to bring about the effect of the present invention falls within a range in which the peak area ratio measured by solid-phase microextraction-gas chromatography-mass spectrometry is 1 ppm part or more and 15 parts or less with respect to 1 part of acetic acid. It was found that from the standpoint of the intensity of the effects and enhanced flavor richness, the lower limit is more preferably 5 ppm parts or more, and still more preferably 10 ppm parts or more. It was found that from the standpoint of added flavor derived from the aromatic component, the upper limit is more preferably 12.5 parts or less, and still more preferably 10 parts or less.

More specifically, it was similarly found that in order to bring about the effect of the present invention, the concentration of hexanal, which is (D) an aliphatic aldehyde having 6 to 9 carbon atoms, should be within a range in which the peak area ratio measured by solid-phase microextraction-gas chromatography-mass spectrometry is 1 ppm part or more and 15 parts or less with respect to 1 part of acetic acid. It was found that from the standpoint of the intensity of the effects and enhanced flavor richness, the lower limit is more preferably 5 ppm parts or more, and still more preferably 10 ppm parts or more. It was found that from the standpoint of added flavor derived from the aromatic component, the upper limit is more preferably 12.5 parts or less, and still more preferably 10 parts or less.

Additionally, it was found that for foods and drinks that are produced or processed under conditions in which acetic acid vaporizes, such as cooked rice, the concentration of hexanal that falls within a range in which the peak area ratio measured by solid-phase microextraction-gas chromatography-mass spectrometry is 0.001 parts or more and 15 parts or less with respect to 1 part of acetic acid is particularly effective. It was found that from the standpoint of the intensity of the effects, the lower limit is more preferably 0.005 parts or more, and still more preferably 0.01 parts or more. It was found that from the standpoint of added flavor derived from the aromatic component, the upper limit is more preferably 12.5 parts or less, and still more preferably 10 parts or less.

Additionally, it was found that for foods and drinks that are not produced or processed under conditions in which acetic acid vaporizes (excluding the heating process performed on sealed containers, such as heating sterilization performed after a container is filled and sealed), the concentration of hexanal that falls within a range in which the peak area ratio measured by solid-phase microextraction-gas chromatography-mass spectrometry is 1 ppm part or more and 1 part or less with respect to 1 part of acetic acid is particularly effective. It was found that from the standpoint of the intensity of the effects, the lower limit is more preferably 5 ppm parts or more, and still more preferably 10 ppm parts or more. It was found that from the standpoint of added flavor derived from the aromatic component, the upper limit is more preferably 0.5 parts or less, and still more preferably 0.1 parts or less.

Similarly, it was found that the concentration of heptanal, octanal, or nonanal necessary to bring about the effect of the present invention falls within a range in which the peak area ratio measured by solid-phase microextraction-gas chromatography-mass spectrometry is 1 ppm part or more and 15 parts or less with respect to 1 part of acetic acid. It was found that from the standpoint of the intensity of the effects and enhanced flavor richness, the lower limit is more preferably 5 ppm parts or more, and still more preferably 10 ppm parts or more. It was found that from the standpoint of added flavor derived from the aromatic component, the upper limit is more preferably 12.5 parts or less, and still more preferably 10 parts or less.

Additionally, it was found that for foods and drinks that are produced or processed under conditions in which acetic acid vaporizes, such as cooked rice, the concentration of heptanal, octanal, or nonanal that falls within a range in which the peak area ratio measured by solid-phase microextraction-gas chromatography-mass spectrometry is 0.0001 parts or more and 15 parts or less with respect to 1 part of acetic acid is particularly effective. It was found that from the standpoint of the intensity of the effects, the lower limit is more preferably 0.0005 parts or more, and still more preferably 0.001 parts or more. It was found that from the standpoint of added flavor derived from the aromatic component, the upper limit is more preferably 12.5 parts or less, and still more preferably 10 arts or less.

Additionally, it was found that for foods and drinks that are not produced or processed under conditions in which acetic acid vaporizes (excluding the heating process performed on sealed containers, such as heating sterilization performed after a container is filled and sealed), the concentration of heptanal, octanal, or nonanal that falls within a range in which the peak area ratio measured by solid-phase microextraction-gas chromatography-mass spectrometry is 1 ppm part or more and 0.1 parts or less with respect to 1 part of acetic acid is particularly effective. It was found that from the standpoint of the intensity of the effects, the lower limit is more preferably 5 ppm parts or more, and still more preferably 10 ppm parts or more. It was found that from the standpoint of added flavor derived from the aromatic component, the upper limit is more preferably 0.05 parts or less, and still more preferably 0.01 parts or less.

TABLE 5-2

| | (D) Aliphatic aldehydes having 6 to 9 carbon atoms | Experimental Plot 1 | Experimental Plot 2 | Experimental Plot 3 | Experimental Plot 4 | Experimental Plot 5 |
|---|---|---|---|---|---|---|
| Combined Component | Acetic Acid (parts) | 1 | 1 | 1 | 1 | 1 |
| | Component (B): Limonene (parts) | 0.01 | 0.01 | 0.01 | 0.01 | 0.01 |
| Test Example w | Hexanal (parts) | 0.01 ppm | 0.1 ppm | 1 ppm | 5 ppm | 10 ppm |
| | Sour Taste and Sour Odor Suppression Effect on White Rice | 3 | 3 | 3 | 3 | 3 |
| | Flavor Enhancement Effect on White Rice | 4 | 4 | 4 | 4 | 4 |
| | Sour Taste and Sour Odor Suppression Effect on Vinegar Drink | 3 | 3 | 4 | 5 | 5 |
| | Flavor Enhancement Effect on Vinegar Drink | 4 | 4 | 4 | 4 | 4 |
| | Comprehensive Evaluation (including Notes) | 3 | 3 | 4 | 4 | 4 |
| | Notes | | No synergy due to combinational use was observed. | | Richness of the flavor was increased in flavor in line with an increase in the amount of the aromatic component. | |
| Test Example x | Heptanal (parts) | 0.01 ppm | 0.1 ppm | 1 ppm | 5 ppm | 10 ppm |
| | Sour Taste and Sour Odor Suppression Effect on White Rice | 3 | 3 | 3 | 3 | 3 |
| | Flavor Enhancement Effect on White Rice | 4 | 4 | 4 | 4 | 4 |
| | Sour Taste and Sour Odor Suppression Effect on Vinegar Drink | 3 | 3 | 4 | 5 | 5 |
| | Flavor Enhancement Effect on Vinegar Drink | 4 | 4 | 4 | 4 | 4 |
| | Comprehensive Evaluation (including Notes) | 3 | 3 | 4 | 4 | 4 |
| | Notes | | No synergy due to combinational use was observed. | | Richness of the flavor was increased in flavor in line with an increase in the amount of the aromatic component. | |
| Test Example y | Octanal (parts) | 0.01 ppm | 0.1 ppm | 1 ppm | 5 ppm | 10 ppm |
| | Sour Taste and Sour Odor Suppression Effect on White Rice | 3 | 3 | 3 | 3 | 3 |
| | Flavor Enhancement Effect on White Rice | 4 | 4 | 4 | 4 | 4 |
| | Sour Taste and Sour Odor Suppression Effect on Vinegar Drink | 3 | 3 | 4 | 5 | 5 |
| | Flavor Enhancement Effect on Vinegar Drink | 4 | 4 | 4 | 4 | 4 |
| | Comprehensive Evaluation (including Notes) | 3 | 3 | 4 | 4 | 4 |
| | Notes | | No synergy due to combinational use was observed. | | Richness of the flavor was increased in flavor in line with an increase in the amount of the aromatic component. | |
| Test Example z | Nonanal (parts) | 0.01 ppm | 0.1 ppm | 1 ppm | 5 ppm | 10 ppm |
| | Sour Taste and Sour Odor Suppression Effect on White Rice | 3 | 3 | 3 | 3 | 3 |
| | Flavor Enhancement Effect on White Rice | 4 | 4 | 4 | 4 | 4 |
| | Sour Taste and Sour Odor Suppression Effect on Vinegar Drink | 3 | 3 | 4 | 5 | 5 |
| | Flavor Enhancement Effect on Vinegar Drink | 4 | 4 | 4 | 4 | 4 |
| | Comprehensive Evaluation (including Notes) | 3 | 3 | 4 | 4 | 4 |
| | Notes | | No synergy due to combinational use was observed. | | Richness of the flavor was increased in flavor in line with an increase in the amount of the aromatic component. | |

| | (D) Aliphatic aldehydes having 6 to 9 carbon atoms | Experimental Plot 6 | Experimental Plot 7 | Experimental Plot 8 | Experimental Plot 9 | Experimental Plot 10 |
|---|---|---|---|---|---|---|
| Combined Component | Acetic Acid (parts) | 1 | 1 | 1 | 1 | 1 |
| | Component (B): Limonene (parts) | 0.01 | 0.01 | 0.01 | 0.01 | 0.01 |
| Test Example w | Hexanal (parts) | 0.0001 | 0.001 | 0.005 | 0.01 | 0.1 |
| | Sour Taste and Sour Odor Suppression Effect on White Rice | 3 | 4 | 5 | 5 | 5 |
| | Flavor Enhancement Effect on White Rice | 4 | 4 | 4 | 4 | 4 |
| | Sour Taste and Sour Odor Suppression Effect on Vinegar Drink | 5 | 5 | 5 | 5 | 5 |
| | Flavor Enhancement Effect on Vinegar Drink | 4 | 4 | 4 | 4 | 4 |
| | Comprehensive Evaluation (including Notes) | 4 | 4 | 4 | 4 | 4 |
| | Notes | | | Richness of the flavor was increased in flavor in line with an increase in the amount of the aromatic component. | | |
| Test Example x | Heptanal (parts) | 0.0001 | 0.001 | 0.005 | 0.01 | 0.05 |
| | Sour Taste and Sour Odor Suppression Effect on White Rice | 4 | 5 | 5 | 5 | 5 |
| | Flavor Enhancement Effect on White Rice | 4 | 4 | 4 | 4 | 4 |
| | Sour Taste and Sour Odor Suppression Effect on Vinegar Drink | 5 | 5 | 5 | 5 | 5 |
| | Flavor Enhancement Effect on Vinegar Drink | 4 | 4 | 4 | 4 | 4 |
| | Comprehensive Evaluation (including Notes) | 4 | 4 | 4 | 4 | 4 |
| | Notes | | | Richness of the flavor was increased in flavor in line with an increase in the amount of the aromatic component. | | |

TABLE 5-2-continued

| | | | | | | |
|---|---|---|---|---|---|---|
| Test Example y | Octanal (parts) | 0.0001 | 0.001 | 0.005 | 0.01 | 0.05 |
| | Sour Taste and Sour Odor Suppression Effect on White Rice | 4 | 5 | 5 | 5 | 5 |
| | Flavor Enhancement Effect on White Rice | 4 | 4 | 4 | 4 | 4 |
| | Sour Taste and Sour Odor Suppression Effect on Vinegar Drink | 5 | 5 | 5 | 5 | 5 |
| | Flavor Enhancement Effect on Vinegar Drink | 4 | 4 | 4 | 4 | 4 |
| | Comprehensive Evaluation (including Notes) | 4 | 4 | 4 | 4 | 4 |
| | Notes | | Richness of the flavor was increased in flavor in line with an increase in the amount of the aromatic component. | | | |
| Test Example z | Nonanal (parts) | 0.0001 | 0.001 | 0.005 | 0.01 | 0.05 |
| | Sour Taste and Sour Odor Suppression Effect on White Rice | 4 | 5 | 5 | 5 | 5 |
| | Flavor Enhancement Effect on White Rice | 4 | 4 | 4 | 4 | 4 |
| | Sour Taste and Sour Odor Suppression Effect on Vinegar Drink | 5 | 5 | 5 | 5 | 5 |
| | Flavor Enhancement Effect on Vinegar Drink | 4 | 4 | 4 | 4 | 4 |
| | Comprehensive Evaluation (including Notes) | 4 | 4 | 4 | 4 | 4 |
| | Notes | | Richness of the flavor was increased in flavor in line with an increase in the amount of the aromatic component. | | | |

| | (D) Aliphatic aldehydes having 6 to 9 carbon atoms | Experimental Plot 11 | Experimental Plot 12 | Experimental Plot 13 | Experimental Plot 14 | Experimental Plot 15 |
|---|---|---|---|---|---|---|
| Combined Component | Acetic Acid (parts) | 1 | 1 | 1 | 1 | 1 |
| | Component (B): Limonene (parts) | 0.01 | 0.01 | 0.01 | 0.01 | 0.01 |
| Test Example w | Hexanal (parts) | 0.5 | 1 | 10 | 12.5 | 15 |
| | Sour Taste and Sour Odor Suppression Effect on White Rice | 5 | 5 | 5 | 4 | 4 |
| | Flavor Enhancement Effect on White Rice | 4 | 4 | 4 | 4 | 3 |
| | Sour Taste and Sour Odor Suppression Effect on Vinegar Drink | 5 | 4 | 4 | 4 | 4 |
| | Flavor Enhancement Effect on Vinegar Drink | 4 | 4 | 4 | 4 | 3 |
| | Comprehensive Evaluation (including Notes) | 4 | 4 | 4 | 4 | 4 |
| | Notes | | Richness of the flavor was increased in flavor in line with an increase in the amount of the aromatic component. | | | A slightly unpleasant feel, but acceptable |
| Test Example x | Heptanal (parts) | 0.1 | 1 | 10 | 12.5 | 15 |
| | Sour Taste and Sour Odor Suppression Effect on White Rice | 5 | 5 | 5 | 4 | 4 |
| | Flavor Enhancement Effect on White Rice | 4 | 4 | 4 | 4 | 3 |
| | Sour Taste and Sour Odor Suppression Effect on Vinegar Drink | 5 | 5 | 5 | 4 | 4 |
| | Flavor Enhancement Effect on Vinegar Drink | 4 | 4 | 4 | 4 | 3 |
| | Comprehensive Evaluation (including Notes) | 4 | 4 | 4 | 4 | 3 |
| | Notes | | Richness of the flavor was increased in flavor in line with an increase in the amount of the aromatic component. | | | A slightly unpleasant feel, but acceptable |
| Test Example y | Octanal (parts) | 0.1 | 1 | 10 | 12.5 | 15 |
| | Sour Taste and Sour Odor Suppression Effect on White Rice | 5 | 5 | 5 | 4 | 4 |
| | Flavor Enhancement Effect on White Rice | 4 | 4 | 4 | 4 | 3 |
| | Sour Taste and Sour Odor Suppression Effect on Vinegar Drink | 5 | 5 | 5 | 4 | 4 |
| | Flavor Enhancement Effect on Vinegar Drink | 4 | 4 | 4 | 4 | 3 |
| | Comprehensive Evaluation (including Notes) | 4 | 4 | 4 | 4 | 3 |
| | Notes | | Richness of the flavor was increased in flavor in line with an increase in the amount of the aromatic component. | | | A slightly unpleasant feel, but acceptable |
| Test Example z | Nonanal (parts) | 0.1 | 1 | 10 | 12.5 | 15 |
| | Sour Taste and Sour Odor Suppression Effect on White Rice | 5 | 5 | 5 | 4 | 4 |
| | Flavor Enhancement Effect on White Rice | 4 | 4 | 4 | 4 | 3 |
| | Sour Taste and Sour Odor Suppression Effect on Vinegar Drink | 5 | 5 | 5 | 4 | 4 |
| | Flavor Enhancement Effect on Vinegar Drink | 4 | 4 | 4 | 4 | 3 |
| | Comprehensive Evaluation (including Notes) | 4 | 4 | 4 | 4 | 3 |
| | Notes | | Richness of the flavor was increased in flavor in line with an increase in the amount of the aromatic component. | | | A slightly unpleasant feel, but acceptable |

| | (D) Aliphatic aldehydes having 6 to 9 carbon atoms | Experimental Plot 16 | Experimental Plot 17 |
|---|---|---|---|
| Combined Component | Acetic Acid (parts) | 1 | 1 |
| | Component (B): Limonene (parts) | 0.01 | 0.01 |
| Test Example w | Hexanal (parts) | 17.5 | 20 |
| | Sour Taste and Sour Odor Suppression Effect on White Rice | 5 | 5 |
| | Flavor Enhancement Effect on White Rice | 2 | 1 |
| | Sour Taste and Sour Odor Suppression Effect on Vinegar Drink | 4 | 4 |
| | Flavor Enhancement Effect on Vinegar Drink | 3 | 3 |
| | Comprehensive Evaluation (including Notes) | 1 | 1 |

TABLE 5-2-continued

| | | | |
|---|---|---|---|
| | Notes | An unpleasant feel due to an aromatic component-derived flavor, with the flavor of white rice masked | |
| Test Example x | Heptanal (parts) | 17.5 | 20 |
| | Sour Taste and Sour Odor Suppression Effect on White Rice | 5 | 5 |
| | Flavor Enhancement Effect on White Rice | 2 | 1 |
| | Sour Taste and Sour Odor Suppression Effect on Vinegar Drink | 4 | 4 |
| | Flavor Enhancement Effect on Vinegar Drink | 2 | 2 |
| | Comprehensive Evaluation (including Notes) | 1 | 1 |
| | Notes | An unpleasant feel due to an aromatic component-derived flavor, with the flavor of white rice masked | |
| Test Example y | Octanal (parts) | 17.5 | 20 |
| | Sour Taste and Sour Odor Suppression Effect on White Rice | 5 | 5 |
| | Flavor Enhancement Effect on White Rice | 2 | 1 |
| | Sour Taste and Sour Odor Suppression Effect on Vinegar Drink | 4 | 4 |
| | Flavor Enhancement Effect on Vinegar Drink | 2 | 2 |
| | Comprehensive Evaluation (including Notes) | 1 | 1 |
| | Notes | An unpleasant feel due to an aromatic component-derived flavor, with the flavor of white rice masked | |
| Test Example z | Nonanal (parts) | 17.5 | 20 |
| | Sour Taste and Sour Odor Suppression Effect on White Rice | 5 | 5 |
| | Flavor Enhancement Effect on White Rice | 2 | 1 |
| | Sour Taste and Sour Odor Suppression Effect on Vinegar Drink | 4 | 4 |
| | Flavor Enhancement Effect on Vinegar Drink | 2 | 2 |
| | Comprehensive Evaluation (including Notes) | 1 | 1 |
| | Notes | An unpleasant feel due to an aromatic component-derived flavor, with the flavor of white rice masked | |

As shown in Table 5-2, it was found that in combined use of (B) a monoterpene or sesquiterpene with (D) an aliphatic aldehyde having 6 to 9 carbon atoms, the concentration of component (D) necessary to bring about the effect of the present invention should be within a range in which the peak area ratio measured by solid-phase microextraction-gas chromatography-mass spectrometry is 1 ppm part or more and 15 parts or less with respect to 1 part of acetic acid. It was found that from the standpoint of the intensity of the effects and enhanced flavor richness, the lower limit is more preferably 5 ppm parts or more, and still more preferably 10 ppm parts or more. It was found that from the standpoint of added flavor derived from the aromatic component, the upper limit is more preferably 12.5 parts or less, and still more preferably 10 parts or less.

More specifically, it was similarly found that in order to bring about the effect of the present invention, the concentration of hexanal, which is (D) an aliphatic aldehyde having 6 to 9 carbon atoms, should be within a range in which the peak area ratio measured by solid-phase microextraction-gas chromatography-mass spectrometry is 1 ppm part or more and 15 parts or less with respect to 1 part of acetic acid. It was found that from the standpoint of the intensity of the effects and enhanced flavor richness, the lower limit is more preferably 5 ppm parts or more, and still more preferably 10 ppm parts or more. It was found that from the standpoint of added flavor derived from the aromatic component, the upper limit is more preferably 12.5 parts or less, and still more preferably 10 parts or less.

Additionally, it was found that for foods and drinks that are produced or processed under conditions in which acetic acid vaporizes, such as cooked rice, the concentration of hexanal that falls within a range in which the peak area ratio measured by solid-phase microextraction-gas chromatography-mass spectrometry is 0.001 parts or more and 15 parts or less with respect to 1 part of acetic acid is particularly effective. It was found that from the standpoint of the intensity of the effects, the lower limit is more preferably 0.005 parts or more, and still more preferably 0.01 parts or more. It was found that from the standpoint of added flavor derived from the aromatic component, the upper limit is more preferably 12.5 parts or less, and still more preferably 10 parts or less.

Additionally, it was found that for foods and drinks that are not produced or processed under conditions in which acetic acid vaporizes (excluding the heating process performed on sealed containers, such as heating sterilization performed after a container is filled and sealed), the concentration of hexanal that falls within a range in which the peak area ratio measured by solid-phase microextraction-gas chromatography-mass spectrometry is 1 ppm part or more and 1 part or less with respect to 1 part of acetic acid is particularly effective. It was found that from the standpoint of the intensity of the effects, the lower limit is more preferably 5 ppm parts or more, and still more preferably 10 ppm parts or more. It was found that from the standpoint of added flavor derived from the aromatic component, the upper limit is more preferably 0.5 parts or less, and still more preferably 0.1 parts or less.

Similarly, it was found that the concentration of heptanal, octanal, or nonanal necessary to bring about the effect of the present invention should be within a range in which the peak area ratio measured by solid-phase microextraction-gas chromatography-mass spectrometry is 1 ppm part or more and 15 parts or less with respect to 1 part of acetic acid. It was found that from the standpoint of the intensity of the effects and enhanced flavor richness, the lower limit is more preferably 5 ppm parts or more, and still more preferably 10 ppm parts or more. It was found that from the standpoint of added flavor derived from the aromatic component, the upper limit is more preferably 12.5 parts or less, and still more preferably 10 parts or less.

Additionally, it was found that for foods and drinks that are produced or processed under conditions in which acetic acid vaporizes, such as cooked rice, the concentration of heptanal, octanal, or nonanal that falls within a range in which the peak area ratio measured by solid-phase microextraction-gas chromatography-mass spectrometry is 0.0001 parts or more and 15 parts or less with respect to 1 part of acetic acid is particularly effective. It was found that from the standpoint of the intensity of the effects, the lower limit is more preferably 0.0005 parts or more, and still more preferably 0.001 parts or more. It was found that from the standpoint of added flavor derived from the aromatic component, the upper limit is more preferably 12.5 parts or less, and still more preferably 10 parts or less.

Additionally, it was found that for foods and drinks that are not produced or processed under conditions in which acetic acid vaporizes (excluding the heating process performed on sealed containers, such as heating sterilization performed after a container is filled and sealed), the concentration of heptanal, octanal, or nonanal that falls within a range in which the peak area ratio measured by solid-phase microextraction-gas chromatography-mass spectrometry is 1 ppm part or more and 0.1 parts or less with respect to 1 part of acetic acid is particularly effective. It was found that from the standpoint of the intensity of the effects, the lower limit is more preferably 5 ppm parts or more, and still more preferably 10 ppm parts or more. It was found that from the standpoint of added flavor derived from the aromatic component, the upper limit is more preferably 0.05 parts or less, and still more preferably 0.01 parts or less.

Table 5-2 shows the results of the use of limonene as (B) a monoterpene or sesquiterpene in combination with (D) various unsaturated aldehydes having 6 to 9 carbon atoms. As (B) monoterpenes or sesquiterpenes, terpinene, p-cymene, muurolol, and cadalene, which have a similar structure, were also studied in terms of the effect in combined use with each aromatic component (D); the results were the same as those shown in Table 5-2.

Example 6: Study on the Range of Concentration of Aromatic Component for Suppressing Sour Taste and Sour Odor 4

In Example 6, the effect and the range of concentration of each of the aromatic components that belong to the group of aromatic components (C) and (D) in combined use of an aromatic component that belongs to group (A) or (B) with both aromatic components that belong to groups (C) and (D) conducted in Example 2 were studied as shown in Table 6. The method of test and study was the same as in Example 3.

Table 6 shows the results.

TABLE 6-1

| | | Experimental Plot 1 | Experimental Plot 2 | Experimental Plot 3 | Experimental Plot 4 | Experimental Plot 5 |
|---|---|---|---|---|---|---|
| | Acetic Acid (parts) | 1 | 1 | 1 | 1 | 1 |
| Combined Component Test Example (i) | Component (A): 1-Octen-3-Ol (parts) | 0.01 | 0.01 | 0.01 | 0.01 | 0.01 |
| | Component (C): Furfural (parts) | 10 ppm | 50 ppm | 0.0001 | 0.0005 | 0.001 |
| | Component (D): Hexanal (parts) | 0.1 ppm | 0.5 ppm | 1 ppm | 5 ppm | 10 ppm |
| | Sour Taste and Sour Odor Suppression Effect on White Rice | 4 | 4 | 5 | 5 | 5 |
| | Flavor Enhancement Effect on White Rice | 4 | 4 | 5 | 5 | 5 |
| | Sour Taste and Sour Odor Suppression Effect on Vinegar Drink | 4 | 4 | 5 | 5 | 5 |
| | Flavor Enhancement Effect on Vinegar Drink | 4 | 4 | 5 | 5 | 5 |
| | Comprehensive Evaluation (including Notes) | 4 | 4 | 5 | 5 | 5 |
| | Notes | | No synergy due to combinational use was observed | Persistence and richness of the flavor were increased in addition to increased flavor in line with an increase in the amount of the aromatic component. | | |

| | | Experimental Plot 6 | Experimental Plot 7 | Experimental Plot 8 | Experimental Plot 9 | Experimental Plot 10 |
|---|---|---|---|---|---|---|
| | Acetic Acid (parts) | 1 | 1 | 1 | 1 | 1 |
| Combined Component Test Example (i) | Component (A): 1-Octen-3-Ol (parts) | 0.01 | 0.01 | 0.01 | 0.01 | 0.01 |
| | Component (C): Furfural (parts) | 0.005 | 0.01 | 0.05 | 0.1 | 0.25 |
| | Component (D): Hexanal (parts) | 0.0001 | 0.001 | 0.005 | 0.01 | 0.1 |
| | Sour Taste and Sour Odor Suppression Effect on White Rice | 5 | 5 | 5 | 5 | 5 |
| | Flavor Enhancement Effect on White Rice | 5 | 5 | 5 | 5 | 5 |
| | Sour Taste and Sour Odor Suppression Effect on Vinegar Drink | 5 | 5 | 5 | 5 | 5 |
| | Flavor Enhancement Effect on Vinegar Drink | 5 | 5 | 5 | 5 | 5 |
| | Comprehensive Evaluation (including Notes) | 5 | 5 | 5 | 5 | 5 |

TABLE 6-1-continued

| | Notes | Persistence and richness of the flavor were increased in addition to increased flavor in line with an increase in the amount of the aromatic component. |
|---|---|---|

| | | Experimental Plot 11 | Experimental Plot 12 | Experimental Plot 13 | Experimental Plot 14 | Experimental Plot 15 |
|---|---|---|---|---|---|---|
| Combined Component Test Example (i) | Acetic Acid (parts) | 1 | 1 | 1 | 1 | 1 |
| | Component (A): 1-Octen-3-Ol (parts) | 0.01 | 0.01 | 0.01 | 0.01 | 0.01 |
| | Component (C): Furfural (parts) | 0.5 | 0.75 | 1 | 2.5 | 5 |
| | Component (D): Hexanal (parts) | 0.5 | 1 | 10 | 12.5 | 15 |
| | Sour Taste and Sour Odor Suppression Effect on White Rice | 5 | 5 | 5 | 5 | 5 |
| | Flavor Enhancement Effect on White Rice | 5 | 5 | 5 | 5 | 5 |
| | Sour Taste and Sour Odor Suppression Effect on Vinegar Drink | 5 | 5 | 5 | 5 | 5 |
| | Flavor Enhancement Effect on Vinegar Drink | 5 | 5 | 5 | 5 | 5 |
| | Comprehensive Evaluation (including Notes) | 5 | 5 | 5 | 5 | 5 |
| | Notes | | | Persistence and richness of the flavor were increased in addition to increased flavor in line with an increase in the amount of the aromatic component. | | |

| | | Experimental Plot 16 | Experimental Plot 17 |
|---|---|---|---|
| Combined Component Test Example (i) | Acetic Acid (parts) | 1 | 1 |
| | Component (A): 1-Octen-3-Ol (parts) | 0.01 | 0.01 |
| | Component (C): Furfural (parts) | 7.5 | 10 |
| | Component (D): Hexanal (parts) | 17.5 | 20 |
| | Sour Taste and Sour Odor Suppression Effect on White Rice | 5 | 5 |
| | Flavor Enhancement Effect on White Rice | 3 | 1 |
| | Sour Taste and Sour Odor Suppression Effect on Vinegar Drink | 4 | 4 |
| | Flavor Enhancement Effect on Vinegar Drink | 3 | 3 |
| | Comprehensive Evaluation (including Notes) | 2 | 1 |
| | Notes | | An unpleasant feel due to the aromatic component-derived flavor, with the flavor of white rice masked |

TABLE 6-2

| | | Experimental Plot 1 | Experimental Plot 2 | Experimental Plot 3 | Experimental Plot 4 | Experimental Plot 5 |
|---|---|---|---|---|---|---|
| Combined Component Test Example (ii) | Acetic Acid (parts) | 1 | 1 | 1 | 1 | 1 |
| | Component (A): 1-Octen-3-Ol (parts) | 0.01 | 0.01 | 0.01 | 0.01 | 0.01 |
| | Component (C): Furfuryl Alcohol (parts) | 1 ppm | 5 ppm | 10 ppm | 50 ppm | 0.0001 |
| | Component (D): Hexanal (parts) | 0.1 ppm | 0.5 ppm | 1 ppm | 5 ppm | 10 ppm |
| | Sour Taste and Sour Odor Suppression Effect on White Rice | 4 | 4 | 5 | 5 | 5 |
| | Flavor Enhancement Effect on White Rice | 4 | 4 | 5 | 5 | 5 |
| | Sour Taste and Sour Odor Suppression Effect on Vinegar Drink | 4 | 4 | 5 | 5 | 5 |
| | Flavor Enhancement Effect on Vinegar Drink | 4 | 4 | 5 | 5 | 5 |
| | Comprehensive Evaluation (including Notes) | 4 | 4 | 5 | 5 | 5 |
| | Notes | | No synergy due to combinational use was observed. | Persistence and richness of the flavor were increased in addition to increased flavor in line with an increase in the amount of the aromatic component. | | |

| | | Experimental Plot 6 | Experimental Plot 7 | Experimental Plot 8 | Experimental Plot 9 | Experimental Plot 10 |
|---|---|---|---|---|---|---|
| Combined Component Test Example (ii) | Acetic Acid (parts) | 1 | 1 | 1 | 1 | 1 |
| | Component (A): 1-Octen-3-Ol (parts) | 0.01 | 0.01 | 0.01 | 0.01 | 0.01 |
| | Component (C): Furfuryl Alcohol (parts) | 0.001 | 0.005 | 0.01 | 0.1 | 1 |
| | Component (D): Hexanal (parts) | 0.0001 | 0.001 | 0.005 | 0.01 | 0.1 |

TABLE 6-2-continued

|  |  | | | | | |
|---|---|---|---|---|---|---|
|  | Sour Taste and Sour Odor Suppression Effect on White Rice | 5 | 5 | 5 | 5 | 5 |
|  | Flavor Enhancement Effect on White Rice | 5 | 5 | 5 | 5 | 5 |
|  | Sour Taste and Sour Odor Suppression Effect on Vinegar Drink | 5 | 5 | 5 | 5 | 5 |
|  | Flavor Enhancement Effect on Vinegar Drink | 5 | 5 | 5 | 5 | 5 |
|  | Comprehensive Evaluation (including Notes) | 5 | 5 | 5 | 5 | 5 |
|  | Notes | | | Persistence and richness of the flavor were increased in addition to increased flavor in line with an increase in the amount of the aromatic component. | | |

|  |  | Experimental Plot 11 | Experimental Plot 12 | Experimental Plot 13 | Experimental Plot 14 | Experimental Plot 15 |
|---|---|---|---|---|---|---|
| Combined Component Test Example (ii) | Acetic Acid (parts) | 1 | 1 | 1 | 1 | 1 |
|  | Component (A): 1-Octen-3-Ol (parts) | 0.01 | 0.01 | 0.01 | 0.01 | 0.01 |
|  | Component (C): Furfuryl Alcohol (parts) | 2.5 | 5 | 10 | 12.5 | 15 |
|  | Component (D): Hexanal (parts) | 0.5 | 1 | 10 | 12.5 | 15 |
|  | Sour Taste and Sour Odor Suppression Effect on White Rice | 5 | 5 | 5 | 5 | 5 |
|  | Flavor Enhancement Effect on White Rice | 5 | 5 | 5 | 5 | 5 |
|  | Sour Taste and Sour Odor Suppression Effect on Vinegar Drink | 5 | 5 | 5 | 5 | 5 |
|  | Flavor Enhancement Effect on Vinegar Drink | 5 | 5 | 5 | 5 | 5 |
|  | Comprehensive Evaluation (including Notes) | 5 | 5 | 5 | 5 | 5 |
|  | Notes | | | Persistence and richness of the flavor were increased in addition to increased flavor in line with an increase in the amount of the aromatic component. | | |

|  |  | Experimental Plot 16 | Experimental Plot 17 |
|---|---|---|---|
| Combined Component Test Example (ii) | Acetic Acid (parts) | 1 | 1 |
|  | Component (A): 1-Octen-3-Ol (parts) | 0.01 | 0.01 |
|  | Component (C): Furfuryl Alcohol (parts) | 17.5 | 20 |
|  | Component (D): Hexanal (parts) | 17.5 | 20 |
|  | Sour Taste and Sour Odor Suppression Effect on White Rice | 5 | 5 |
|  | Flavor Enhancement Effect on White Rice | 3 | 1 |
|  | Sour Taste and Sour Odor Suppression Effect on Vinegar Drink | 4 | 4 |
|  | Flavor Enhancement Effect on Vinegar Drink | 3 | 3 |
|  | Comprehensive Evaluation (including Notes) | 2 | 1 |
|  | Notes | | An unpleasant feel due to the aromatic component-derived flavor, with the flavor of white rice masked |

As shown in Tables 6-1 and 6-2, the addition of furfural (component (C)) and hexanal (component (D)) with 1-octen-3-ol (component (A)), and the addition of furfuryl alcohol (component (C)) and hexanal (component (D)) with 1-octen-3-ol exhibited a synergistic effect with component (A) when the concentrations of components (C) and (D) were within the optimum ranges as studied in Examples 4 and 5.

Tables 6-1 and 6-2 show the results of combinations of furfural or furfuryl alcohol, which are (C) furan compounds having 5 or 6 carbon atoms, with hexanal, which is (D) an aliphatic aldehyde having 6 to 9 carbon atoms. Additionally, a study was conducted on the effects due to the combined use of (A) an unsaturated alcohol having 8 carbon atoms with 2-acetylfuran, 3-methylfuran, or 2-(5H)-furanone, which have a similar structure, as (C) a furan compound having 5 or 6 carbon atoms, and heptanal, octanal, or nonanal, which have a similar structure, as (D) an aliphatic aldehyde having 6 to 9 carbon atoms; the results were the same as those shown in Tables 6-1 and 6-2.

TABLE 6-3

|  |  | Experimental Plot 1 | Experimental Plot 2 | Experimental Plot 3 | Experimental Plot 4 | Experimental Plot 5 |
|---|---|---|---|---|---|---|
| Combined Component Test Example (iii) | Acetic Acid (parts) | 1 | 1 | 1 | 1 | 1 |
|  | Component (B): Limonene (parts) | 0.01 | 0.01 | 0.01 | 0.01 | 0.01 |
|  | Component (C): Furfural (parts) | 10 ppm | 50 ppm | 0.0001 | 0.0005 | 0.001 |
|  | Component (D): Hexanal (parts) | 0.1 ppm | 0.5 ppm | 1 ppm | 5 ppm | 10 ppm |
|  | Sour Taste and Sour Odor Suppression Effect on White Rice | 4 | 4 | 5 | 5 | 5 |
|  | Flavor Enhancement Effect on White Rice | 4 | 4 | 5 | 5 | 5 |
|  | Sour Taste and Sour Odor Suppression Effect on Vinegar Drink | 4 | 4 | 5 | 5 | 5 |

TABLE 6-3-continued

|  |  | Experimental Plot 1 | Experimental Plot 2 | Experimental Plot 3 | Experimental Plot 4 | Experimental Plot 5 |
|---|---|---|---|---|---|---|
|  | Flavor Enhancement Effect on Vinegar Drink | 4 | 4 | 5 | 5 | 5 |
|  | Comprehensive Evaluation (including Notes) | 4 | 4 | 5 | 5 | 5 |
|  | Notes |  | No synergy due to combinational use was observed. | Persistence and richness of the flavor were increased in addition to increased flavor in line with an increase in the amount of the aromatic component. | | |

|  |  | Experimental Plot 6 | Experimental Plot 7 | Experimental Plot 8 | Experimental Plot 9 | Experimental Plot 10 |
|---|---|---|---|---|---|---|
| Combined Component Test Example (iii) | Acetic Acid (parts) | 1 | 1 | 1 | 1 | 1 |
| | Component (B): Limonene (parts) | 0.01 | 0.01 | 0.01 | 0.01 | 0.01 |
| | Component (C): Furfural (parts) | 0.005 | 0.01 | 0.05 | 0.1 | 0.25 |
| | Component (D): Hexanal (parts) | 0.0001 | 0.001 | 0.005 | 0.01 | 0.1 |
| | Sour Taste and Sour Odor Suppression Effect on White Rice | 5 | 5 | 5 | 5 | 5 |
| | Flavor Enhancement Effect on White Rice | 5 | 5 | 5 | 5 | 5 |
| | Sour Taste and Sour Odor Suppression Effect on Vinegar Drink | 5 | 5 | 5 | 5 | 5 |
| | Flavor Enhancement Effect on Vinegar Drink | 5 | 5 | 5 | 5 | 5 |
| | Comprehensive Evaluation (including Notes) | 5 | 5 | 5 | 5 | 5 |
| | Notes | | | Persistence and richness of the flavor were increased in addition to increased flavor in line with an increase in the amount of the aromatic component. | | |

|  |  | Experimental Plot 11 | Experimental Plot 12 | Experimental Plot 13 | Experimental Plot 14 | Experimental Plot 15 |
|---|---|---|---|---|---|---|
| Combined Component Test Example (iii) | Acetic Acid (parts) | 1 | 1 | 1 | 1 | 1 |
| | Component (B): Limonene (parts) | 0.01 | 0.01 | 0.01 | 0.01 | 0.01 |
| | Component (C): Furfural (parts) | 0.5 | 0.75 | 1 | 2.5 | 5 |
| | Component (D): Hexanal (parts) | 0.5 | 1 | 10 | 12.5 | 15 |
| | Sour Taste and Sour Odor Suppression Effect on White Rice | 5 | 5 | 5 | 5 | 5 |
| | Flavor Enhancement Effect on White Rice | 5 | 5 | 5 | 5 | 5 |
| | Sour Taste and Sour Odor Suppression Effect on Vinegar Drink | 5 | 5 | 5 | 5 | 5 |
| | Flavor Enhancement Effect on Vinegar Drink | 5 | 5 | 5 | 5 | 5 |
| | Comprehensive Evaluation (including Notes) | 5 | 5 | 5 | 5 | 5 |
| | Notes | | | Persistence and richness of the flavor were increased in addition to increased flavor in line with an increase in the amount of the aromatic component. | | |

|  |  | Experimental Plot 16 | Experimental Plot 17 |
|---|---|---|---|
| Combined Component Test Example (iii) | Acetic Acid (parts) | 1 | 1 |
| | Component (B): Limonene (parts) | 0.01 | 0.01 |
| | Component (C): Furfural (parts) | 7.5 | 10 |
| | Component (D): Hexanal (parts) | 17.5 | 20 |
| | Sour Taste and Sour Odor Suppression Effect on White Rice | 5 | 5 |
| | Flavor Enhancement Effect on White Rice | 3 | 1 |
| | Sour Taste and Sour Odor Suppression Effect on Vinegar Drink | 4 | 4 |
| | Flavor Enhancement Effect on Vinegar Drink | 3 | 3 |
| | Comprehensive Evaluation (including Notes) | 2 | 1 |
| | Notes | An unpleasant feel due to the aromatic component-derived flavor, with the flavor of white rice masked | |

TABLE 6-4

|  |  | Experimental Plot 1 | Experimental Plot 2 | Experimental Plot 3 | Experimental Plot 4 | Experimental Plot 5 |
|---|---|---|---|---|---|---|
| Combined Component Test Example (iv) | Acetic Acid (parts) | 1 | 1 | 1 | 1 | 1 |
| | Component (B): Limonene (parts) | 0.01 | 0.01 | 0.01 | 0.01 | 0.01 |
| | Component (C): Furfuryl Alcohol (parts) | 1 ppm | 5 ppm | 10 ppm | 50 ppm | 0.0001 |
| | Component (D): Hexanal (parts) | 0.1 ppm | 0.5 ppm | 1 ppm | 5 ppm | 10 ppm |
| | Sour Taste and Sour Odor Suppression Effect on White Rice | 4 | 4 | 5 | 5 | 5 |
| | Flavor Enhancement Effect on White Rice | 4 | 4 | 5 | 5 | 5 |
| | Sour Taste and Sour Odor Suppression Effect on Vinegar Drink | 4 | 4 | 5 | 5 | 5 |
| | Flavor Enhancement Effect on Vinegar Drink | 4 | 4 | 5 | 5 | 5 |
| | Comprehensive Evaluation (including Notes) | 4 | 4 | 5 | 5 | 5 |
| | Notes |  | No synergy due to combinational use was observed. |  | Persistence and richness of the flavor were increased in addition to increased flavor in line with an increase in the amount of the aromatic component. |  |

|  |  | Experimental Plot 6 | Experimental Plot 7 | Experimental Plot 8 | Experimental Plot 9 | Experimental Plot 10 |
|---|---|---|---|---|---|---|
| Combined Component Test Example (iv) | Acetic Acid (parts) | 1 | 1 | 1 | 1 | 1 |
| | Component (B): Limonene (parts) | 0.01 | 0.01 | 0.01 | 0.01 | 0.01 |
| | Component (C): Furfuryl Alcohol (parts) | 0.001 | 0.005 | 0.01 | 0.1 | 1 |
| | Component (D): Hexanal (parts) | 0.0001 | 0.001 | 0.005 | 0.01 | 0.1 |
| | Sour Taste and Sour Odor Suppression Effect on White Rice | 5 | 5 | 5 | 5 | 5 |
| | Flavor Enhancement Effect on White Rice | 5 | 5 | 5 | 5 | 5 |
| | Sour Taste and Sour Odor Suppression Effect on Vinegar Drink | 5 | 5 | 5 | 5 | 5 |
| | Flavor Enhancement Effect on Vinegar Drink | 5 | 5 | 5 | 5 | 5 |
| | Comprehensive Evaluation (including Notes) | 5 | 5 | 5 | 5 | 5 |
| | Notes |  |  | Persistence and richness of the flavor were increased in addition to increased flavor in line with an increase in the amount of the aromatic component. |  |  |

|  |  | Experimental Plot 11 | Experimental Plot 12 | Experimental Plot 13 | Experimental Plot 14 | Experimental Plot 15 |
|---|---|---|---|---|---|---|
| Combined Component Test Example (iv) | Acetic Acid (parts) | 1 | 1 | 1 | 1 | 1 |
| | Component (B): Limonene (parts) | 0.01 | 0.01 | 0.01 | 0.01 | 0.01 |
| | Component (C): Furfuryl Alcohol (parts) | 2.5 | 5 | 10 | 12.5 | 15 |
| | Component (D): Hexanal (parts) | 0.5 | 1 | 10 | 12.5 | 15 |
| | Sour Taste and Sour Odor Suppression Effect on White Rice | 5 | 5 | 5 | 5 | 5 |
| | Flavor Enhancement Effect on White Rice | 5 | 5 | 5 | 5 | 5 |
| | Sour Taste and Sour Odor Suppression Effect on Vinegar Drink | 5 | 5 | 5 | 5 | 5 |
| | Flavor Enhancement Effect on Vinegar Drink | 5 | 5 | 5 | 5 | 5 |
| | Comprehensive Evaluation (including Notes) | 5 | 5 | 5 | 5 | 5 |
| | Notes |  |  | Persistence and richness of the flavor were increased in addition to increased flavor in line with an increase in the amount of the aromatic component. |  |  |

|  |  | Experimental Plot 16 | Experimental Plot 17 |
|---|---|---|---|
| Combined Component Test Example (iv) | Acetic Acid (parts) | 1 | 1 |
| | Component (B): Limonene (parts) | 0.01 | 0.01 |
| | Component (C): Furfuryl Alcohol (parts) | 17.5 | 20 |
| | Component (D): Hexanal (parts) | 17.5 | 20 |
| | Sour Taste and Sour Odor Suppression Effect on White Rice | 5 | 5 |
| | Flavor Enhancement Effect on White Rice | 3 | 1 |
| | Sour Taste and Sour Odor Suppression Effect on Vinegar Drink | 4 | 4 |
| | Flavor Enhancement Effect on Vinegar Drink | 3 | 3 |
| | Comprehensive Evaluation (including Notes) | 2 | 1 |
| | Notes |  | An unpleasant feel due to the aromatic component-derived flavor, with the flavor of white rice masked |

TABLE 6-5

|  |  | Experimental Plot 1 | Experimental Plot 2 | Experimental Plot 3 | Experimental Plot 4 | Experimental Plot 5 | Experimental Plot 6 | Experimental Plot 7 | Experimental Plot 8 | Experimental Plot 9 |
| --- | --- | --- | --- | --- | --- | --- | --- | --- | --- | --- |
| Combined Component Test Example (iii) | Acetic Acid (parts) | 1 | 1 | 1 | 1 | 1 | 1 | 1 | 1 | 1 |
|  | Component (B): Terpinene (parts) | 0.01 | 0.01 | 0.01 | 0.01 | 0.01 | 0.01 | 0.01 | 0.01 | 0.01 |
|  | Component (C): Furfural (parts) | 10 ppm | 50 ppm | 0.0001 | 0.0005 | 0.001 | 0.005 | 0.01 | 0.05 | 0.1 |
|  | Component (D): Hexanal (parts) | 0.1 ppm | 0.5 ppm | 1 ppm | 5 ppm | 10 ppm | 0.0001 | 0.001 | 0.005 | 0.01 |
|  | Sour Taste and Sour Odor Suppression Effect on White Rice | 4 | 4 | 5 | 5 | 5 | 5 | 5 | 5 | 5 |
|  | Flavor Enhancement Effect on White Rice | 4 | 4 | 5 | 5 | 5 | 5 | 5 | 5 | 5 |
|  | Sour Taste and Sour Odor Suppression Effect on Vinegar Drink | 4 | 4 | 5 | 5 | 5 | 5 | 5 | 5 | 5 |
|  | Flavor Enhancement Effect on Vinegar Drink | 4 | 4 | 5 | 5 | 5 | 5 | 5 | 5 | 5 |
|  | Comprehensive Evaluation (including Notes) | 4 | 4 | 5 | 5 | 5 | 5 | 5 | 5 | 5 |
|  | Notes | No synergy due to combinational use was observed. | | Persistence and richness of the flavor were increased in addition to increased flavor in line with an increase in the amount of the aromatic component. | | | | | | |

|  |  | Experimental Plot 10 | Experimental Plot 11 | Experimental Plot 12 | Experimental Plot 13 | Experimental Plot 14 | Experimental Plot 15 | Experimental Plot 16 | Experimental Plot 17 |
| --- | --- | --- | --- | --- | --- | --- | --- | --- | --- |
| Combined Component Test Example (iii) | Acetic Acid (parts) | 1 | 1 | 1 | 1 | 1 | 1 | 1 | 1 |
|  | Component (B): Terpinene (parts) | 0.01 | 0.01 | 0.01 | 0.01 | 0.01 | 0.01 | 0.01 | 0.01 |
|  | Component (C): Furfural (parts) | 0.25 | 0.5 | 0.75 | 1 | 2.5 | 5 | 7.5 | 10 |
|  | Component (D): Hexanal (parts) | 0.1 | 0.5 | 1 | 10 | 12.5 | 15 | 17.5 | 20 |
|  | Sour Taste and Sour Odor Suppression Effect on White Rice | 5 | 5 | 5 | 5 | 5 | 5 | 5 | 5 |
|  | Flavor Enhancement Effect on White Rice | 5 | 5 | 5 | 5 | 5 | 5 | 3 | 1 |
|  | Sour Taste and Sour Odor Suppression Effect on Vinegar Drink | 5 | 5 | 5 | 5 | 5 | 5 | 4 | 4 |
|  | Flavor Enhancement Effect on Vinegar Drink | 5 | 5 | 5 | 5 | 5 | 5 | 3 | 3 |
|  | Comprehensive Evaluation (including Notes) | 5 | 5 | 5 | 5 | 5 | 5 | 2 | 1 |
|  | Notes | Persistence and richness of the flavor were increased in addition to increased flavor in line with an increase in the amount of the aromatic component. | | | | | | An unpleasant feel due to the aromatic component-derived flavor, with the flavor of white rice masked | |

TABLE 6-6

| | | Experimental Plot 1 | Experimental Plot 2 | Experimental Plot 3 | Experimental Plot 4 | Experimental Plot 5 | Experimental Plot 6 | Experimental Plot 7 | Experimental Plot 8 | Experimental Plot 9 |
|---|---|---|---|---|---|---|---|---|---|---|
| Combined Component Test Example (v) | Acetic Acid (parts) | 1 | 1 | 1 | 1 | 1 | 1 | 1 | 1 | 1 |
| | Component (B): Terpinene (parts) | 0.01 | 0.01 | 0.01 | 0.01 | 0.01 | 0.01 | 0.01 | 0.01 | 0.01 |
| | Component (C): Furfuryl Alcohol (parts) | 1 ppm | 5 ppm | 10 ppm | 50 ppm | 0.0001 | 0.001 | 0.005 | 0.01 | 0.1 |
| | Component (D): Hexanal (parts) | 0.1 ppm | 0.5 ppm | 1 ppm | 5 ppm | 10 ppm | 0.0001 | 0.001 | 0.005 | 0.01 |
| | Sour Taste and Sour Odor Suppression Effect on White Rice | 4 | 4 | 5 | 5 | 5 | 5 | 5 | 5 | 5 |
| | Flavor Enhancement Effect on White Rice | 4 | 4 | 5 | 5 | 5 | 5 | 5 | 5 | 5 |
| | Sour Taste and Sour Odor Suppression Effect on Vinegar Drink | 4 | 4 | 5 | 5 | 5 | 5 | 5 | 5 | 5 |
| | Flavor Enhancement Effect on Vinegar Drink | 4 | 4 | 5 | 5 | 5 | 5 | 5 | 5 | 5 |
| | Comprehensive Evaluation (including Notes) | 4 | 4 | 5 | 5 | 5 | 5 | 5 | 5 | 5 |
| | Notes | No synergy due to combinational use was observed. | | | Persistence and richness of the flavor were increased in addition to increased flavor in line with an increase in the amount of the aromatic component. | | | | | |

| | | Experimental Plot 10 | Experimental Plot 11 | Experimental Plot 12 | Experimental Plot 13 | Experimental Plot 14 | Experimental Plot 15 | Experimental Plot 16 | Experimental Plot 17 |
|---|---|---|---|---|---|---|---|---|---|
| Combined Component Test Example (v) | Acetic Acid (parts) | 1 | 1 | 1 | 1 | 1 | 1 | 1 | 1 |
| | Component (B): Terpinene (parts) | 0.01 | 0.01 | 0.01 | 0.01 | 0.01 | 0.01 | 0.01 | 0.01 |
| | Component (C): Furfuryl Alcohol (parts) | 1 | 2.5 | 5 | 10 | 12.5 | 15 | 17.5 | 20 |
| | Component (D): Hexanal (parts) | 0.1 | 0.5 | 1 | 10 | 12.5 | 15 | 17.5 | 20 |
| | Sour Taste and Sour Odor Suppression Effect on White Rice | 5 | 5 | 5 | 5 | 5 | 5 | 5 | 5 |
| | Flavor Enhancement Effect on White Rice | 5 | 5 | 5 | 5 | 5 | 5 | 3 | 1 |
| | Sour Taste and Sour Odor Suppression Effect on Vinegar Drink | 5 | 5 | 5 | 5 | 5 | 5 | 4 | 4 |
| | Flavor Enhancement Effect on Vinegar Drink | 5 | 5 | 5 | 5 | 5 | 5 | 3 | 3 |
| | Comprehensive Evaluation (including Notes) | 5 | 5 | 5 | 5 | 5 | 5 | 2 | 1 |
| | Notes | Persistence and richness of the flavor were increased in addition to increased flavor in line with an increase in the amount of the aromatic component. | | | | | | An unpleasant feel due to the aromatic component-derived flavor, with the flavor of white rice masked | |

TABLE 6-7

|  |  | Experimental Plot 1 | Experimental Plot 2 | Experimental Plot 3 | Experimental Plot 4 | Experimental Plot 5 | Experimental Plot 6 | Experimental Plot 7 | Experimental Plot 8 | Experimental Plot 9 |
| --- | --- | --- | --- | --- | --- | --- | --- | --- | --- | --- |
| Combined Component Test Example (vi) | Acetic Acid (parts) | 1 | 1 | 1 | 1 | 1 | 1 | 1 | 1 | 1 |
|  | Component (B): Muurolol (ppm) | 0.01 | 0.01 | 0.01 | 0.01 | 0.01 | 0.01 | 0.01 | 0.01 | 0.01 |
|  | Component (C): Furfural (parts) | 10 ppm | 50 ppm | 0.0001 | 0.0005 | 0.001 | 0.005 | 0.01 | 0.05 | 0.1 |
|  | Component (D): Hexanal (parts) | 0.1 ppm | 0.5 ppm | 1 ppm | 5 ppm | 10 ppm | 0.0001 | 0.001 | 0.005 | 0.01 |
|  | Sour Taste and Sour Odor Suppression Effect on White Rice | 4 | 4 | 5 | 5 | 5 | 5 | 5 | 5 | 5 |
|  | Flavor Enhancement Effect on White Rice | 4 | 4 | 5 | 5 | 5 | 5 | 5 | 5 | 5 |
|  | Sour Taste and Sour Odor Suppression Effect on Vinegar Drink | 4 | 4 | 5 | 5 | 5 | 5 | 5 | 5 | 5 |
|  | Flavor Enhancement Effect on Vinegar Drink | 4 | 4 | 5 | 5 | 5 | 5 | 5 | 5 | 5 |
|  | Comprehensive Evaluation (including Notes) | 4 | 4 | 5 | 5 | 5 | 5 | 5 | 5 | 5 |
|  | Notes |  | No synergy due to combinational use was observed. | Persistence and richness of the flavor were increased in addition to increased flavor in line with an increase in the amount of the aromatic component. | | | | | | |

|  |  | Experimental Plot 10 | Experimental Plot 11 | Experimental Plot 12 | Experimental Plot 13 | Experimental Plot 14 | Experimental Plot 15 | Experimental Plot 16 | Experimental Plot 17 |
| --- | --- | --- | --- | --- | --- | --- | --- | --- | --- |
| Combined Component Test Example (vi) | Acetic Acid (parts) | 1 | 1 | 1 | 1 | 1 | 1 | 1 | 1 |
|  | Component (B): Muurolol (ppm) | 0.01 | 0.01 | 0.01 | 0.01 | 0.01 | 0.01 | 0.01 | 0.01 |
|  | Component (C): Furfural (parts) | 0.25 | 0.5 | 0.75 | 1 | 2.5 | 5 | 7.5 | 10 |
|  | Component (D): Hexanal (parts) | 0.1 | 0.5 | 1 | 10 | 12.5 | 15 | 17.5 | 20 |
|  | Sour Taste and Sour Odor Suppression Effect on White Rice | 5 | 5 | 5 | 5 | 5 | 5 | 5 | 5 |
|  | Flavor Enhancement Effect on White Rice | 5 | 5 | 5 | 5 | 5 | 5 | 3 | 1 |
|  | Sour Taste and Sour Odor Suppression Effect on Vinegar Drink | 5 | 5 | 5 | 5 | 5 | 5 | 4 | 4 |
|  | Flavor Enhancement Effect on Vinegar Drink | 5 | 5 | 5 | 5 | 5 | 5 | 3 | 3 |
|  | Comprehensive Evaluation (including Notes) | 5 | 5 | 5 | 5 | 5 | 5 | 2 | 1 |
|  | Notes | Persistence and richness of the flavor were increased in addition to increased flavor in line with an increase in the amount of the aromatic component. | | | | | | An unpleasant feel due to the aromatic component-derived flavor, with the flavor of white rice masked | |

TABLE 6-8

| | | Experimental Plot 1 | Experimental Plot 2 | Experimental Plot 3 | Experimental Plot 4 | Experimental Plot 5 | Experimental Plot 6 | Experimental Plot 7 | Experimental Plot 8 | Experimental Plot 9 |
|---|---|---|---|---|---|---|---|---|---|---|
| Combined Component Test Example (vii) | Acetic Acid (parts) | 1 | 1 | 1 | 1 | 1 | 1 | 1 | 1 | 1 |
| | Component (B): Muurolol (ppm) | 0.01 | 0.01 | 0.01 | 0.01 | 0.01 | 0.01 | 0.01 | 0.01 | 0.01 |
| | Component (C): Furfuryl Alcohol (parts) | 1 ppm | 5 ppm | 10 ppm | 50 ppm | 0.0001 | 0.001 | 0.005 | 0.01 | 0.1 |
| | Component (D): Hexanal (parts) | 0.1 ppm | 0.5 ppm | 1 ppm | 5 ppm | 10 ppm | 0.0001 | 0.001 | 0.005 | 0.01 |
| | Sour Taste and Sour Odor Suppression Effect on White Rice | 4 | 4 | 5 | 5 | 5 | 5 | 5 | 5 | 5 |
| | Flavor Enhancement Effect on White Rice | 4 | 4 | 5 | 5 | 5 | 5 | 5 | 5 | 5 |
| | Sour Taste and Sour Odor Suppression Effect on Vinegar Drink | 4 | 4 | 5 | 5 | 5 | 5 | 5 | 5 | 5 |
| | Flavor Enhancement Effect on Vinegar Drink | 4 | 4 | 5 | 5 | 5 | 5 | 5 | 5 | 5 |
| | Comprehensive Evaluation (including Notes) | 4 | 4 | 5 | 5 | 5 | 5 | 5 | 5 | 5 |
| | Notes | No synergy due to combinational use was observed. | | | Persistence and richness of the flavor were increased in addition to increased flavor in line with an increase in the amount of the aromatic component. | | | | | |

| | | Experimental Plot 10 | Experimental Plot 11 | Experimental Plot 12 | Experimental Plot 13 | Experimental Plot 14 | Experimental Plot 15 | Experimental Plot 16 | Experimental Plot 17 |
|---|---|---|---|---|---|---|---|---|---|
| Combined Component Test Example (vii) | Acetic Acid (parts) | 1 | 1 | 1 | 1 | 1 | 1 | 1 | 1 |
| | Component (B): Muurolol (ppm) | 0.01 | 0.01 | 0.01 | 0.01 | 0.01 | 0.01 | 0.01 | 0.01 |
| | Component (C): Furfuryl Alcohol (parts) | 1 | 2.5 | 5 | 10 | 12.5 | 15 | 17.5 | 20 |
| | Component (D): Hexanal (parts) | 0.1 | 0.5 | 1 | 10 | 12.5 | 15 | 17.5 | 20 |
| | Sour Taste and Sour Odor Suppression Effect on White Rice | 5 | 5 | 5 | 5 | 5 | 5 | 5 | 5 |
| | Flavor Enhancement Effect on White Rice | 5 | 5 | 5 | 5 | 5 | 5 | 3 | 1 |
| | Sour Taste and Sour Odor Suppression Effect on Vinegar Drink | 5 | 5 | 5 | 5 | 5 | 5 | 4 | 4 |
| | Flavor Enhancement Effect on Vinegar Drink | 5 | 5 | 5 | 5 | 5 | 5 | 3 | 3 |
| | Comprehensive Evaluation (including Notes) | 5 | 5 | 5 | 5 | 5 | 5 | 2 | 1 |
| | Notes | Persistence and richness of the flavor were increased in addition to increased flavor in line with an increase in the amount of the aromatic component. | | | | | | An unpleasant feel due to the aromatic component-derived flavor, with the flavor of white rice masked | |

TABLE 6-9

| | | Experimental Plot 1 | Experimental Plot 2 | Experimental Plot 3 | Experimental Plot 4 | Experimental Plot 5 | Experimental Plot 6 | Experimental Plot 7 | Experimental Plot 8 | Experimental Plot 9 |
|---|---|---|---|---|---|---|---|---|---|---|
| Combined Component Test Example (viii) | Acetic Acid (parts) | 1 | 1 | 1 | 1 | 1 | 1 | 1 | 1 | 1 |
| | Component (B): Cadalene (ppm) | 0.01 | 0.01 | 0.01 | 0.01 | 0.01 | 0.01 | 0.01 | 0.01 | 0.01 |
| | Component (C): Furfural (parts) | 10 ppm | 50 ppm | 0.0001 | 0.0005 | 0.001 | 0.005 | 0.01 | 0.05 | 0.1 |
| | Component (D): Hexanal (parts) | 0.1 ppm | 0.5 ppm | 1 ppm | 5 ppm | 10 ppm | 0.0001 | 0.001 | 0.005 | 0.01 |
| | Sour Taste and Sour Odor Suppression Effect on White Rice | 4 | 4 | 5 | 5 | 5 | 5 | 5 | 5 | 5 |
| | Flavor Enhancement Effect on White Rice | 4 | 4 | 5 | 5 | 5 | 5 | 5 | 5 | 5 |
| | Sour Taste and Sour Odor Suppression Effect on Vinegar Drink | 4 | 4 | 5 | 5 | 5 | 5 | 5 | 5 | 5 |
| | Flavor Enhancement Effect on Vinegar Drink | 4 | 4 | 5 | 5 | 5 | 5 | 5 | 5 | 5 |
| | Comprehensive Evaluation (including Notes) | 4 | 4 | 5 | 5 | 5 | 5 | 5 | 5 | 5 |
| | Notes | No synergy due to combinational use was observed. | | Persistence and richness of the flavor were increased in addition to increased flavor in line with an increase in the amount of the aromatic component. | | | | | | |

| | | Experimental Plot 10 | Experimental Plot 11 | Experimental Plot 12 | Experimental Plot 13 | Experimental Plot 14 | Experimental Plot 15 | Experimental Plot 16 | Experimental Plot 17 |
|---|---|---|---|---|---|---|---|---|---|
| Combined Component Test Example (viii) | Acetic Acid (parts) | 1 | 1 | 1 | 1 | 1 | 1 | 1 | 1 |
| | Component (B): Cadalene (ppm) | 0.01 | 0.01 | 0.01 | 0.01 | 0.01 | 0.01 | 0.01 | 0.01 |
| | Component (C): Furfural (parts) | 0.25 | 0.5 | 0.75 | 1 | 2.5 | 5 | 7.5 | 10 |
| | Component (D): Hexanal (parts) | 0.1 | 0.5 | 1 | 10 | 12.5 | 15 | 17.5 | 20 |
| | Sour Taste and Sour Odor Suppression Effect on White Rice | 5 | 5 | 5 | 5 | 5 | 5 | 5 | 5 |
| | Flavor Enhancement Effect on White Rice | 5 | 5 | 5 | 5 | 5 | 5 | 3 | 1 |
| | Sour Taste and Sour Odor Suppression Effect on Vinegar Drink | 5 | 5 | 5 | 5 | 5 | 5 | 4 | 4 |
| | Flavor Enhancement Effect on Vinegar Drink | 5 | 5 | 5 | 5 | 5 | 5 | 3 | 3 |
| | Comprehensive Evaluation (including Notes) | 5 | 5 | 5 | 5 | 5 | 5 | 2 | 1 |
| | Notes | Persistence and richness of the flavor were increased in addition to increased flavor in line with an increase in the amount of the aromatic component. | | | | | | An unpleasant feel due to the aromatic component-derived flavor, with the flavor of white rice masked | |

TABLE 6-10

| | | Experimental Plot 1 | Experimental Plot 2 | Experimental Plot 3 | Experimental Plot 4 | Experimental Plot 5 | Experimental Plot 6 | Experimental Plot 7 | Experimental Plot 8 | Experimental Plot 9 |
|---|---|---|---|---|---|---|---|---|---|---|
| Combined Component Test Example (ix) | Acetic Acid (parts) | 1 | 1 | 1 | 1 | 1 | 1 | 1 | 1 | 1 |
| | Component (B): Cadalene (ppm) | 0.01 | 0.01 | 0.01 | 0.01 | 0.01 | 0.01 | 0.01 | 0.01 | 0.01 |
| | Component (C): Furfuryl Alcohol (parts) | 1 ppm | 5 ppm | 10 ppm | 50 ppm | 0.0001 | 0.001 | 0.005 | 0.01 | 0.1 |
| | Component (D): Hexanal (parts) | 0.1 ppm | 0.5 ppm | 1 ppm | 5 ppm | 10 ppm | 0.0001 | 0.001 | 0.005 | 0.01 |
| | Sour Taste and Sour Odor Suppression Effect on White Rice | 4 | 4 | 5 | 5 | 5 | 5 | 5 | 5 | 5 |
| | Flavor Enhancement Effect on White Rice | 4 | 4 | 5 | 5 | 5 | 5 | 5 | 5 | 5 |
| | Sour Taste and Sour Odor Suppression Effect on Vinegar Drink | 4 | 4 | 5 | 5 | 5 | 5 | 5 | 5 | 5 |
| | Flavor Enhancement Effect on Vinegar Drink | 4 | 4 | 5 | 5 | 5 | 5 | 5 | 5 | 5 |
| | Comprehensive Evaluation (including Notes) | 4 | 4 | 5 | 5 | 5 | 5 | 5 | 5 | 5 |
| | Notes | No synergy due to combinational use was observed. | | Persistence and richness of the flavor were increased in addition to increased flavor in line with an increase in the amount of the aromatic component. | | | | | | |

| | | Experimental Plot 10 | Experimental Plot 11 | Experimental Plot 12 | Experimental Plot 13 | Experimental Plot 14 | Experimental Plot 15 | Experimental Plot 16 | Experimental Plot 17 |
|---|---|---|---|---|---|---|---|---|---|
| Combined Component Test Example (ix) | Acetic Acid (parts) | 1 | 1 | 1 | 1 | 1 | 1 | 1 | 1 |
| | Component (B): Cadalene (ppm) | 0.01 | 0.01 | 0.01 | 0.01 | 0.01 | 0.01 | 0.01 | 0.01 |
| | Component (C): Furfuryl Alcohol (parts) | 1 | 2.5 | 5 | 10 | 12.5 | 15 | 17.5 | 20 |
| | Component (D): Hexanal (parts) | 0.1 | 0.5 | 1 | 10 | 12.5 | 15 | 17.5 | 20 |
| | Sour Taste and Sour Odor Suppression Effect on White Rice | 5 | 5 | 5 | 5 | 5 | 5 | 5 | 5 |
| | Flavor Enhancement Effect on White Rice | 5 | 5 | 5 | 5 | 5 | 5 | 3 | 1 |
| | Sour Taste and Sour Odor Suppression Effect on Vinegar Drink | 5 | 5 | 5 | 5 | 5 | 5 | 4 | 4 |
| | Flavor Enhancement Effect on Vinegar Drink | 5 | 5 | 5 | 5 | 5 | 5 | 3 | 3 |
| | Comprehensive Evaluation (including Notes) | 5 | 5 | 5 | 5 | 5 | 5 | 2 | 1 |
| | Notes | Persistence and richness of the flavor were increased in addition to increased flavor in line with an increase in the amount of the aromatic component. | | | | | | An unpleasant feel due to the aromatic component-derived flavor, with the flavor of white rice masked | |

As shown in Tables 6-3 to 6-10, the addition of limonene, terpinene, muurolol, or cadalene (component (B)) together with both furfural (component (C)) and hexanal (component (D)), and the addition of limonene, terpinene, muurolol, or cadalene (component (B)) together with both furfuryl alcohol (component (C)) and hexanal (component (D)) exhibited a synergistic effect with component (B) when the concentrations of components (C) and (D) were within the optimum ranges as studied in Examples 4 and 5.

Tables 6-3 to 6-10 show the results of combinations of furfural or furfuryl alcohol, which are (C) furan compounds having 5 or 6 carbon atoms, with hexanal, which is (D) an aliphatic aldehyde having 6 to 9 carbon atoms. Additionally, a study was conducted on the effects due to the combined use of p-cymene, which has a similar structure, as (B) a monoterpene or sesquiterpene; 2-acetylfuran, 3-methylfuran, or 2-(5H)-furanone, which have a similar structure, as (C) a furan compound having 5 or 6 carbon atoms; and heptanal, octanal, or nonanal, which have a similar structure, as (D) an aliphatic aldehyde having 6 to 9 carbon atoms. The results were the same as those shown in Tables 6-3 and 6-10.

The results above demonstrate that an acetic acid-containing food or drink that remarkably and strongly exhibits the effect of the present invention, with increased persistence and richness of flavor, can be prepared by adding at least one aromatic component selected from the group consisting of (A) unsaturated alcohols having 8 carbon atoms and (B) monoterpenes or sesquiterpenes, together with both at least one aromatic component selected from the group consisting of (C) furan compounds having 5 or 6 carbon atoms and at least one aromatic component selected from the group consisting of (D) aliphatic aldehydes having 6 to 9 carbon atoms.

Example 7: Study on the Range of Concentration of Acetic Acid for Acetic Acid-Containing Food or Drink 1

Examples 1 to 6 studied the effect of the present invention brought about by adding each of the aromatic components to a food or drink containing a predetermined concentration of acetic acid. In this Example, as shown in Table 7, a predetermined concentration of an aromatic component was added to foods or drinks having different acetic acid contents, and the effect of the present invention was studied.

For the acetic acid-containing food or drink with an acetic acid content of 0.01 mass % to 0.18 mass %, white rice and a simmered dish were prepared and used in the test. The white rice was prepared according to Example 1, and the simmered dish was prepared according to the following formula.

Ingredients (10 taro potatoes (about 700 g), pork belly (about 275 g), 25 g of ginger) were placed in a pot with 300 mL of a commercially available seasoning for a simmered dish (Oigatsuo-tsuyu (double-concentrated)) produced by Mizkan, acetic acid equivalent acidity: 0.39 mass %, ingredients: (fully brewed) soy sauce, high-fructose corn syrup, salt, sugar, dried bonito flakes (coarsely flaked and powdery flaked), fermented vinegar, hydrolyzed protein, yeast extract, concentrated broth (dried bonito flakes, dried shiitake mushroom)), seafood extract, kelp extract, alcohol, seasonings (amino acids etc.)), and 700 mL of water; and covered. The mixture was then cooked for 20 minutes over medium heat. The simmered dish "simmered taro potatoes and pork belly" (the acetic acid content per gram of the entire simmered dish after cooking (seasoning sauce+ingredients): 0.059 mass % (acetic acid equivalent acidity)) (which is hereinafter referred to as "simmered dish") was prepared.

For the acetic acid-containing food or drink with an acetic acid content of 0.2 mass % to 6 mass %, an apple-flavored vinegar drink was selected, and used in the test. The method of test and study was performed in accordance with Example 1. However, as described above, these two items (i.e., the white rice and the simmered dish) were evaluated within the range of acetic acid concentration of 0.01 mass % to 0.18 mass %, and scored based on the results of these two items in accordance with the criteria in Example 1.

Table 7 shows the results.

TABLE 7-1

| | | Test Example 11 | Test Example 12 | Test Example 13 | Test Example 14 | Test Example 15 | Test Example 16 | Test Example 17 | Test Example 18 |
|---|---|---|---|---|---|---|---|---|---|
| | Acetic Acid Content when Food or Drink is taken (mass %) | 0.01 | 0.015 | 0.02 | 0.05 | 0.1 | 0.15 | 0.18 | 0.2 |
| Aromatic Component | Component (A): Detected Amount of 1-Octen-3-Ol (parts) with respect to 1 Part of Acetic Acid | 0.01 | 0.01 | 0.01 | 0.01 | 0.01 | 0.01 | 0.01 | 0.01 |
| | Sour Taste and Sour Odor Suppression Effect on Food or Drink | 5 | 5 | 5 | 4 | 4 | 4 | 4 | 4 |
| | Flavor Enhancement Effect on Food or Drink | 5 | 5 | 5 | 4 | 4 | 4 | 3 | 3 |
| | Comprehensive Evaluation (including Notes) | 1 | 4 | 4 | 4 | 4 | 4 | 4 | 4 |
| | Notes | Originally having a low shelf-life prolonging effect | | | No sour taste and sour odor Somewhat increased original flavor of the food ingredient | | | | Somewhat strongly decreased pungency of sour taste and sour odor |

TABLE 7-1-continued

|  |  | Test Example 19 | Test Example 20 | Test Example 21 | Test Example 22 | Test Example 23 | Test Example 24 | Test Example 25 |
|---|---|---|---|---|---|---|---|---|
| Aromatic Component | Acetic Acid Content when Food or Drink is taken (mass %) | 0.5 | 1.0 | 2.0 | 3.0 | 4.0 | 5.0 | 6.0 |
|  | Component (A): Detected Amount of 1-Octen-3-Ol (parts) with respect to 1 Part of Acetic Acid | 0.01 | 0.01 | 0.01 | 0.01 | 0.01 | 0.01 | 0.01 |
|  | Sour Taste and Sour Odor Suppression Effect on Food or Drink | 4 | 4 | 4 | 4 | 3 | 2 | 1 |
|  | Flavor Enhancement Effect on Food or Drink | 3 | 3 | 3 | 3 | 3 | 3 | 3 |
|  | Comprehensive Evaluation (including Notes) | 4 | 4 | 3 | 3 | 3 | 3 | 1 |
|  | Notes |  | Somewhat strongly decreased pungency of sour taste and sour odor Somewhat increased original flavor of the food ingredient | | | | | Sour taste and sour odor are perceived as pungency |

TABLE 7-2

|  |  | Test Example 26 | Test Example 27 | Test Example 28 | Test Example 29 | Test Example 30 | Test Example 31 | Test Example 32 | Test Example 33 |
|---|---|---|---|---|---|---|---|---|---|
| Aromatic Component | Acetic Acid Content when Food or Drink is taken (mass %) | 0.01 | 0.015 | 0.02 | 0.05 | 0.1 | 0.15 | 0.18 | 0.2 |
|  | Component (B): Detected Amount of Limonene (parts) with respect to 1 Part of Acetic Acid | 0.01 | 0.01 | 0.01 | 0.01 | 0.01 | 0.01 | 0.01 | 0.01 |
|  | Sour Taste and Sour Odor Suppression Effect on Food or Drink | 4 | 4 | 4 | 3 | 3 | 3 | 3 | 3 |
|  | Flavor Enhancement Effect on Food or Drink | 4 | 4 | 4 | 4 | 4 | 4 | 3 | 3 |
|  | Comprehensive Evaluation (including Notes) | 1 | 3 | 3 | 3 | 3 | 3 | 3 | 3 |
|  | Notes | Originally having a low shelf-life prolonging effect | Almost no sour taste and sour odor Somewhat increased original flavor of the food ingredient | | | | | | Decreased pungency of sour taste and sour odor |

|  |  | Test Example 34 | Test Example 35 | Test Example 36 | Test Example 37 | Test Example 38 | Test Example 39 | Test Example 40 |
|---|---|---|---|---|---|---|---|---|
| Aromatic Component | Acetic Acid Content when Food or Drink is taken (mass %) | 0.5 | 1.0 | 2.0 | 3.0 | 4.0 | 5.0 | 6.0 |
|  | Component (B): Detected Amount of Limonene (parts) with respect to 1 Part of Acetic Acid | 0.01 | 0.01 | 0.01 | 0.01 | 0.01 | 0.01 | 0.01 |
|  | Sour Taste and Sour Odor Suppression Effect on Food or Drink | 3 | 3 | 3 | 3 | 2 | 2 | 1 |
|  | Flavor Enhancement Effect on Food or Drink | 3 | 3 | 2 | 2 | 2 | 2 | 2 |

TABLE 7-2-continued

|  |  |  |  |  |  |  |  |  |
|---|---|---|---|---|---|---|---|---|
|  | Comprehensive Evaluation (including Notes) | 3 | 3 | 3 | 3 | 3 | 3 | 1 |
|  | Notes |  | Decreased pungency of sour taste and sour odor Somewhat increased original flavor of the food ingredient |  |  |  |  | Sour taste and sour odor are perceived as pungency |

TABLE 7-3

|  |  | Test Example 41 | Test Example 42 | Test Example 43 | Test Example 44 | Test Example 45 | Test Example 46 | Test Example 47 | Test Example 48 |
|---|---|---|---|---|---|---|---|---|---|
| Aromatic Component | Acetic Acid Content when Food or Drink is taken (mass %) | 0.01 | 0.015 | 0.02 | 0.05 | 0.1 | 0.15 | 0.18 | 0.2 |
|  | Component (B): Detected Amount of Terpinene (parts) with respect to 1 Part of Acetic Acid | 0.01 | 0.01 | 0.01 | 0.01 | 0.01 | 0.01 | 0.01 | 0.01 |
|  | Sour Taste and Sour Odor Suppression Effect on Food or Drink | 4 | 4 | 4 | 3 | 3 | 3 | 3 | 3 |
|  | Flavor Enhancement Effect on Food or Drink | 4 | 4 | 4 | 4 | 4 | 4 | 3 | 3 |
|  | Comprehensive Evaluation (including Notes) | 1 | 3 | 3 | 3 | 3 | 3 | 3 | 3 |
|  | Notes | Originally having a low shelf-life prolonging effect | Almost no sour taste and sour odor Somewhat increased original flavor of the food ingredient |  |  |  |  |  | Decreased pungency of sour taste and sour odor |

|  |  | Test Example 49 | Test Example 50 | Test Example 51 | Test Example 52 | Test Example 53 | Test Example 54 | Test Example 55 |
|---|---|---|---|---|---|---|---|---|
| Aromatic Component | Acetic Acid Content when Food or Drink is taken (mass %) | 0.5 | 1.0 | 2.0 | 3.0 | 4.0 | 5.0 | 6.0 |
|  | Component (B): Detected Amount of Terpinene (parts) with respect to 1 Part of Acetic Acid | 0.01 | 0.01 | 0.01 | 0.01 | 0.01 | 0.01 | 0.01 |
|  | Sour Taste and Sour Odor Suppression Effect on Food or Drink | 3 | 3 | 3 | 3 | 2 | 2 | 1 |
|  | Flavor Enhancement Effect on Food or Drink | 3 | 3 | 2 | 2 | 2 | 2 | 2 |
|  | Comprehensive Evaluation (including Notes) | 3 | 3 | 3 | 3 | 3 | 3 | 1 |
|  | Notes | Decreased pungency of sour taste and sour odor Somewhat increased original flavor of the food ingredient |  |  |  |  |  | Sour taste and sour odor are perceived as pungency |

TABLE 7-4

|  |  | Test Example 56 | Test Example 57 | Test Example 58 | Test Example 59 | Test Example 60 | Test Example 61 | Test Example 62 | Test Example 63 |
|---|---|---|---|---|---|---|---|---|---|
| Aromatic Component | Acetic Acid Content when Food or Drink is taken (mass %) | 0.01 | 0.015 | 0.02 | 0.05 | 0.1 | 0.15 | 0.18 | 0.2 |
|  | Component (B): Detected Amount of Muurolol (parts) with respect to 1 Part of Acetic Acid | 0.01 | 0.01 | 0.01 | 0.01 | 0.01 | 0.01 | 0.01 | 0.01 |
|  | Sour Taste and Sour Odor Suppression Effect on Food or Drink | 4 | 4 | 4 | 3 | 3 | 3 | 3 | 3 |
|  | Flavor Enhancement Effect on Food or Drink | 4 | 4 | 4 | 4 | 4 | 4 | 3 | 3 |
|  | Comprehensive Evaluation (including Notes) | 1 | 3 | 3 | 3 | 3 | 3 | 3 | 3 |
|  | Notes | Originally having a low shelf-life prolonging effect | Almost no sour taste and sour odor / Somewhat increased original flavor of the food ingredient | | | | | | Decreased pungency of sour taste and sour odor |

|  |  | Test Example 64 | Test Example 65 | Test Example 66 | Test Example 67 | Test Example 68 | Test Example 69 | Test Example 70 |
|---|---|---|---|---|---|---|---|---|
| Aromatic Component | Acetic Acid Content when Food or Drink is taken (mass %) | 0.5 | 1.0 | 2.0 | 3.0 | 4.0 | 5.0 | 6.0 |
|  | Component (B): Detected Amount of Muurolol (parts) with respect to 1 Part of Acetic Acid | 0.01 | 0.01 | 0.01 | 0.01 | 0.01 | 0.01 | 0.01 |
|  | Sour Taste and Sour Odor Suppression Effect on Food or Drink | 3 | 3 | 3 | 3 | 2 | 2 | 1 |
|  | Flavor Enhancement Effect on Food or Drink | 3 | 3 | 2 | 2 | 2 | 2 | 2 |
|  | Comprehensive Evaluation (including Notes) | 3 | 3 | 3 | 3 | 3 | 3 | 1 |
|  | Notes | Decreased pungency of sour taste and sour odor / Somewhat increased original flavor of the food ingredient | | | | | | Sour taste and sour odor are perceived as pungency |

TABLE 7-5

|  |  | Test Example 71 | Test Example 72 | Test Example 73 | Test Example 74 | Test Example 75 | Test Example 76 | Test Example 77 | Test Example 78 |
|---|---|---|---|---|---|---|---|---|---|
| Aromatic Component | Acetic Acid Content when Food or Drink is taken (mass %) | 0.01 | 0.015 | 0.02 | 0.05 | 0.1 | 0.15 | 0.18 | 0.2 |
|  | Component (B): Detected Amount of Cadalene (parts) with respect to 1 Part of Acetic Acid | 0.01 | 0.01 | 0.01 | 0.01 | 0.01 | 0.01 | 0.01 | 0.01 |
|  | Sour Taste and Sour Odor Suppression Effect on Food or Drink | 4 | 4 | 4 | 3 | 3 | 3 | 3 | 3 |
|  | Flavor Enhancement Effect on Food or Drink | 4 | 4 | 4 | 4 | 4 | 4 | 3 | 3 |

TABLE 7-5-continued

| | | Test Example 79 | Test Example 80 | Test Example 81 | Test Example 82 | Test Example 83 | Test Example 84 | Test Example 85 |
|---|---|---|---|---|---|---|---|---|
| | Comprehensive Evaluation (including Notes) | 1 | 3 | 3 | 3 | 3 | 3 | 3 |
| | Notes | Originally having a low shelf-life prolonging effect | Almost no sour taste and sour odor <br><br> Somewhat increased original flavor of the food ingredient | | | | | Decreased pungency of sour taste and sour odor |

| | | Test Example 79 | Test Example 80 | Test Example 81 | Test Example 82 | Test Example 83 | Test Example 84 | Test Example 85 |
|---|---|---|---|---|---|---|---|---|
| | Acetic Acid Content when Food or Drink is taken (mass %) | 0.5 | 1.0 | 2.0 | 3.0 | 4.0 | 5.0 | 6.0 |
| Aromatic Component | Component (B): Detected Amount of Cadalene (parts) with respect to 1 Part of Acetic Acid | 0.01 | 0.01 | 0.01 | 0.01 | 0.01 | 0.01 | 0.01 |
| | Sour Taste and Sour Odor Suppression Effect on Food or Drink | 3 | 3 | 3 | 3 | 2 | 2 | 1 |
| | Flavor Enhancement Effect on Food or Drink | 3 | 3 | 2 | 2 | 2 | 2 | 2 |
| | Comprehensive Evaluation (including Notes) | 3 | 3 | 3 | 3 | 3 | 3 | 1 |
| | Notes | | Decreased pungency of sour taste and sour odor Somewhat increased original flavor of the food ingredient | | | | | Sour taste and sour odor are perceived as pungency |

As shown in Tables 7-1 to 7-5, white rice and a simmered dish to which 1-octen-3-ol (an aromatic component of (A) unsaturated alcohols having 8 carbon atoms) was added exhibited no sour taste and sour odor within an acetic acid content of 0.015 mass % or more and less than 0.2 mass % when the white rice or simmered dish was eaten, and also exhibited somewhat increased original flavor of the food ingredient; this indicates that the effect of the present invention was brought about. Similarly, the vinegar drink exhibited somewhat strongly decreased pungency of sour taste and sour odor within an acetic acid content of 0.2 mass % or more and 5 mass % or less when the vinegar drink was drunk, and also exhibited somewhat increased original flavor of the food ingredient (the apple flavor of the vinegar drink); this indicates that the effect of the present invention was brought about.

White rice and a simmered dish to which limonene, terpinene, muurolol, or cadalene ((B) a monoterpene or sesquiterpene) was added exhibited almost no sour taste and sour odor within an acetic acid content of 0.015 mass % or more and less than 0.2 mass % when the white rice or simmered dish was eaten, and also exhibited somewhat increased original flavor of the food ingredient; this indicates that the effect of the present invention was brought about. Similarly, the vinegar drink exhibited a decreased pungency of sour taste and sour odor within an acetic acid content of 0.2 mass % or more and 5 mass % or less when the vinegar drink was drunk, and also exhibited somewhat increased original flavor of the food ingredient (the apple flavor of the vinegar drink); this indicates that the effect of the present invention was brought about.

p-Cymene, which has a similar structure, ((B) a monoterpene or sesquiterpene) was also examined; the results were the same as those shown in Tables 7-2 to 7-5.

In this Example, a predetermined amount of an aromatic component was added to the ingredients, and there was a trend such that the higher the acetic acid content in the acetic acid-containing food or drink, the weaker the effect of the present invention. Thus, it was found that the concentration of the aromatic component may be increased in line with the content of acetic acid such that the effect of the present invention is clearly brought about.

In the case of the white rice and simmered dish, an acetic acid content of 0.1 mass % or less resulted in a weak shelf-life prolonging effect, and was found to be unsuitable for application in the present invention. In the case of the vinegar drink, an acetic acid content of 6 mass % or more resulted in the pungency of sour taste and sour odor, even when the amount of the aromatic component was increased; and was found to not sufficiently provide the effect of the present invention.

Example 8: Study on the Range of Concentration of Acetic Acid for Acetic Acid-Containing Food or Drink 2

Example 7 studied the effect of the present invention on a food or drink containing one aromatic component selected from aromatic components (A) and (B). In Example 8, as shown in Table 8, the effect of the present invention was studied in the case in which 1-octen-3-ol ((A) an unsaturated alcohol having 8 carbon atoms) and one aromatic component selected from (C) furan compounds having 5 or 6 carbon atoms were used in combination. The method of test and study was performed in accordance with Examples 1 and 7.

Table 8 shows the results.

TABLE 8-1

|  |  | Test Example 86 | Test Example 87 | Test Example 88 | Test Example 89 | Test Example 90 | Test Example 91 | Test Example 92 | Test Example 93 |
|---|---|---|---|---|---|---|---|---|---|
| Aromatic Component | Acetic Acid Content when Food or Drink is taken (mass %) | 0.01 | 0.015 | 0.02 | 0.05 | 0.1 | 0.15 | 0.18 | 0.2 |
|  | Component (A): Detected Amount of 1-Octen-3-Ol (parts) with respect to 1 Part of Acetic Acid | 0.01 | 0.01 | 0.01 | 0.01 | 0.01 | 0.01 | 0.01 | 0.01 |
|  | Component (C): Detected Amount of Furfural (parts) with respect to 1 Part of Acetic Acid | 0.01 | 0.01 | 0.01 | 0.01 | 0.01 | 0.01 | 0.01 | 0.01 |
|  | Sour Taste and Sour Odor Suppression Effect on Food or Drink | 5 | 5 | 5 | 5 | 5 | 5 | 5 | 5 |
|  | Flavor Enhancement Effect on Food or Drink | 5 | 5 | 5 | 5 | 5 | 5 | 4 | 4 |
|  | Comprehensive Evaluation (including Notes) | 1 | 5 | 5 | 5 | 5 | 5 | 5 | 5 |
|  | Notes | Originally having a low shelf-life prolonging effect | \multicolumn{5}{c|}{No sour taste or sour odor  Increased original flavor of the food ingredient} | | | | Strongly decreased pungency of sour taste and sour odor |

|  |  | Test Example 94 | Test Example 95 | Test Example 96 | Test Example 97 | Test Example 98 | Test Example 99 | Test Example 100 |
|---|---|---|---|---|---|---|---|---|
| Aromatic Component | Acetic Acid Content when Food or Drink is taken (mass %) | 0.5 | 1.0 | 2.0 | 3.0 | 4.0 | 5.0 | 6.0 |
|  | Component (A): Detected Amount of 1-Octen-3-Ol (parts) with respect to 1 Part of Acetic Acid | 0.01 | 0.01 | 0.01 | 0.01 | 0.01 | 0.01 | 0.01 |
|  | Component (C): Detected Amount of Furfural (parts) with respect to 1 Part of Acetic Acid | 0.01 | 0.01 | 0.01 | 0.01 | 0.01 | 0.01 | 0.01 |
|  | Sour Taste and Sour Odor Suppression Effect on Food or Drink | 5 | 5 | 4 | 4 | 3 | 3 | 1 |
|  | Flavor Enhancement Effect on Food or Drink | 4 | 4 | 4 | 4 | 4 | 3 | 3 |
|  | Comprehensive Evaluation (including Notes) | 5 | 5 | 5 | 5 | 4 | 3 | 1 |
|  | Notes |  | Strongly decreased pungency of sour taste and sour odor  Increased original flavor of the food ingredient | | | | | Sour taste and sour odor are perceived as pungency |

TABLE 8-2

|  |  | Test Example 101 | Test Example 102 | Test Example 103 | Test Example 104 | Test Example 105 | Test Example 106 | Test Example 107 | Test Example 108 |
|---|---|---|---|---|---|---|---|---|---|
| Aromatic Component | Acetic Acid Content when Food or Drink is taken (mass %) | 0.01 | 0.015 | 0.02 | 0.05 | 0.1 | 0.15 | 0.18 | 0.2 |
|  | Component (A): Detected Amount of 1-Octen-3-Ol (parts) with respect to 1 Part of Acetic Acid | 0.01 | 0.01 | 0.01 | 0.01 | 0.01 | 0.01 | 0.01 | 0.01 |
|  | Component (C): Detected Amount of Furfuryl Alcohol (parts) with respect to 1 Part of Acetic Acid | 0.01 | 0.01 | 0.01 | 0.01 | 0.01 | 0.01 | 0.01 | 0.01 |
|  | Sour Taste and Sour Odor Suppression Effect on Food or Drink | 5 | 5 | 5 | 5 | 5 | 5 | 5 | 5 |
|  | Flavor Enhancement Effect on Food or Drink | 5 | 5 | 5 | 5 | 5 | 5 | 4 | 4 |
|  | Comprehensive Evaluation (including Notes) | 1 | 5 | 5 | 5 | 5 | 5 | 5 | 5 |
|  | Notes | Originally having a low shelf-life prolonging effect | | No sour taste or sour odor Increased original flavor of the food ingredient | | | | | Strongly decreased pungency of sour taste and sour odor |

|  |  | Test Example 109 | Test Example 110 | Test Example 111 | Test Example 112 | Test Example 113 | Test Example 114 | Test Example 115 |
|---|---|---|---|---|---|---|---|---|
| Aromatic Component | Acetic Acid Content when Food or Drink is taken (mass %) | 0.5 | 1.0 | 2.0 | 3.0 | 4.0 | 5.0 | 6.0 |
|  | Component (A): Detected Amount of 1-Octen-3-Ol (parts) with respect to 1 Part of Acetic Acid | 0.01 | 0.01 | 0.01 | 0.01 | 0.01 | 0.01 | 0.01 |
|  | Component (C): Detected Amount of Furfuryl Alcohol (parts) with respect to 1 Part of Acetic Acid | 0.01 | 0.01 | 0.01 | 0.01 | 0.01 | 0.01 | 0.01 |
|  | Sour Taste and Sour Odor Suppression Effect on Food or Drink | 5 | 5 | 4 | 4 | 3 | 3 | 1 |
|  | Flavor Enhancement Effect on Food or Drink | 4 | 4 | 4 | 4 | 4 | 3 | 3 |
|  | Comprehensive Evaluation (including Notes) | 5 | 5 | 5 | 5 | 4 | 3 | 1 |
|  | Notes | Strongly decreased pungency of sour taste and sour odor Increased original flavor of the food ingredient | | | | | | Sour taste and sour odor are perceived as pungency |

As shown in Tables 8-1 and 8-2, white rice and a simmered dish to which 1-octen-3-ol (an aromatic component of (A) unsaturated alcohols having 8 carbon atoms) and furfural or furfuryl alcohol (an aromatic component of (C) furan compounds having 5 or 6 carbon atoms) were added in combination exhibited no sour taste and sour odor within an acetic acid content of 0.015 mass % or more and less than 0.2 mass % when the white rice or simmered dish was eaten, and also exhibited increased original flavor of the food ingredient; this indicates that the effect of the present invention was brought about, and that this combination of aromatic components is more preferable. Similarly, the vinegar drink exhibited strongly decreased pungency of sour taste and sour odor within an acetic acid content of 0.2 mass % or more and 5 mass % or less when the vinegar drink was drunk, and also exhibited increased original flavor of the food ingredient (the apple flavor of the vinegar drink); this indicates that the effect of the present invention was brought about, and that this combination of aromatic components is more preferable.

2-Acetylfuran, 3-methylfuran, and 2-(5H)-furanone, which have a similar structure ((C) furan compounds having 5 or 6 carbon atoms), were also examined; the results were the same as those shown in Tables 8-1 and 8-2.

In this Example, a predetermined amount of aromatic components based on the acetic acid content was added, and there was a trend such that the higher the acetic acid content in the acetic acid-containing food or drink, the weaker the effect of the present invention. Thus, it was found that the concentration of the aromatic components may be increased in line with the content of acetic acid such that the effect of the present invention is clearly brought about.

In the case of the white rice and simmered dish, an acetic acid content of 0.1 mass % or less resulted in a weak shelf-life prolonging effect, and was found to be unsuitable for application in the present invention. In the case of the vinegar drink, an acetic acid content of 6 mass % or more resulted in the pungency of sour taste and sour odor, even when the amount of the aromatic components was increased; and was found to not sufficiently provide the effect of the present invention.

Example 9: Study on the Range of Concentration of Acetic Acid for Acetic Acid-Containing Food or Drink 3

In Example 9, as shown in Table 9, the effect of the present invention was studied in the case in which one aromatic component selected from (B) monoterpenes or sesquiterpenes and one aromatic component selected from (D) aliphatic aldehydes having 6 to 9 carbon atoms were used in combination. The method of test and study was performed in accordance with Examples 1 and 7.

Table 9 shows the results.

TABLE 9-1

|  |  | Test Example 116 | Test Example 117 | Test Example 118 | Test Example 119 | Test Example 120 | Test Example 121 | Test Example 122 | Test Example 123 |
|---|---|---|---|---|---|---|---|---|---|
| Aromatic Component | Acetic Acid Content when Food or Drink is taken (mass %) | 0.01 | 0.015 | 0.02 | 0.05 | 0.1 | 0.15 | 0.18 | 0.2 |
|  | Component (B): Detected Amount of Limonene (parts) with respect to 1 Part of Acetic Acid | 0.01 | 0.01 | 0.01 | 0.01 | 0.01 | 0.01 | 0.01 | 0.01 |
|  | Component (C): Detected Amount of Furfural (parts) with respect to 1 Part of Acetic Acid | 0.01 | 0.01 | 0.01 | 0.01 | 0.01 | 0.01 | 0.01 | 0.01 |
|  | Sour Taste and Sour Odor Suppression Effect on Food or Drink | 5 | 5 | 5 | 4 | 4 | 4 | 4 | 4 |
|  | Flavor Enhancement Effect on Food or Drink | 5 | 5 | 5 | 5 | 5 | 5 | 4 | 4 |
|  | Comprehensive Evaluation (including Notes) | 1 | 5 | 5 | 4 | 4 | 4 | 4 | 4 |
|  | Notes | Originally having a low shelf-life prolonging effect | | | No sour taste and sour odor | | | | Somewhat strongly decreased pungency of sour taste and sour odor |
|  |  | | | | Increased original flavor of the food ingredient | | | | |
|  |  | Test Example 124 | Test Example 125 | Test Example 126 | Test Example 127 | Test Example 128 | Test Example 129 | Test Example 130 | |
| Aromatic Component | Acetic Acid Content when Food or Drink is taken (mass %) | 0.5 | 1.0 | 2.0 | 3.0 | 4.0 | 5.0 | 6.0 | |
|  | Component (B): Detected Amount of Limonene (parts) with respect to 1 Part of Acetic Acid | 0.01 | 0.01 | 0.01 | 0.01 | 0.01 | 0.01 | 0.01 | |
|  | Component (C): Detected Amount of Furfural (parts) with respect to 1 Part of Acetic Acid | 0.01 | 0.01 | 0.01 | 0.01 | 0.01 | 0.01 | 0.01 | |
|  | Sour Taste and Sour Odor Suppression Effect on Food or Drink | 4 | 4 | 3 | 3 | 3 | 2 | 1 | |
|  | Flavor Enhancement Effect on Food or Drink | 4 | 4 | 4 | 4 | 4 | 3 | 2 | |

TABLE 9-1-continued

| | | | | | | | | |
|---|---|---|---|---|---|---|---|---|
| Comprehensive Evaluation (including Notes) | 4 | 4 | 4 | 4 | 4 | 3 | 1 | |
| Notes | | Somewhat strongly decreased pungency of sour taste and sour odor | | | | | Sour taste and sour odor are perceived as pungency | |
| | | Increased original flavor of the food ingredient | | | | | | |

TABLE 9-2

| | | Test Example 131 | Test Example 132 | Test Example 133 | Test Example 134 | Test Example 135 | Test Example 136 | Test Example 137 | Test Example 138 |
|---|---|---|---|---|---|---|---|---|---|
| | Acetic Acid Content when Food or Drink is taken (mass %) | 0.01 | 0.015 | 0.02 | 0.05 | 0.1 | 0.15 | 0.18 | 0.2 |
| Aromatic Component | Component (B): Detected Amount of Limonene (parts) with respect to 1 Part of Acetic Acid | 0.01 | 0.01 | 0.01 | 0.01 | 0.01 | 0.01 | 0.01 | 0.01 |
| | Component (C): Detected Amount of Furfuryl Alcohol (parts) with respect to 1 Part of Acetic Acid | 0.01 | 0.01 | 0.01 | 0.01 | 0.01 | 0.01 | 0.01 | 0.01 |
| | Sour Taste and Sour Odor Suppression Effect on Food or Drink | 5 | 5 | 5 | 4 | 4 | 4 | 4 | 4 |
| | Flavor Enhancement Effect on Food or Drink | 5 | 5 | 5 | 5 | 5 | 5 | 4 | 4 |
| | Comprehensive Evaluation (including Notes) | 1 | 5 | 5 | 4 | 4 | 4 | 4 | 4 |
| | Notes | Originally having a low shelf-life prolonging effect | | No sour taste and sour odor | | | | | Somewhat strongly decreased pungency of sour taste and sour odor |
| | | | | Increased original flavor of the food ingredient | | | | | |

| | | Test Example 139 | Test Example 140 | Test Example 141 | Test Example 142 | Test Example 143 | Test Example 144 | Test Example 145 |
|---|---|---|---|---|---|---|---|---|
| | Acetic Acid Content when Food or Drink is taken (mass %) | 0.5 | 1.0 | 2.0 | 3.0 | 4.0 | 5.0 | 6.0 |
| Aromatic Component | Component (B): Detected Amount of Limonene (parts) with respect to 1 Part of Acetic Acid | 0.01 | 0.01 | 0.01 | 0.01 | 0.01 | 0.01 | 0.01 |
| | Component (C): Detected Amount of Furfuryl Alcohol (parts) with respect to 1 Part of Acetic Acid | 0.01 | 0.01 | 0.01 | 0.01 | 0.01 | 0.01 | 0.01 |
| | Sour Taste and Sour Odor Suppression Effect on Food or Drink | 4 | 4 | 3 | 3 | 3 | 2 | 1 |
| | Flavor Enhancement Effect on Food or Drink | 4 | 4 | 4 | 4 | 4 | 3 | 2 |
| | Comprehensive Evaluation (including Notes) | 4 | 4 | 4 | 4 | 4 | 3 | 1 |
| | Notes | | | Somewhat strongly decreased pungency of sour taste and sour odor | | | | Sour taste and sour odor are perceived as pungency |
| | | | | Increased original flavor of the food ingredient | | | | |

TABLE 9-3

|  |  | Test Example 146 | Test Example 147 | Test Example 148 | Test Example 149 | Test Example 150 | Test Example 151 | Test Example 152 | Test Example 153 |
|---|---|---|---|---|---|---|---|---|---|
| Aromatic Component | Acetic Acid Content when Food or Drink is taken (mass %) | 0.01 | 0.015 | 0.02 | 0.05 | 0.1 | 0.15 | 0.18 | 0.2 |
|  | Component (B): Detected Amount of Terpinene (parts) with respect to 1 Part of Acetic Acid | 0.01 | 0.01 | 0.01 | 0.01 | 0.01 | 0.01 | 0.01 | 0.01 |
|  | Component (C): Detected Amount of Furfural (parts) with respect to 1 Part of Acetic Acid | 0.01 | 0.01 | 0.01 | 0.01 | 0.01 | 0.01 | 0.01 | 0.01 |
|  | Sour Taste and Sour Odor Suppression Effect on Food or Drink | 5 | 5 | 5 | 4 | 4 | 4 | 4 | 4 |
|  | Flavor Enhancement Effect on Food or Drink | 5 | 5 | 5 | 5 | 5 | 5 | 4 | 4 |
|  | Comprehensive Evaluation (including Notes) | 1 | 5 | 5 | 4 | 4 | 4 | 4 | 4 |
|  | Notes | Originally having a low shelf-life prolonging effect | No sour taste and sour odor / Increased original flavor of the food ingredient | | | | | Somewhat strongly decreased pungency of sour taste and sour odor | |

|  |  | Test Example 154 | Test Example 155 | Test Example 156 | Test Example 157 | Test Example 158 | Test Example 159 | Test Example 160 |
|---|---|---|---|---|---|---|---|---|
| Aromatic Component | Acetic Acid Content when Food or Drink is taken (mass %) | 0.5 | 1.0 | 2.0 | 3.0 | 4.0 | 5.0 | 6.0 |
|  | Component (B): Detected Amount of Terpinene (parts) with respect to 1 Part of Acetic Acid | 0.01 | 0.01 | 0.01 | 0.01 | 0.01 | 0.01 | 0.01 |
|  | Component (C): Detected Amount of Furfural (parts) with respect to 1 Part of Acetic Acid | 0.01 | 0.01 | 0.01 | 0.01 | 0.01 | 0.01 | 0.01 |
|  | Sour Taste and Sour Odor Suppression Effect on Food or Drink | 4 | 4 | 3 | 3 | 3 | 2 | 1 |
|  | Flavor Enhancement Effect on Food or Drink | 4 | 4 | 4 | 4 | 4 | 3 | 2 |
|  | Comprehensive Evaluation (including Notes) | 4 | 4 | 4 | 4 | 4 | 3 | 1 |
|  | Notes |  | Somewhat strongly decreased pungency of sour taste and sour odor / Increased original flavor of the food ingredient | | | | | Sour taste and sour odor are perceived as pungency |

TABLE 9-4

|  | Test Example 161 | Test Example 162 | Test Example 163 | Test Example 164 | Test Example 165 | Test Example 166 | Test Example 167 | Test Example 168 |
|---|---|---|---|---|---|---|---|---|
| Acetic Acid Content when Food or Drink is taken (mass %) | 0.01 | 0.015 | 0.02 | 0.05 | 0.1 | 0.15 | 0.18 | 0.2 |

TABLE 9-4-continued

| | | | | | | | | | |
|---|---|---|---|---|---|---|---|---|---|
| Aromatic Component | Component (B): Detected Amount of Terpinene (parts) with respect to 1 Part of Acetic Acid | 0.01 | 0.01 | 0.01 | 0.01 | 0.01 | 0.01 | 0.01 | 0.01 |
| | Component (C): Detected Amount of Furfuryl Alcohol (parts) with respect to 1 Part of Acetic Acid | 0.01 | 0.01 | 0.01 | 0.01 | 0.01 | 0.01 | 0.01 | 0.01 |
| | Sour Taste and Sour Odor Suppression Effect on Food or Drink | 5 | 5 | 5 | 4 | 4 | 4 | 4 | 4 |
| | Flavor Enhancement Effect on Food or Drink | 5 | 5 | 5 | 5 | 5 | 5 | 4 | 4 |
| | Comprehensive Evaluation (including Notes) | 1 | 5 | 5 | 4 | 4 | 4 | 4 | 4 |
| | Notes | Originally having a low shelf-life prolonging effect | No sour taste and sour odor Increased original flavor of the food ingredient | | | | | | Somewhat strongly decreased pungency of sour taste and sour odor |

| | | Test Example 169 | Test Example 170 | Test Example 171 | Test Example 172 | Test Example 173 | Test Example 174 | Test Example 175 |
|---|---|---|---|---|---|---|---|---|
| | Acetic Acid Content when Food or Drink is taken (mass %) | 0.5 | 1.0 | 2.0 | 3.0 | 4.0 | 5.0 | 6.0 |
| Aromatic Component | Component (B): Detected Amount of Terpinene (parts) with respect to 1 Part of Acetic Acid | 0.01 | 0.01 | 0.01 | 0.01 | 0.01 | 0.01 | 0.01 |
| | Component (C): Detected Amount of Furfuryl Alcohol (parts) with respect to 1 Part of Acetic Acid | 0.01 | 0.01 | 0.01 | 0.01 | 0.01 | 0.01 | 0.01 |
| | Sour Taste and Sour Odor Suppression Effect on Food or Drink | 4 | 4 | 3 | 3 | 3 | 2 | 1 |
| | Flavor Enhancement Effect on Food or Drink | 4 | 4 | 4 | 4 | 4 | 3 | 2 |
| | Comprehensive Evaluation (including Notes) | 4 | 4 | 4 | 4 | 4 | 3 | 1 |
| | Notes | Somewhat strongly decreased pungency of sour taste and sour odor Increased original flavor of the food ingredient | | | | | | Sour taste and sour odor are perceived as pungency |

TABLE 9-5

| | | Test Example 176 | Test Example 177 | Test Example 178 | Test Example 179 | Test Example 180 | Test Example 181 | Test Example 182 | Test Example 183 |
|---|---|---|---|---|---|---|---|---|---|
| | Acetic Acid Content when Food or Drink is taken (mass %) | 0.01 | 0.015 | 0.02 | 0.05 | 0.1 | 0.15 | 0.18 | 0.2 |
| Aromatic Component | Component (B): Detected Amount of Muurolol (parts) with respect to 1 Part of Acetic Acid | 0.01 | 0.01 | 0.01 | 0.01 | 0.01 | 0.01 | 0.01 | 0.01 |

TABLE 9-5-continued

|  |  | | | | | | | | |
|---|---|---|---|---|---|---|---|---|---|
|  | Component (C): Detected Amount of Furfural (parts) with respect to 1 Part of Acetic Acid | 0.01 | 0.01 | 0.01 | 0.01 | 0.01 | 0.01 | 0.01 | 0.01 |
|  | Sour Taste and Sour Odor Suppression Effect on Food or Drink | 5 | 5 | 5 | 4 | 4 | 4 | 4 | 4 |
|  | Flavor Enhancement Effect on Food or Drink | 5 | 5 | 5 | 5 | 5 | 5 | 4 | 4 |
|  | Comprehensive Evaluation (including Notes) | 1 | 5 | 5 | 4 | 4 | 4 | 4 | 4 |
|  | Notes | Originally having a low shelf-life prolonging effect | No sour taste and sour odor | | | | | Somewhat strongly decreased pungency of sour taste and sour odor | |
|  |  | | Increased original flavor of the food ingredient | | | | | | |

|  |  | Test Example 184 | Test Example 185 | Test Example 186 | Test Example 187 | Test Example 188 | Test Example 189 | Test Example 190 |
|---|---|---|---|---|---|---|---|---|
| Aromatic Component | Acetic Acid Content when Food or Drink is taken (mass %) | 0.5 | 1.0 | 2.0 | 3.0 | 4.0 | 5.0 | 6.0 |
|  | Component (B): Detected Amount of Muurolol (parts) with respect to 1 Part of Acetic Acid | 0.01 | 0.01 | 0.01 | 0.01 | 0.01 | 0.01 | 0.01 |
|  | Component (C): Detected Amount of Furfural (parts) with respect to 1 Part of Acetic Acid | 0.01 | 0.01 | 0.01 | 0.01 | 0.01 | 0.01 | 0.01 |
|  | Sour Taste and Sour Odor Suppression Effect on Food or Drink | 4 | 4 | 3 | 3 | 3 | 2 | 1 |
|  | Flavor Enhancement Effect on Food or Drink | 4 | 4 | 4 | 4 | 4 | 3 | 2 |
|  | Comprehensive Evaluation (including Notes) | 4 | 4 | 4 | 4 | 4 | 3 | 1 |
|  | Notes | Somewhat strongly decreased pungency of sour taste and sour odor Increased original flavor of the food ingredient | | | | | | Sour taste and sour odor are perceived as pungency |

TABLE 9-6

|  |  | Test Example 191 | Test Example 192 | Test Example 193 | Test Example 194 | Test Example 195 | Test Example 196 | Test Example 197 | Test Example 198 |
|---|---|---|---|---|---|---|---|---|---|
| Aromatic Component | Acetic Acid Content when Food or Drink is taken (mass %) | 0.01 | 0.015 | 0.02 | 0.05 | 0.1 | 0.15 | 0.18 | 0.2 |
|  | Component (B): Detected Amount of Muurolol (parts) with respect to 1 Part of Acetic Acid | 0.01 | 0.01 | 0.01 | 0.01 | 0.01 | 0.01 | 0.01 | 0.01 |
|  | Component (C): Detected Amount of Furfuryl Alcohol (parts) with respect to 1 Part of Acetic Acid | 0.01 | 0.01 | 0.01 | 0.01 | 0.01 | 0.01 | 0.01 | 0.01 |
|  | Sour Taste and Sour Odor Suppression Effect on Food or Drink | 5 | 5 | 5 | 4 | 4 | 4 | 4 | 4 |

TABLE 9-6-continued

|  | | Test Example 199 | Test Example 200 | Test Example 201 | Test Example 202 | Test Example 203 | Test Example 204 | Test Example 205 |
|---|---|---|---|---|---|---|---|---|
| | Flavor Enhancement Effect on Food or Drink | 5 | 5 | 5 | 5 | 5 | 4 | 4 |
| | Comprehensive Evaluation (including Notes) | 1 | 5 | 5 | 4 | 4 | 4 | 4 |
| | Notes | Originally having a low shelf-life prolonging effect | No sour taste and sour odor | | | | Somewhat strongly decreased pungency of sour taste and sour odor | |
| | | | Increased original flavor of the food ingredient | | | | | |

|  | | Test Example 199 | Test Example 200 | Test Example 201 | Test Example 202 | Test Example 203 | Test Example 204 | Test Example 205 |
|---|---|---|---|---|---|---|---|---|
| Aromatic Component | Acetic Acid Content when Food or Drink is taken (mass %) | 0.5 | 1.0 | 2.0 | 3.0 | 4.0 | 5.0 | 6.0 |
| | Component (B): Detected Amount of Muurolol (parts) with respect to 1 Part of Acetic Acid | 0.01 | 0.01 | 0.01 | 0.01 | 0.01 | 0.01 | 0.01 |
| | Component (C): Detected Amount of Furfuryl Alcohol (parts) with respect to 1 Part of Acetic Acid | 0.01 | 0.01 | 0.01 | 0.01 | 0.01 | 0.01 | 0.01 |
| | Sour Taste and Sour Odor Suppression Effect on Food or Drink | 4 | 4 | 3 | 3 | 3 | 2 | 1 |
| | Flavor Enhancement Effect on Food or Drink | 4 | 4 | 4 | 4 | 4 | 3 | 2 |
| | Comprehensive Evaluation (including Notes) | 4 | 4 | 4 | 4 | 4 | 3 | 1 |
| | Notes | | Somewhat strongly decreased pungency of sour taste and sour odor Increased original flavor of the food ingredient | | | | | Sour taste and sour odor are perceived as pungency |

TABLE 9-7

|  | | Test Example 206 | Test Example 207 | Test Example 208 | Test Example 209 | Test Example 210 | Test Example 211 | Test Example 212 | Test Example 213 |
|---|---|---|---|---|---|---|---|---|---|
| Aromatic Component | Acetic Acid Content when Food or Drink is taken (mass %) | 0.01 | 0.015 | 0.02 | 0.05 | 0.1 | 0.15 | 0.18 | 0.2 |
| | Component (B): Detected Amount of Cadalene (parts) with respect to 1 Part of Acetic Acid | 0.01 | 0.01 | 0.01 | 0.01 | 0.01 | 0.01 | 0.01 | 0.01 |
| | Component (C): Detected Amount of Furfural (parts) with respect to 1 Part of Acetic Acid | 0.01 | 0.01 | 0.01 | 0.01 | 0.01 | 0.01 | 0.01 | 0.01 |
| | Sour Taste and Sour Odor Suppression Effect on Food or Drink | 5 | 5 | 5 | 4 | 4 | 4 | 4 | 4 |
| | Flavor Enhancement Effect on Food or Drink | 5 | 5 | 5 | 5 | 5 | 5 | 4 | 4 |

TABLE 9-7-continued

|  |  | | | | | | | |
|---|---|---|---|---|---|---|---|---|
| Comprehensive Evaluation (including Notes) | | 1 | 5 | 5 | 4 | 4 | 4 | 4 | 4 |
| Notes | | Originally having a low shelf-life prolonging effect | No sour taste and sour odor | | | | | Somewhat strongly decreased pungency of sour taste and sour odor |
| | | | Increased original flavor of the food ingredient | | | | | |

|  |  | Test Example 214 | Test Example 215 | Test Example 216 | Test Example 217 | Test Example 218 | Test Example 219 | Test Example 220 |
|---|---|---|---|---|---|---|---|---|
| Aromatic Component | Acetic Acid Content when Food or Drink is taken (mass %) | 0.5 | 1.0 | 2.0 | 3.0 | 4.0 | 5.0 | 6.0 |
| | Component (B): Detected Amount of Cadalene (parts) with respect to 1 Part of Acetic Acid | 0.01 | 0.01 | 0.01 | 0.01 | 0.01 | 0.01 | 0.01 |
| | Component (C): Detected Amount of Furfural (parts) with respect to 1 Part of Acetic Acid | 0.01 | 0.01 | 0.01 | 0.01 | 0.01 | 0.01 | 0.01 |
| | Sour Taste and Sour Odor Suppression Effect on Food or Drink | 4 | 4 | 3 | 3 | 3 | 2 | 1 |
| | Flavor Enhancement Effect on Food or Drink | 4 | 4 | 4 | 4 | 4 | 3 | 2 |
| | Comprehensive Evaluation (including Notes) | 4 | 4 | 4 | 4 | 4 | 3 | 1 |
| | Notes | Somewhat strongly decreased pungency of sour taste and sour odor Increased original flavor of the food ingredient | | | | | | Sour taste and sour odor are perceived as pungency |

TABLE 9-8

|  |  | Test Example 221 | Test Example 222 | Test Example 223 | Test Example 224 | Test Example 225 | Test Example 226 | Test Example 227 | Test Example 228 |
|---|---|---|---|---|---|---|---|---|---|
| Aromatic Component | Acetic Acid Content when Food or Drink is taken (mass %) | 0.01 | 0.015 | 0.02 | 0.05 | 0.1 | 0.15 | 0.18 | 0.2 |
| | Component (B): Detected Amount of Cadalene (parts) with respect to 1 Part of Acetic Acid | 0.01 | 0.01 | 0.01 | 0.01 | 0.01 | 0.01 | 0.01 | 0.01 |
| | Component (C): Detected Amount of Furfuryl Alcohol (parts) with respect to 1 Part of Acetic Acid | 0.01 | 0.01 | 0.01 | 0.01 | 0.01 | 0.01 | 0.01 | 0.01 |
| | Sour Taste and Sour Odor Suppression Effect on Food or Drink | 5 | 5 | 5 | 4 | 4 | 4 | 4 | 4 |
| | Flavor Enhancement Effect on Food or Drink | 5 | 5 | 5 | 5 | 5 | 5 | 4 | 4 |
| | Comprehensive Evaluation (including Notes) | 1 | 5 | 5 | 4 | 4 | 4 | 4 | 4 |
| | Notes | Originally having a low shelf-life prolonging effect | No sour taste and sour odor | | | | | | Somewhat strongly decreased pungency of sour taste and sour odor |
| | | | Increased original flavor of the food ingredient | | | | | | |

TABLE 9-8-continued

|  |  | Test Example 229 | Test Example 230 | Test Example 231 | Test Example 232 | Test Example 233 | Test Example 234 | Test Example 235 |
|---|---|---|---|---|---|---|---|---|
|  | Acetic Acid Content when Food or Drink is taken (mass %) | 0.5 | 1.0 | 2.0 | 3.0 | 4.0 | 5.0 | 6.0 |
| Aromatic Component | Component (B): Detected Amount of Cadalene (parts) with respect to 1 Part of Acetic Acid | 0.01 | 0.01 | 0.01 | 0.01 | 0.01 | 0.01 | 0.01 |
|  | Component (C): Detected Amount of Furfuryl Alcohol (parts) with respect to 1 Part of Acetic Acid | 0.01 | 0.01 | 0.01 | 0.01 | 0.01 | 0.01 | 0.01 |
|  | Sour Taste and Sour Odor Suppression Effect on Food or Drink | 4 | 4 | 3 | 3 | 3 | 2 | 1 |
|  | Flavor Enhancement Effect on Food or Drink | 4 | 4 | 4 | 4 | 4 | 3 | 2 |
|  | Comprehensive Evaluation (including Notes) | 4 | 4 | 4 | 4 | 4 | 3 | 1 |
|  | Notes |  | Somewhat strongly decreased pungency of sour taste and sour odor Increased original flavor of the food ingredient |  |  |  |  | Sour taste and sour odor are perceived as pungency |

As shown in Tables 9-1 to 9-8, white rice and a simmered dish to which limonene, terpinene, muurolol, or cadalene (an aromatic component of (B) monoterpenes or sesquiterpenes) together with furfural or furfuryl alcohol (an aromatic component of (C) furan compounds having 5 or 6 carbon atoms) were added exhibited no sour taste and sour odor within an acetic acid content of 0.015 mass % or more and less than 0.2 mass % when the white rice or simmered dish was eaten, and also exhibited increased original flavor of the food ingredient; this indicates that the effect of the present invention was brought about, and that this combination of aromatic components is more preferable. Similarly, the vinegar drink exhibited somewhat strongly decreased pungency of sour taste and sour odor within an acetic acid content of 0.2 mass % or more and 5 mass % or less when the vinegar drink was drunk, and also exhibited increased original flavor of the food ingredient (the apple flavor of the vinegar drink); this indicates that the effect of the present invention was brought about, and that this combination of aromatic components is more preferable.

p-Cymene, which has a similar structure ((B) a monoterpene or sesquiterpene), and 2-acetylfuran, 3-methylfuran, 2-methylfuran, and 2-(5H)-furanone, which have a similar structure ((C) furan compounds having 5 or 6 carbon atoms), were also examined in terms of the effect due to combined use. The results were the same as those shown in Tables 9-1 to 9-8.

In this Example, a predetermined amount of aromatic components based on the acetic acid content was added, and there was a trend such that the higher the acetic acid content in the acetic acid-containing food or drink, the weaker the effect of the present invention. Thus, it was found that the concentration of the aromatic components may be increased in line with the content of acetic acid such that the effect of the present invention is clearly brought about.

In the case of the white rice and simmered dish, an acetic acid content of 0.1 mass % or less resulted in a weak shelf-life prolonging effect, and was found to be unsuitable for application in the present invention. In the case of the vinegar drink, an acetic acid content of 6 mass % or more resulted in the pungency of sour taste and sour odor, even when the amount of the aromatic components was increased; and was found to not sufficiently provide the effect of the present invention.

Example 10: Study on the Range of Concentration of Acetic Acid for Acetic Acid-Containing Food or Drink 4

In this Example, as shown in Table 10, the effect of the present invention was studied in the case in which 1-octen-3-ol (an aromatic component of (A) unsaturated alcohols having 8 carbon atoms) and one aromatic component selected from (D) aliphatic aldehydes having 6 to 9 carbon atoms were used in combination. The method of test and study was performed in accordance with Examples 1 and 7.

Table 10 shows the results.

TABLE 10-1

| | | Test Example 236 | Test Example 237 | Test Example 238 | Test Example 239 | Test Example 240 | Test Example 241 | Test Example 242 | Test Example 243 |
|---|---|---|---|---|---|---|---|---|---|
| | Acetic Acid Content when Food or Drink is taken (mass %) | 0.01 | 0.015 | 0.02 | 0.05 | 0.1 | 0.15 | 0.18 | 0.2 |
| Aromatic Component | Component (A): Detected Amount of 1-Octen-3-Ol (parts) with respect to 1 Part of Acetic Acid | 0.01 | 0.01 | 0.01 | 0.01 | 0.01 | 0.01 | 0.01 | 0.01 |
| | Component (D): Detected Amount of Hexanal (parts) with respect to 1 Part of Acetic Acid | 0.01 | 0.01 | 0.01 | 0.01 | 0.01 | 0.01 | 0.01 | 0.01 |
| | Sour Taste and Sour Odor Suppression Effect on Food or Drink | 5 | 5 | 5 | 5 | 5 | 5 | 5 | 5 |
| | Flavor Enhancement Effect on Food or Drink | 4 | 4 | 4 | 5 | 5 | 4 | 3 | 3 |
| | Comprehensive Evaluation (including Notes) | 1 | 5 | 5 | 5 | 5 | 5 | 5 | 5 |
| | Notes | Originally having a low shelf-life prolonging effect | \multicolumn{5}{c}{No sour taste and sour odor  Increased original flavor of the food ingredient} | | | | Strongly decreased pungency of sour taste and sour odor |

| | | Test Example 244 | Test Example 245 | Test Example 246 | Test Example 247 | Test Example 248 | Test Example 249 | Test Example 250 |
|---|---|---|---|---|---|---|---|---|
| | Acetic Acid Content when Food or Drink is taken (mass %) | 0.5 | 1.0 | 2.0 | 3.0 | 4.0 | 5.0 | 6.0 |
| Aromatic Component | Component (A): Detected Amount of 1-Octen-3-Ol (parts) with respect to 1 Part of Acetic Acid | 0.01 | 0.01 | 0.01 | 0.01 | 0.01 | 0.01 | 0.01 |
| | Component (D): Detected Amount of Hexanal (parts) with respect to 1 Part of Acetic Acid | 0.01 | 0.01 | 0.01 | 0.01 | 0.01 | 0.01 | 0.01 |
| | Sour Taste and Sour Odor Suppression Effect on Food or Drink | 5 | 5 | 5 | 4 | 3 | 3 | 1 |
| | Flavor Enhancement Effect on Food or Drink | 3 | 3 | 3 | 3 | 3 | 3 | 3 |
| | Comprehensive Evaluation (including Notes) | 5 | 5 | 5 | 4 | 3 | 3 | 1 |
| | Notes | Strongly decreased pungency of sour taste and sour odor Increased original flavor of the food ingredient | | | | | | Sour taste and sour odor are perceived as pungency |

As shown in Table 10-1, white rice and a simmered dish to which 1-octen-3-ol (an aromatic component of (A) unsaturated alcohols having 8 carbon atoms) together with hexanal (an aromatic component of (D) aliphatic aldehydes having 6 to 9 carbon atoms) were added exhibited no sour taste and sour odor within an acetic acid content of 0.015 mass % or more and less than 0.2 mass % when the white rice or simmered dish was eaten, and also exhibited increased original flavor of the food ingredient; this indicates that the effect of the present invention was brought about, and the combination of aromatic components is more preferable. Similarly, the vinegar drink exhibited strongly decreased pungency of sour taste and sour odor within an acetic acid content of 0.2 mass % or more and 5 mass % or less when the vinegar drink was drunk, and also exhibited increased original flavor of the food ingredient (the apple flavor of the vinegar drink); this indicates that the effect of the present invention was brought about, and the combination of aromatic components is more preferable.

Heptanal, octanol, and nonanal, which have a similar structure ((D) aliphatic aldehydes having 6 to 9 carbon atoms), were also examined in terms of the effect due to combined use; the results were the same as those shown in Table 10-1.

TABLE 10-2

| | | Test Example 251 | Test Example 252 | Test Example 253 | Test Example 254 | Test Example 255 | Test Example 256 | Test Example 257 | Test Example 258 |
|---|---|---|---|---|---|---|---|---|---|
| Aromatic Component | Acetic Acid Content when Food or Drink is taken (mass %) | 0.01 | 0.015 | 0.02 | 0.05 | 0.1 | 0.15 | 0.18 | 0.2 |
| | Component (B): Detected Amount of Limonene (parts) with respect to 1 Part of Acetic Acid | 0.01 | 0.01 | 0.01 | 0.01 | 0.01 | 0.01 | 0.01 | 0.01 |
| | Component (D): Detected Amount of Hexanal (parts) with respect to 1 Part of Acetic Acid | 0.01 | 0.01 | 0.01 | 0.01 | 0.01 | 0.01 | 0.01 | 0.01 |
| | Sour Taste and Sour Odor Suppression Effect on Food or Drink | 4 | 5 | 5 | 5 | 5 | 5 | 5 | 5 |
| | Flavor Enhancement Effect on Food or Drink | 4 | 4 | 4 | 4 | 4 | 4 | 3 | 3 |
| | Comprehensive Evaluation (including Notes) | 1 | 4 | 4 | 4 | 4 | 4 | 4 | 4 |
| | Notes | Originally having a low shelf-life prolonging effect | \multicolumn{5}{No sour taste and sour odor / Increased original flavor of the food ingredient} | | | | Somewhat strongly decreased pungency of sour taste and sour odor |

| | | Test Example 259 | Test Example 260 | Test Example 261 | Test Example 262 | Test Example 263 | Test Example 264 | Test Example 265 |
|---|---|---|---|---|---|---|---|---|
| Aromatic Component | Acetic Acid Content when Food or Drink is taken (mass %) | 0.5 | 1.0 | 2.0 | 3.0 | 4.0 | 5.0 | 6.0 |
| | Component (B): Detected Amount of Limonene (parts) with respect to 1 Part of Acetic Acid | 0.01 | 0.01 | 0.01 | 0.01 | 0.01 | 0.01 | 0.01 |
| | Component (D): Detected Amount of Hexanal (parts) with respect to 1 Part of Acetic Acid | 0.01 | 0.01 | 0.01 | 0.01 | 0.01 | 0.01 | 0.01 |
| | Sour Taste and Sour Odor Suppression Effect on Food or Drink | 5 | 4 | 3 | 3 | 3 | 2 | 1 |
| | Flavor Enhancement Effect on Food or Drink | 3 | 3 | 3 | 3 | 3 | 3 | 2 |
| | Comprehensive Evaluation (including Notes) | 4 | 4 | 4 | 4 | 4 | 3 | 1 |
| | Notes | | Somewhat strongly decreased pungency of sour taste and sour odor / Increased original flavor of the food ingredient | | | | | Sour taste and sour odor are perceived as pungency |

TABLE 10-3

| | | Test Example 266 | Test Example 267 | Test Example 268 | Test Example 269 | Test Example 270 | Test Example 271 | Test Example 272 | Test Example 273 |
|---|---|---|---|---|---|---|---|---|---|
| | Acetic Acid Content when Food or Drink is taken (mass %) | 0.01 | 0.015 | 0.02 | 0.05 | 0.1 | 0.15 | 0.18 | 0.2 |
| Aromatic Component | Component (B): Detected Amount of Terpinene (parts) with respect to 1 Part of Acetic Acid | 0.01 | 0.01 | 0.01 | 0.01 | 0.01 | 0.01 | 0.01 | 0.01 |
| | Component (D): Detected Amount of Hexanal (parts) with respect to 1 Part of Acetic Acid | 0.01 | 0.01 | 0.01 | 0.01 | 0.01 | 0.01 | 0.01 | 0.01 |
| | Sour Taste and Sour Odor Suppression Effect on Food or Drink | 4 | 5 | 5 | 5 | 5 | 5 | 5 | 5 |
| | Flavor Enhancement Effect on Food or Drink | 4 | 4 | 4 | 4 | 4 | 4 | 3 | 3 |
| | Comprehensive Evaluation (including Notes) | 1 | 4 | 4 | 4 | 4 | 4 | 4 | 4 |
| | Notes | Originally having a low shelf-life prolonging effect | No sour taste and sour odor | | | | | Somewhat strongly decreased pungency of sour taste and sour odor | |
| | | | Increased original flavor of the food ingredient | | | | | | |

| | | Test Example 274 | Test Example 275 | Test Example 276 | Test Example 277 | Test Example 278 | Test Example 279 | Test Example 280 |
|---|---|---|---|---|---|---|---|---|
| | Acetic Acid Content when Food or Drink is taken (mass %) | 0.5 | 1.0 | 2.0 | 3.0 | 4.0 | 5.0 | 6.0 |
| Aromatic Component | Component (B): Detected Amount of Terpinene (parts) with respect to 1 Part of Acetic Acid | 0.01 | 0.01 | 0.01 | 0.01 | 0.01 | 0.01 | 0.01 |
| | Component (D): Detected Amount of Hexanal (parts) with respect to 1 Part of Acetic Acid | 0.01 | 0.01 | 0.01 | 0.01 | 0.01 | 0.01 | 0.01 |
| | Sour Taste and Sour Odor Suppression Effect on Food or Drink | 5 | 4 | 3 | 3 | 3 | 2 | 1 |
| | Flavor Enhancement Effect on Food or Drink | 3 | 3 | 3 | 3 | 3 | 3 | 2 |
| | Comprehensive Evaluation (including Notes) | 4 | 4 | 4 | 4 | 4 | 3 | 1 |
| | Notes | | Somewhat strongly decreased pungency of sour taste and sour odor Increased original flavor of the food ingredient | | | | | Sour taste and sour odor are perceived as pungency |

TABLE 10-4

| | | Test Example 281 | Test Example 282 | Test Example 283 | Test Example 284 | Test Example 285 | Test Example 286 | Test Example 287 | Test Example 288 |
|---|---|---|---|---|---|---|---|---|---|
| | Acetic Acid Content when Food or Drink is taken (mass %) | 0.01 | 0.015 | 0.02 | 0.05 | 0.1 | 0.15 | 0.18 | 0.2 |

TABLE 10-4-continued

| | | | | | | | | | |
|---|---|---|---|---|---|---|---|---|---|
| Aromatic Component | Component (B): Detected Amount of Muurolol (parts) with respect to 1 Part of Acetic Acid | 0.01 | 0.01 | 0.01 | 0.01 | 0.01 | 0.01 | 0.01 | 0.01 |
| | Component (D): Detected Amount of Hexanal (parts) with respect to 1 Part of Acetic Acid | 0.01 | 0.01 | 0.01 | 0.01 | 0.01 | 0.01 | 0.01 | 0.01 |
| | Sour Taste and Sour Odor Suppression Effect on Food or Drink | 4 | 5 | 5 | 5 | 5 | 5 | 5 | 5 |
| | Flavor Enhancement Effect on Food or Drink | 4 | 4 | 4 | 4 | 4 | 4 | 3 | 3 |
| | Comprehensive Evaluation (including Notes) | 1 | 4 | 4 | 4 | 4 | 4 | 4 | 4 |
| | Notes | Originally having a low shelf-life prolonging effect | | No sour taste and sour odor | | | | Somewhat strongly decreased pungency of sour taste and sour odor | |
| | | | | Increased original flavor of the food ingredient | | | | | |

| | | Test Example 289 | Test Example 290 | Test Example 291 | Test Example 292 | Test Example 293 | Test Example 294 | Test Example 295 |
|---|---|---|---|---|---|---|---|---|
| | Acetic Acid Content when Food or Drink is taken (mass %) | 0.5 | 1.0 | 2.0 | 3.0 | 4.0 | 5.0 | 6.0 |
| Aromatic Component | Component (B): Detected Amount of Muurolol (parts) with respect to 1 Part of Acetic Acid | 0.01 | 0.01 | 0.01 | 0.01 | 0.01 | 0.01 | 0.01 |
| | Component (D): Detected Amount of Hexanal (parts) with respect to 1 Part of Acetic Acid | 0.01 | 0.01 | 0.01 | 0.01 | 0.01 | 0.01 | 0.01 |
| | Sour Taste and Sour Odor Suppression Effect on Food or Drink | 5 | 4 | 3 | 3 | 3 | 2 | 1 |
| | Flavor Enhancement Effect on Food or Drink | 3 | 3 | 3 | 3 | 3 | 3 | 2 |
| | Comprehensive Evaluation (including Notes) | 4 | 4 | 4 | 4 | 4 | 3 | 1 |
| | Notes | | Somewhat strongly decreased pungency of sour taste and sour odor Increased original flavor of the food ingredient | | | | | Sour taste and sour odor are perceived as pungency |

TABLE 10-5

| | | Test Example 296 | Test Example 297 | Test Example 298 | Test Example 299 | Test Example 300 | Test Example 301 | Test Example 302 | Test Example 303 |
|---|---|---|---|---|---|---|---|---|---|
| | Acetic Acid Content when Food or Drink is taken (mass %) | 0.01 | 0.015 | 0.02 | 0.05 | 0.1 | 0.15 | 0.18 | 0.2 |
| Aromatic Component | Component (B): Detected Amount of Cadalene (parts) with respect to 1 Part of Acetic Acid | 0.01 | 0.01 | 0.01 | 0.01 | 0.01 | 0.01 | 0.01 | 0.01 |
| | Component (D): Detected Amount of Hexanal (parts) with respect to 1 Part of Acetic Acid | 0.01 | 0.01 | 0.01 | 0.01 | 0.01 | 0.01 | 0.01 | 0.01 |

TABLE 10-5-continued

|  |  |  |  |  |  |  |  |  |
|---|---|---|---|---|---|---|---|---|
| Sour Taste and Sour Odor Suppression Effect on Food or Drink | 4 | 5 | 5 | 5 | 5 | 5 | 5 | 5 |
| Flaw Enhancement Effect on Food or Drink | 4 | 4 | 4 | 4 | 4 | 4 | 3 | 3 |
| Comprehensive Evaluation (including Notes) | 1 | 4 | 4 | 4 | 4 | 4 | 4 | 4 |
| Notes | Originally having a low shelf-life prolonging effect | No sour taste and sour odor ⟵⟶ Increased original flavor of the food ingredient | | | | | | Somewhat strongly decreased pungency of sour taste and sour odor |

|  |  | Test Example 304 | Test Example 305 | Test Example 306 | Test Example 307 | Test Example 308 | Test Example 309 | Test Example 310 |
|---|---|---|---|---|---|---|---|---|
|  | Acetic Acid Content when Food or Drink is taken (mass %) | 0.5 | 1.0 | 2.0 | 3.0 | 4.0 | 5.0 | 6.0 |
| Aromatic Component | Component (B): Detected Amount of Cadalene (parts) with respect to 1 Part of Acetic Acid | 0.01 | 0.01 | 0.01 | 0.01 | 0.01 | 0.01 | 0.01 |
|  | Component (D): Detected Amount of Hexanal (parts) with respect to 1 Part of Acetic Acid | 0.01 | 0.01 | 0.01 | 0.01 | 0.01 | 0.01 | 0.01 |
|  | Sour Taste and Sour Odor Suppression Effect on Food or Drink | 5 | 4 | 3 | 3 | 3 | 2 | 1 |
|  | Flaw Enhancement Effect on Food or Drink | 3 | 3 | 3 | 3 | 3 | 3 | 2 |
|  | Comprehensive Evaluation (including Notes) | 4 | 4 | 4 | 4 | 4 | 3 | 1 |
|  | Notes | Somewhat strongly decreased pungency of sour taste and sour odor Increased original flavor of the food ingredient | | | | | | Sour taste and sour odor are perceived as pungency |

As shown in Tables 10-2 to 10-5, white rice and a simmered dish to which limonene, terpinene, muurolol, or cadalene (an aromatic component of (B) monoterpenes or sesquiterpenes) together with hexanal (an aromatic component of (D) aliphatic aldehydes having 6 to 9 carbon atoms) were added exhibited no sour taste and sour odor within an acetic acid content of 0.015 mass % or more and less than 0.2 mass % when the white rice or simmered dish was eaten, and also exhibited increased original flavor of the food ingredient; this indicates that the effect of the present invention was brought about, and that this combination of aromatic components is more preferable. Similarly, the vinegar drink exhibited somewhat strongly decreased pungency of sour taste and sour odor within an acetic acid content of 0.2 mass % or more and 5 mass % or less when the vinegar drink was drunk, and also exhibited increased original flavor of the food ingredient (the apple flavor of the vinegar drink); this indicates that the effect of the present invention was brought about, and that this combination of aromatic components is more preferable.

p-Cymene, which has a similar structure (an aromatic component of (B) monoterpenes or sesquiterpenes), and heptanal, octanol, and nonanal, which have a similar structure ((D) aliphatic aldehydes having 6 to 9 carbon atoms), were also examined in terms of the effect due to combined use. The results were the same as those shown in Tables 10-2 to 10-5.

In this Example, a predetermined amount of aromatic components based on the acetic acid content was added, and there was a trend such that the higher the acetic acid content in the acetic acid-containing food or drink, the weaker the effect of the present invention. Thus, it was found that the concentration of the aromatic components may be increased in line with the content of acetic acid such that the effect of the present invention is clearly brought about.

In the case of the white rice and simmered dish, an acetic acid content of 0.1 mass % or less resulted in a weak shelf-life prolonging effect, and was found to be unsuitable for application in the present invention. In the case of the vinegar drink, an acetic acid content of 6 mass % or more resulted in the pungency of sour taste and sour odor, even when the amount of the aromatic components was increased; and was found to not sufficiently provide the effect of the present invention.

Example 11: Study on the Range of Concentration of Acetic Acid for Acetic Acid-Containing Food or Drink 5

In this Example, as shown in Table 11, the effect of the present invention was studied in the case in which one aromatic component selected from 1-octen-3-ol (an aromatic component of (A) unsaturated alcohols having 8 carbon atoms) and (B) monoterpenes or sesquiterpenes, together with one aromatic component selected from (C) furan compounds having 5 or 6 carbon atoms and one aromatic component selected from (D) aliphatic aldehydes having 6 to 9 carbon atoms were used in combination. The method of test and study was performed in accordance with Examples 1 and 7.

Table 11 shows the results.

TABLE 11-1

|  |  | Test Example 311 | Test Example 312 | Test Example 313 | Test Example 314 | Test Example 315 | Test Example 316 | Test Example 317 | Test Example 318 |
|---|---|---|---|---|---|---|---|---|---|
| Aromatic Component | Acetic Acid Content when Food or Drink is taken (mass %) | 0.01 | 0.015 | 0.02 | 0.05 | 0.1 | 0.15 | 0.18 | 0.2 |
|  | Component (A): Detected Amount of 1-Octen-3-Ol (parts) with respect to 1 Part of Acetic Acid | 0.01 | 0.01 | 0.01 | 0.01 | 0.01 | 0.01 | 0.01 | 0.01 |
|  | Component (C): Detected Amount of Furfural (parts) with respect to 1 Part of Acetic Acid | 0.01 | 0.01 | 0.01 | 0.01 | 0.01 | 0.01 | 0.01 | 0.01 |
|  | Component (D): Detected Amount of Hexanal (parts) with respect to 1 Part of Acetic Acid | 0.01 | 0.01 | 0.01 | 0.01 | 0.01 | 0.01 | 0.01 | 0.01 |
|  | Sour Taste and Sour Odor Suppression Effect on Food or Drink | 5 | 5 | 5 | 5 | 5 | 5 | 5 | 5 |
|  | Flavor Enhancement Effect on Food or Drink | 5 | 5 | 5 | 5 | 5 | 5 | 5 | 5 |
|  | Comprehensive Evaluation (including Notes) | 1 | 5 | 5 | 5 | 5 | 5 | 5 | 5 |
|  | Notes | Originally low shelf-life prolonging effect | | | No sour taste and sour odor | | | | Remarkably strongly decreased pungency of sour taste and sour odor |
|  | | | | | Remarkably strongly increased original flavor of the food ingredient | | | | |

|  |  | Test Example 319 | Test Example 320 | Test Example 321 | Test Example 322 | Test Example 323 | Test Example 324 | Test Example 325 |
|---|---|---|---|---|---|---|---|---|
| Aromatic Component | Acetic Acid Content when Food or Drink is taken (mass %) | 0.5 | 1.0 | 2.0 | 3.0 | 4.0 | 5.0 | 6.0 |
|  | Component (A): Detected Amount of 1-Octen-3-Ol (parts) with respect to 1 Part of Acetic Acid | 0.01 | 0.01 | 0.01 | 0.01 | 0.01 | 0.01 | 0.01 |
|  | Component (C): Detected Amount of Furfural (parts) with respect to 1 Part of Acetic Acid | 0.01 | 0.01 | 0.01 | 0.01 | 0.01 | 0.01 | 0.01 |
|  | Component (D): Detected Amount of Hexanal (parts) with respect to 1 Part of Acetic Acid | 0.01 | 0.01 | 0.01 | 0.01 | 0.01 | 0.01 | 0.01 |
|  | Sour Taste and Sour Odor Suppression Effect on Food or Drink | 5 | 5 | 5 | 5 | 4 | 3 | 1 |
|  | Flavor Enhancement Effect on Food or Drink | 5 | 5 | 4 | 4 | 4 | 4 | 4 |

TABLE 11-1-continued

|  |  |  |  |  |  |  |  |
|---|---|---|---|---|---|---|---|
| Comprehensive Evaluation (including Notes) | 5 | 5 | 5 | 5 | 4 | 3 | 1 |
| Notes |  | Remarkably strongly decreased pungency of sour taste and sour odor Remarkably strongly increased original flavor of the food ingredient |  |  |  |  | Sour taste and sour odor are perceived as pungency |

TABLE 11-2

|  |  | Test Example 326 | Test Example 327 | Test Example 328 | Test Example 329 | Test Example 330 | Test Example 331 | Test Example 332 | Test Example 333 |
|---|---|---|---|---|---|---|---|---|---|
| Aromatic Component | Acetic Acid Content when Food or Drink is taken (mass %) | 0.01 | 0.015 | 0.02 | 0.05 | 0.1 | 0.15 | 0.18 | 0.2 |
|  | Component (A): Detected Amount of 1-Octen-3-Ol (parts) with respect to 1 Part of Acetic Acid | 0.01 | 0.01 | 0.01 | 0.01 | 0.01 | 0.01 | 0.01 | 0.01 |
|  | Component (C): Detected Amount of Furfuryl Alcohol (parts) with respect to 1 Part of Acetic Acid | 0.01 | 0.01 | 0.01 | 0.01 | 0.01 | 0.01 | 0.01 | 0.01 |
|  | Component (D): Detected Amount of Hexanal (parts) with respect to 1 Part of Acetic Acid | 0.01 | 0.01 | 0.01 | 0.01 | 0.01 | 0.01 | 0.01 | 0.01 |
| Sour Taste and Sour Odor Suppression Effect on Food or Drink |  | 5 | 5 | 5 | 5 | 5 | 5 | 5 | 5 |
| Flavor Enhancement Effect on Food or Drink |  | 5 | 5 | 5 | 5 | 5 | 5 | 5 | 5 |
| Comprehensive Evaluation (including Notes) |  | 1 | 5 | 5 | 5 | 5 | 5 | 5 | 5 |
| Notes |  | Originally having a low shelf-life prolonging effect | No sour taste and sour odor Remarkably strongly increased original flavor of the food ingredient |  |  |  |  | Remarkably strongly decreased pungency of sour taste and sour odor |

|  |  | Test Example 334 | Test Example 335 | Test Example 336 | Test Example 337 | Test Example 338 | Test Example 339 | Test Example 340 |
|---|---|---|---|---|---|---|---|---|
| Aromatic Component | Acetic Acid Content when Food or Drink is taken (mass %) | 0.5 | 1.0 | 2.0 | 3.0 | 4.0 | 5.0 | 6.0 |
|  | Component (A): Detected Amount of 1-Octen-3-Ol (parts) with respect to 1 Part of Acetic Acid | 0.01 | 0.01 | 0.01 | 0.01 | 0.01 | 0.01 | 0.01 |
|  | Component (C): Detected Amount of Furfuryl Alcohol (parts) with respect to 1 Part of Acetic Acid | 0.01 | 0.01 | 0.01 | 0.01 | 0.01 | 0.01 | 0.01 |
|  | Component (D): Detected Amount of Hexanal (parts) with respect to 1 Part of Acetic Acid | 0.01 | 0.01 | 0.01 | 0.01 | 0.01 | 0.01 | 0.01 |
| Sour Taste and Sour Odor Suppression |  | 5 | 5 | 5 | 5 | 4 | 3 | 1 |

TABLE 11-2-continued

|  |  |  |  |  |  |  |  |
|---|---|---|---|---|---|---|---|
| Effect on Food or Drink Flavor Enhancement Effect on Food or Drink | 5 | 5 | 4 | 4 | 4 | 4 | 4 |
| Comprehensive Evaluation (including Notes) | 5 | 5 | 5 | 5 | 4 | 3 | 1 |
| Notes | | Remarkably strongly decreased pungency of sour taste and sour odor Remarkably strongly increased original flavor of the food ingredient | | | | | Sour taste and sour odor are perceived as pungency |

As shown in Tables 11-1 and 11-2, white rice and a simmered dish to which 1-octen-3-ol (an aromatic component of (A) unsaturated alcohols having 8 carbon atoms) together with furfural or furfuryl alcohol (an aromatic component of (c) furan compounds having 5 or 6 carbon atoms) and hexanal (an aromatic component of (D) aliphatic aldehydes having 6 to 9 carbon atoms) were added exhibited no sour taste and sour odor within an acetic acid content of 0.015 mass % or more and less than 0.2 mass % when the white rice or simmered dish was eaten, and also exhibited remarkably and strongly increased original flavor of the food ingredient; this indicates that the effect of the present invention was brought about, and that this combination of aromatic components is more preferable. Similarly, the vinegar drink exhibited remarkably strongly decreased pungency of sour taste and sour odor within an acetic acid content of 0.2 mass % or more and 5 mass % or less when the vinegar drink was drunk, and also exhibited remarkably strongly increased original flavor of the food ingredient (the apple flavor of the vinegar drink); this indicates that the effect of the present invention was brought about, and that this combination of aromatic components is more preferable.

1-Octen-3-ol (an aromatic component of (A) unsaturated alcohols having 8 carbon atoms), together with 2-acetylfuran, 3-methylfuran, 2-methylfuran, or 2-(5H)-furanone, which have a similar structure, ((C) furan compounds having 5 or 6 carbon atoms) and heptanal, octanal, or nonanal, which have a similar structure, ((D) aliphatic aldehydes having 6 to 9 carbon atoms) were also examined in terms of the effect due to combined use; the results were the same as those shown in Tables 11-1 and 11-2.

TABLE 11-3

|  |  | Test Example 341 | Test Example 342 | Test Example 343 | Test Example 344 | Test Example 345 | Test Example 346 | Test Example 347 | Test Example 348 |
|---|---|---|---|---|---|---|---|---|---|
| Aromatic Component | Acetic Acid Content when Food or Drink is taken (mass %) | 0.01 | 0.015 | 0.02 | 0.05 | 0.1 | 0.15 | 0.18 | 0.2 |
| | Component (B): Detected Amount of Limonene (parts) with respect to 1 Part of Acetic Acid | 0.01 | 0.01 | 0.01 | 0.01 | 0.01 | 0.01 | 0.01 | 0.01 |
| | Component (C): Detected Amount of Furfural (parts) with respect to 1 Part of Acetic Acid | 0.01 | 0.01 | 0.01 | 0.01 | 0.01 | 0.01 | 0.01 | 0.01 |
| | Component (D): Detected Amount of Hexanal (parts) with respect to 1 Part of Acetic Acid | 0.01 | 0.01 | 0.01 | 0.01 | 0.01 | 0.01 | 0.01 | 0.01 |
| | Sour Taste and Sour Odor Suppression Effect on Food or Drink | 5 | 5 | 5 | 5 | 5 | 5 | 5 | 5 |
| | Flavor Enhancement Effect on Food or Drink | 5 | 5 | 5 | 5 | 5 | 5 | 5 | 5 |
| | Comprehensive Evaluation (including Notes) | 1 | 5 | 5 | 5 | 5 | 5 | 5 | 5 |
| | Notes | Originally low shelf-life prolonging effect | No sour taste and sour odor Strongly increased original flavor of the food ingredient | | | | | | Strongly decreased pungency of sour taste and sour odor |

TABLE 11-3-continued

|  |  | Test Example 349 | Test Example 350 | Test Example 351 | Test Example 352 | Test Example 353 | Test Example 354 | Test Example 355 |
|---|---|---|---|---|---|---|---|---|
|  | Acetic Acid Content when Food or Drink is taken (mass %) | 0.5 | 1.0 | 2.0 | 3.0 | 4.0 | 5.0 | 6.0 |
| Aromatic Component | Component (B): Detected Amount of Limonene (parts) with respect to 1 Part of Acetic Acid | 0.01 | 0.01 | 0.01 | 0.01 | 0.01 | 0.01 | 0.01 |
|  | Component (C): Detected Amount of Furfural (parts) with respect to 1 Part of Acetic Acid | 0.01 | 0.01 | 0.01 | 0.01 | 0.01 | 0.01 | 0.01 |
|  | Component (D): Detected Amount of Hexanal (parts) with respect to 1 Part of Acetic Acid | 0.01 | 0.01 | 0.01 | 0.01 | 0.01 | 0.01 | 0.01 |
|  | Sour Taste and Sour Odor Suppression Effect on Food or Drink | 5 | 5 | 4 | 4 | 3 | 3 | 1 |
|  | Flavor Enhancement Effect on Food or Drink | 4 | 4 | 4 | 4 | 3 | 3 | 3 |
|  | Comprehensive Evaluation (including Notes) | 5 | 5 | 4 | 4 | 3 | 3 | 1 |
|  | Notes |  | Strongly decreased pungency of sour taste and sour odor Strongly increased original flavor of the food ingredient |  |  |  |  | Sour taste and sour odor are perceived as pungency |

TABLE 11-4

|  |  | Test Example 356 | Test Example 357 | Test Example 358 | Test Example 359 | Test Example 360 | Test Example 361 | Test Example 362 | Test Example 363 |
|---|---|---|---|---|---|---|---|---|---|
|  | Acetic Acid Content when Food or Drink is taken (mass %) | 0.01 | 0.015 | 0.02 | 0.05 | 0.1 | 0.15 | 0.18 | 0.2 |
| Aromatic Component | Component (B): Detected Amount of Limonene (parts) with respect to 1 Part of Acetic Acid | 0.01 | 0.01 | 0.01 | 0.01 | 0.01 | 0.01 | 0.01 | 0.01 |
|  | Component (C): Detected Amount of Furfuryl Alcohol (parts) with respect to 1 Part of Acetic Acid | 0.01 | 0.01 | 0.01 | 0.01 | 0.01 | 0.01 | 0.01 | 0.01 |
|  | Component (D): Detected Amount of Hexanal (parts) with respect to 1 Part of Acetic Acid | 0.01 | 0.01 | 0.01 | 0.01 | 0.01 | 0.01 | 0.01 | 0.01 |
|  | Sour Taste and Sour Odor Suppression Effect on Food or Drink | 5 | 5 | 5 | 5 | 5 | 5 | 5 | 5 |
|  | Flavor Enhancement Effect on Food or Drink | 5 | 5 | 5 | 5 | 5 | 5 | 5 | 5 |

TABLE 11-4-continued

| | | | | | | | | |
|---|---|---|---|---|---|---|---|---|
| Comprehensive Evaluation (including Notes) | | 1 | 5 | 5 | 5 | 5 | 5 | 5 | 5 |
| Notes | | Originally low shelf-life prolonging effect | No sour taste and sour odor | | | | | | Strongly decreased pungency of sour taste and sour odor |
| | | | | | Strongly increased original flavor of the food ingredient | | | | |

| | | Test Example 364 | Test Example 365 | Test Example 366 | Test Example 367 | Test Example 368 | Test Example 369 | Test Example 370 |
|---|---|---|---|---|---|---|---|---|
| | Acetic Acid Content when Food or Drink is taken (mass %) | 0.5 | 1.0 | 2.0 | 3.0 | 4.0 | 5.0 | 6.0 |
| Aromatic Component | Component (B): Detected Amount of Limonene (parts) with respect to 1 Part of Acetic Acid | 0.01 | 0.01 | 0.01 | 0.01 | 0.01 | 0.01 | 0.01 |
| | Component (C): Detected Amount of Furfuryl Alcohol (parts) with respect to 1 Part of Acetic Acid | 0.01 | 0.01 | 0.01 | 0.01 | 0.01 | 0.01 | 0.01 |
| | Component (D): Detected Amount of Hexanal (parts) with respect to 1 Part of Acetic Acid | 0.01 | 0.01 | 0.01 | 0.01 | 0.01 | 0.01 | 0.01 |
| | Sour Taste and Sour Odor Suppression Effect on Food or Drink | 5 | 5 | 4 | 4 | 3 | 3 | 1 |
| | Flavor Enhancement Effect on Food or Drink | 4 | 4 | 4 | 4 | 3 | 3 | 3 |
| | Comprehensive Evaluation (including Notes) | 5 | 5 | 4 | 4 | 3 | 3 | 1 |
| | Notes | | Strongly decreased pungency of sour taste and sour odor Strongly increased original flavor of the food ingredient | | | | | Sour taste and sour odor are perceived as pungency |

As shown in Tables 11-3 and 11-4, white rice and a simmered dish to which limonene (an aromatic component of (B) monoterpenes or sesquiterpenes), furfural or furfuryl alcohol (an aromatic component of (C) furan compounds having 5 or 6 carbon atoms), and hexanal (an aromatic component of (D) aliphatic aldehydes having 6 to 9 carbon atoms) were added exhibited no sour taste and sour odor within an acetic acid content of 0.015 mass % or more and less than 0.2 mass % when the white rice or simmered dish was eaten, and also exhibited strongly increased original flavor of the food ingredient; this indicates that the effect of the present invention was brought about, and the combination of aromatic components is more preferable. Similarly, the vinegar drink exhibited strongly decreased pungency of sour taste and sour odor within an acetic acid content of 0.2 mass % or more and 5 mass % or less when the vinegar drink was drunk, and also exhibited strongly increased original flavor of the food ingredient (the apple flavor of the vinegar drink); this indicates that the effect of the present invention was brought about, and the combination of aromatic components is more preferable.

Terpinene, p-cymene, muurolol, or cadalene, which have a similar structure (an aromatic component of (B) monoterpenes or sesquiterpenes), together with 2-acetylfuran, 3-methylfuran, 2-methylfuran, or 2-(5H)-furanone, which have a similar structure ((C) furan compounds having 5 or 6 carbon atoms), and heptanal, octanal, or nonanal, which have a similar structure ((D) aliphatic aldehydes having 6 to 9 carbon atoms), were also examined in terms of the effect due to combined use. The results were the same as those shown in Tables 11-3 and 11-4.

In this Example, a predetermined amount of aromatic components based on the acetic acid content was added, and there was a trend such that the higher the acetic acid content in the acetic acid-containing food or drink, the weaker the effect of the present invention. Thus, it was found that the concentration of the aromatic components may be increased in line with the content of acetic acid such that the effect of the present invention is clearly brought about.

In the case of the white rice and simmered dish, an acetic acid content of 0.1 mass % or less resulted in a weak shelf-life prolonging effect, and was found to be unsuitable for application in the present invention. In the case of the vinegar drink, an acetic acid content of 6 mass % or more resulted in the pungency of sour taste and sour odor, even when the amount of the aromatic components was increased; and was found to not sufficiently provide the effect of the present invention.

Example 12: Study of the Effect of the Present Invention Brought about by Adding Ingredients Containing the Aromatic Components In Examples 1 to 11, each of the aromatic components that belong to the groups of components (A) to (D) according to the present invention was added as a pure product to a food or drink, and the effect of the present invention brought about by the aromatic components in the acetic acid-containing food or drink was studied. In this Example, the effect of the present invention brought about by adding a food ingredient originally containing any of these aromatic components to an acetic acid-containing food or drink was studied.

Food ingredients containing an aromatic component that belongs to components (A) to (D) were prepared as follows.

Commercially available soybean flour was roasted at 140° C. for 10 minutes, and then cooled to room temperature, thereby preparing a food ingredient (which is hereinafter referred to as "roasted soybean flour").

5.5 mass % of the roasted soybean flour and 1.1 mass % of 100% plum juice were mixed with a shelf-life improver that contains acetic acid as the main active component (Rice Keep F, produced by Mizkan, acetic acid content: 7.3 mass %), thereby preparing an aromatic component-containing shelf-life improver. The aromatic components of the aromatic component-containing shelf-life improver were measured by solid-phase microextraction-gas chromatography-mass spectrometry (SPME-GC-MS), in accordance with the method described above (the method and conditions for measuring each aromatic component section above). Table 12 shows the detected aromatic components (Table 12 shows aromatic components (A) to (D) and the detected amount of each component as the peak area ratio of each aromatic component relative to the peak area of acetic acid).

TABLE 12

| Object of Analysis: Aromatic Component-Containing Shelf-Life Improver | | | The detected amount of each aromatic component (parts) with respect to 1 part of acetic acid |
|---|---|---|---|
| | Acetic Acid | | 1 |
| Aromatic Component | (A) Unsaturated Alcohols Having 8 Carbon Atoms | 1-Octen-3-Ol | 0.0003 |
| | (B) Monoterpenes or Sesquiterpenes | Limonene | 0.0007 |
| | | Terpinene | 0.0006 |
| | | p-Cymene | 0.0009 |
| | | Muurolol | 0.0050 |
| | | Cadalene | 0.0070 |
| | (C) Furan Compounds Having 5 or 6 Carbon Atoms | Furfural | 0.0466 |
| | | Furfuryl Alcohol | 0.0043 |
| | | 2-Acetylfuran | 0.0035 |
| | | 3-Methylfuran | 0.0028 |
| | | 2-Methylfuran | 0.0093 |
| | | 2-(5H)-Furanone | 0.0078 |
| | (D) Aliphatic Aldehydes Having 6 to 9 Carbon Atoms | Hexanal | 0.0098 |
| | | Heptanal | 0.0029 |
| | | Octanal | 0.0033 |
| | | Nonanal | 0.0063 |

Subsequently, 2.1 g of the aromatic component-containing shelf-life improver described above was mixed with 100 g of raw rice and 130 mL of water; and the mixture was cooked in an ordinary manner, thereby preparing white rice as a food containing a relatively low concentration of acetic acid. The cooked white rice contained 0.073 mass % of acetic acid.

The prepared white rice was evaluated for the impact of sour taste and sour odor, and changes in the flavor of the ingredient. Evaluation was performed in the same manner as in Example 1. The aromatic components of the prepared white rice were measured by solid-phase microextraction-gas chromatography-mass spectrometry (SPME-GC-MS), in accordance with the method described above (the method and conditions for measuring each aromatic component section above). Table 13 shows the detected aromatic components (Table 13 shows aromatic components (A) to (D) and the detected amount of each component as the peak area ratio of each aromatic component relative to the peak area of acetic acid).

Additionally, apple vinegar (produced by Mizkan, acidity (acetic acid content): 5.0 mass %) and commercially available apple juice were mixed, thereby preparing a vinegar drink with an acetic acid content of 2.5 mass %, as a food or drink that contains a relatively high concentration of acetic acid. 5.5 mass % of the roasted soybean flour and 1.1 mass % of commercially available 100% plum juice were added to the prepared vinegar drink, thereby preparing an aromatic component-containing vinegar drink. The aromatic components of the aromatic component-containing vinegar drink were measured by solid-phase microextraction-gas chromatography-mass spectrometry (SPME-GC-MS) in accordance with the method described above (the method and conditions for measuring each aromatic component section above). Table 14 shows the detected aromatic components (Table 14 shows aromatic components (A) to (D) and the detected amount of each component as the peak area ratio of each aromatic component relative to the peak area of acetic acid). The prepared aromatic component-containing vinegar drink was also evaluated for the impact of sour taste and sour odor, and changes in the flavor of the ingredient. Evaluation was performed in the same manner as in Example 1.

TABLE 13

| Object of Analysis: White rice prepared using aromatic component-containing shelf-life improver | | | The detected amount of each aromatic component (parts) with respect to 1 part of acetic acid |
|---|---|---|---|
| | Acetic Acid | | 1 |
| Aromatic Component | (A) Unsaturated Alcohols Having 8 Carbon Atoms | 1-Octen-3-Ol | 0.2069 |
| | (B) Monoterpenes or Sesquiterpenes | Limonene | 0.0730 |
| | | Terpinene | 0.0675 |
| | | p-Cymene | 0.8932 |
| | | Muurolol | 0.1330 |
| | | Cadalene | 0.1754 |
| | (C) Furan Compounds Having 5 or 6 Carbon Atoms | Furfural | 0.0466 |
| | | Furfuryl Alcohol | 0.0434 |
| | | 2-Acetylfuran | 0.2453 |
| | | 3-Methylfuran | 0.1702 |
| | | 2-Methylfuran | 0.0794 |
| | | 2-(5H)-Furanone | 0.1027 |
| | (D) Aliphatic Aldehydes Having 6 to 9 Carbon Atoms | Hexanal | 1.1938 |
| | | Heptanal | 0.1930 |
| | | Octanal | 0.1334 |
| | | Nonanal | 0.3613 |

TABLE 14

| Object of Analysis: Aromatic Component-Containing Vinegar Drink | | | The detected amount of each aromatic component (parts) with respect to 1 part of acetic acid |
|---|---|---|---|
| | Acetic Acid | | 1 |
| Aromatic Component | (A) Unsaturated Alcohols Having 8 Carbon Atoms | 1-Octen-3-Ol | 305 ppm |
| | (B) Monoterpenes or Sesquiterpenes | Limonene | 5320 ppm |
| | | Terpinene | 8032 ppm |
| | | p-Cymene | 4092 ppm |
| | | Muurolol | 5021 ppm |
| | | Cadalene | 3041 ppm |
| | (C) Furan Compounds Having 5 or 6 Carbon Atoms | Furfural | 7040 ppm |
| | | Furfuryl Alcohol | 520 ppm |
| | | 2-Acetylfuran | 609 ppm |
| | | 3-Methylfuran | 182 ppm |
| | | 2-Methylfuran | 235 ppm |
| | | 2-(5H)-Furanone | 760 ppm |
| | (D) Aliphatic Aldehydes Having 6 to 9 Carbon Atoms | Hexanal | 628 ppm |
| | | Heptanal | 432 ppm |
| | | Octanal | 573 ppm |
| | | Nonanal | 408 ppm |

TABLE 15

| | Test Example 371 | Test Example 372 |
|---|---|---|
| Acetic Acid-Containing Food or Drink | White Rice | Vinegar Drink |
| The acetic acid content when food or drink is eaten or drunk (mass %) | 0.073 | 2.5 |
| Sour Taste and Sour Odor Suppression Effect on Food or Drink | 5 | 5 |
| Flavor Enhancement Effect on Food or Drink | 5 | 5 |
| Comprehensive Evaluation (including Notes) | 5 | 5 |
| Notes | No sour taste and sour odor | Remarkably strongly decreased pungency of sour taste and sour odor Remakably strongly increased original flavor of the food ingredient |

As shown in Table 15, due to the addition of the roasted soybean flour and 100% plum juice, the food ingredient (cooked rice) exhibited remarkably and strongly increased original flavor without exhibiting no sour taste and sour odor. However, the flavor of the roasted soybean flour and 100% plum juice were not taken on by the food.

Additionally, the addition of the roasted soybean flour and 100% plum juice remarkably and strongly reduced the pungency of the sour taste and sour odor of the vinegar drink, and remarkably and strongly increased the original flavor of the food ingredient (apples of the vinegar drink). However, the flavor of the roasted soybean flour and 100% plum juice were not taken on by the drink.

Specifically, this Example demonstrates that even the addition of aromatic components (A) to (D) through a food ingredient that originally contains the aromatic components to an acetic acid-containing food or drink can also sufficiently bring about the effect of the present invention (suppression of the sour taste and sour odor, and increase of the original flavor of the food or drink), without adding the flavor of the food ingredient to the acetic acid-containing food or drink.

Although this Example showed the results of study on white rice and vinegar drink, the same study was also performed on salted rice, red bean rice, okowa (sticky glutinous rice), spaghetti, vegetable salad, chikuzenni (a dish of braised chicken and vegetables), and simmered pumpkin, which are foods containing acetic acid at a relatively low concentration. These foods that contain a low concentration of acetic acid were all confirmed to exhibit the effect of the present invention. Additionally, the same test was also performed on vinegar, seasoning vinegar, seasoning sauce, mayonnaise, ketchup, Worcestershire sauce, salad dressing, subuta (sweet-and-sour pork), and iwashi no nanbanzuke (marinated fried sardines), which are foods containing acetic acid at a relatively high concentration. All of these foods containing a high concentration of acetic acid were also confirmed to exhibit the effect of the present invention.

As noted above, the present invention can provide an acetic acid-containing food or drink that exhibits suppressed sour taste and sour odor without adverse effects on the flavor. More specifically, the present invention can suppress the sour taste and sour odor of a food or drink that contains acetic acid at a relatively low concentration for the purpose of prolonging the shelf-life, and can also avoid imparting an unpleasant feel to the original flavor of the food or drink. The present invention can also suitably suppress the pungent, sour taste and sour odor of a food or drink that contains a relatively high concentration of acetic acid for seasoning or cooking purposes, or for intake purposes; and thus improves the ingestibility of the acetic acid containing food or drink. Accordingly, the present invention can effectively contribute to the improvement of food industries and the improvement of daily-diet through elimination of the avoidance, by consumers, of the intake or of the obstruction for purchase of acetic acid-containing foods or drinks.

The invention claimed is:

1. A food or drink comprising acetic acid and at least one aromatic component selected from the group consisting of (A) and (B), wherein (A) is an unsaturated alcohol having 8 carbon atoms; and (B) is a monoterpene or a sesquiterpene, wherein the acetic acid content of the food or drink when eating is 0.015 mass % or more.

2. The food or drink according to claim 1, further comprising at least one aromatic component selected from the group consisting of (C) and (D), wherein (C) is a furan compound having 5 or 6 carbon atoms; and (D) is an aliphatic aldehyde having 6 to 9 carbon atoms.

3. The food or drink according to claim 1, wherein the unsaturated alcohol having 8 carbon atoms is 1-octen-3-ol.

4. The food or drink according to claim 1, wherein the monoterpene or sesquiterpene is at least one member selected from the group consisting of limonene, terpinene, p-cymene, muurolol, and cadalene.

5. The food or drink according to claim 2, wherein the furan compound having 5 or 6 carbon atoms is at least one member selected from the group consisting of furfural, furfuryl alcohol, 2-acetylfuran, 3-methylfuran, 2-methylfuran, and 2-(5H)-furanone.

6. The food or drink according to claim 2, wherein the aliphatic aldehyde having 6 to 9 carbon atoms is at least one member selected from the group consisting of hexanal, heptanal, octanal, and nonanal.

7. The food or drink according to claim 3, wherein the 1-octen-3-ol is contained within a range in which a peak area ratio measured by solid-phase microextraction-gas chromatography-mass spectrometry is 1 ppm part or more and 5 parts or less with respect to 1 part of acetic acid.

8. The food or drink according to claim 4, wherein the monoterpene or sesquiterpene is contained within a range in which a peak area ratio measured by solid-phase microextraction-gas chromatography-mass spectrometry is 1 ppm part or more and 10 parts or less with respect to 1 part of acetic acid.

9. The food or drink according to claim 5, wherein the furan compound having 5 or 6 carbon atoms is contained within a range in which a peak area ratio measured by solid-phase microextraction-gas chromatography-mass spectrometry is 1 ppm part or more and 15 parts or less with respect to 1 part of acetic acid.

10. The food or drink according to claim 6, wherein the aliphatic aldehyde having 6 to 9 carbon atoms is contained within a range in which a peak area ratio measured by solid-phase microextraction-gas chromatography-mass spectrometry is 1 ppm part or more and 15 parts or less with respect to 1 part of acetic acid.

11. The food or drink according to claim 1, wherein the aromatic component (A) contains 1-octen-3-ol;

wherein the aromatic component (B) contains at least one member selected from the group consisting of limonene, terpinene, p-cymene, muurolol, and cadalene;

wherein the aromatic component (A) is contained within a range in which a peak area ratio measured by solid-phase microextraction-gas chromatography-mass spectrometry is 1 ppm part or more and 5 parts or less with respect to 1 part of acetic acid;

wherein the aromatic component (B) is contained within a range in which a peak area ratio measured by solid-phase microextraction-gas chromatography-mass spectrometry is 1 ppm part or more and 10 parts or less with respect to 1 part of acetic acid; and wherein the acetic acid content when eating is 0.015 mass % or more and less than 5 mass %.

12. The food or drink according to claim 1, wherein the food or drink has an acetic acid content of 0.015 mass % or more and less than 0.2 mass % when eating.

13. The food or drink according to claim 12, wherein the food or drink is an acetic acid-containing cereal processed product.

14. The food or drink according to claim 13, wherein the acetic acid-containing cereal processed product is white rice or salted rice, both containing acetic acid.

15. The food or drink according to claim 1, wherein the food or drink is an acetic acid-containing seasoning or an acetic acid-containing drink, both having an acetic acid content of 0.2 mass % or more and 5 mass % or less when eating the food or drink.

16. A preparation food or drink for acetic acid-containing cereal processed products, for use in the production of an acetic acid-containing cereal processed product having an acetic acid content of 0.015 mass % or more and less than 0.2 mass % when eating, the preparation food or drink comprising at least one aromatic component selected from the group consisting of (A) and (B), wherein (A) is an unsaturated alcohol having 8 carbon atoms; and (B) is a monoterpene or sesquiterpene.

* * * * *